US012530486B2

(12) United States Patent
Turgeman et al.

(10) Patent No.: US 12,530,486 B2
(45) Date of Patent: *Jan. 20, 2026

(54) SPECIFYING A NEW COMPUTATIONAL STEP OF A DATA PIPELINE

(71) Applicant: MICROSOFT TECHNOLOGY LICENSING, LLC, Redmond, WA (US)

(72) Inventors: Tomer Turgeman, Tel Aviv (IL); Yisroel Gershon Taber, Raanana (IL); Lev Rozenbaum, Kfar-Saba (IL); Ittay Levy Ophir, Giv'atayim (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/656,066

(22) Filed: Mar. 23, 2022

(65) Prior Publication Data

US 2022/0215122 A1    Jul. 7, 2022

Related U.S. Application Data

(63) Continuation of application No. 16/665,916, filed on Oct. 28, 2019, now Pat. No. 11,409,904, which is a (Continued)

(51) Int. Cl.
*G06F 21/62* (2013.01)
(52) U.S. Cl.
CPC .................. *G06F 21/6245* (2013.01)
(58) Field of Classification Search
CPC ................................................ G06F 21/6245
(Continued)

(56) References Cited

U.S. PATENT DOCUMENTS 5,907,692 A    5/1999   Wise et al.
8,346,870 B2   1/2013   Jazdzewski
(Continued)

FOREIGN PATENT DOCUMENTS

CN    102187314 A    9/2011
CN    102708316 A    10/2012
(Continued)

OTHER PUBLICATIONS

Bajpai, "A Survey on Internet Performance Measurement Platforms and Related Standardization Efforts", 2015, IEEE, pp. 1-32 (Year: 2015).*

(Continued)

*Primary Examiner* — Taghi T Arani
*Assistant Examiner* — Gregory A Lane
(74) *Attorney, Agent, or Firm* — Shook, Hardy & Bacon L.L.P.

(57) ABSTRACT

Embodiments of the present disclosure are directed to techniques for constructing and configuring a data privacy pipeline to generate collaborative data in a data trustee environment. An interface of the trustee environment can serve as a sandbox for parties to generate, contribute to, or otherwise configure a data privacy pipeline by selecting, composing, and arranging any number of input datasets, computational steps, and contract outputs. (e.g., output datasets, permissible named queries on collaborative data). The interface may allow a contributing party to use one or more unspecified "placeholder" elements, such as placeholder datasets or placeholder computations, as building blocks in a pipeline under development. Parameterized access control may authorize designated participants to access, view, and/or contribute to designated portions of a contact or pipeline. Authorized participants may indicate (Continued)

their approval, and the pipeline may be deployed in the data trustee environment pursuant to the agreed upon parameters.

20 Claims, 42 Drawing Sheets

Related U.S. Application Data continuation-in-part of application No. 16/388,696, filed on Apr. 18, 2019, now Pat. No. 11,455,410.

(58) Field of Classification Search
USPC .......................................................... 726/1
See application file for complete search history.

(56) References Cited

U.S. PATENT DOCUMENTS

| | | | |
|---|---|---|---|
| 8,613,070 B1 | 12/2013 | Deva et al. | |
| 8,621,649 B1* | 12/2013 | Van Dijk | H04L 9/40 726/1 |
| 9,195,850 B2 | 11/2015 | Hess | |
| 9,338,008 B1 | 5/2016 | Kirkland et al. | |
| 10,496,653 B1 | 12/2019 | Epshteyn et al. | |
| 11,281,521 B1 | 3/2022 | Petkar | |
| 11,356,456 B2 | 6/2022 | Turgeman et al. | |
| 11,361,106 B2 | 6/2022 | Taber et al. | |
| 11,403,299 B2 | 8/2022 | Taber et al. | |
| 11,409,897 B2 | 8/2022 | Turgeman et al. | |
| 11,409,904 B2 | 8/2022 | Turgeman et al. | |
| 11,455,410 B2 | 9/2022 | Turgeman et al. | |
| 11,620,179 B1 | 4/2023 | Tian | |
| 11,775,681 B2 | 10/2023 | Taber et al. | |
| 11,922,145 B2 | 3/2024 | Taber et al. | |
| 11,954,233 B2 | 4/2024 | Taber et al. | |
| 12,182,004 B2 | 12/2024 | Taber et al. | |
| 2002/0026464 A1 | 2/2002 | Jones | |
| 2004/0111639 A1 | 6/2004 | Schwartz et al. | |
| 2005/0154729 A1 | 7/2005 | Gutsche | |
| 2006/0282281 A1 | 12/2006 | Egetoft | |
| 2007/0299795 A1 | 12/2007 | Macbeth et al. | |
| 2008/0244687 A1 | 10/2008 | McClain | |
| 2010/0100967 A1 | 4/2010 | Douglas | |
| 2010/0162212 A1 | 6/2010 | Stall et al. | |
| 2010/0192084 A1* | 7/2010 | Ingermanson | G16H 40/20 715/771 |
| 2010/0242088 A1* | 9/2010 | Thomas | G06F 21/554 726/4 |
| 2010/0287562 A1 | 11/2010 | Jazdzewski | |
| 2011/0085667 A1 | 4/2011 | Berrios | |
| 2011/0307557 A1* | 12/2011 | Kadashevich | G06Q 10/107 709/205 |
| 2012/0109892 A1 | 5/2012 | Novik et al. | |
| 2013/0179785 A1* | 7/2013 | Kim | G06F 3/0354 715/719 |
| 2013/0239228 A1 | 9/2013 | Cinarkaya et al. | |
| 2013/0247204 A1 | 9/2013 | Schrecker et al. | |
| 2013/0268734 A1 | 10/2013 | Hotz | |
| 2014/0007184 A1 | 1/2014 | Porras | |
| 2014/0040979 A1* | 2/2014 | Barton | H04W 12/30 726/1 |
| 2014/0068732 A1 | 3/2014 | Hinton et al. | |
| 2014/0082424 A1 | 3/2014 | Sanders | |
| 2014/0373016 A1 | 12/2014 | Ruggiero | |
| 2015/0271178 A1* | 9/2015 | Bhattacharya | G06F 21/6254 726/1 |
| 2015/0317490 A1* | 11/2015 | Carey | G06F 21/6245 726/26 |
| 2015/0319192 A1 | 11/2015 | Cabrera | |
| 2016/0357778 A1 | 12/2016 | Mackenzie | |
| 2017/0076113 A1* | 3/2017 | McNamara | G06F 21/6245 |
| 2017/0169253 A1 | 6/2017 | Curcio et al. | |
| 2017/0185752 A1 | 6/2017 | Lemay et al. | |
| 2017/0214696 A1 | 7/2017 | Cleaver et al. | |
| 2017/0364568 A1 | 12/2017 | Reynolds et al. | |
| 2017/0371881 A1 | 12/2017 | Reynolds | |
| 2018/0007059 A1* | 1/2018 | Innes | G06F 21/6218 |
| 2018/0060225 A1 | 3/2018 | Tao | |
| 2018/0096028 A1 | 4/2018 | Masekera | |
| 2018/0129585 A1 | 5/2018 | Martin et al. | |
| 2018/0157928 A1 | 6/2018 | Oliveira et al. | |
| 2018/0203701 A1 | 7/2018 | Nield et al. | |
| 2018/0219674 A1 | 8/2018 | Mullins | |
| 2018/0239639 A1 | 8/2018 | Novak et al. | |
| 2018/0262483 A1* | 9/2018 | Sharma | H04L 63/083 |
| 2018/0262864 A1* | 9/2018 | Reynolds | G06F 16/254 |
| 2019/0058709 A1 | 2/2019 | Kempf et al. | |
| 2019/0066052 A1 | 2/2019 | Boutros | |
| 2019/0205197 A1 | 7/2019 | Hartman | |
| 2019/0227910 A1 | 7/2019 | Raviv | |
| 2019/0303115 A1 | 10/2019 | Kelly et al. | |
| 2019/0318198 A1 | 10/2019 | Griffin et al. | |
| 2019/0370370 A1 | 12/2019 | Wittern et al. | |
| 2019/0370492 A1* | 12/2019 | Falchuk | H04W 12/02 |
| 2020/0067789 A1 | 2/2020 | Khuti et al. | |
| 2020/0167498 A1* | 5/2020 | Pridgen | G06F 21/6245 |
| 2020/0173004 A1 | 6/2020 | Fujiwara et al. | |
| 2020/0252210 A1 | 8/2020 | Sharfman et al. | |
| 2020/0265057 A1 | 8/2020 | Jolfaei | |
| 2020/0311294 A1 | 10/2020 | Sim-Tang | |
| 2021/0081432 A1 | 3/2021 | Grunwald et al. | |
| 2021/0096936 A1 | 4/2021 | Seshadri et al. | |
| 2021/0182423 A1* | 6/2021 | Padmanabhan | G06F 16/24573 |
| 2021/0272031 A1* | 9/2021 | Brannon | G06F 21/552 |
| 2022/0121555 A1 | 4/2022 | Zbiciak et al. | |
| 2022/0215119 A1 | 7/2022 | Turgeman et al. | |
| 2022/0215120 A1 | 7/2022 | Turgeman et al. | |
| 2022/0215121 A1 | 7/2022 | Turgeman et al. | |
| 2022/0215122 A1 | 7/2022 | Turgeman et al. | |
| 2022/0215123 A1 | 7/2022 | Turgeman et al. | |
| 2022/0215124 A1 | 7/2022 | Turgeman et al. | |
| 2022/0215125 A1 | 7/2022 | Turgeman et al. | |
| 2022/0277105 A1 | 9/2022 | Taber et al. | |
| 2022/0398338 A1 | 12/2022 | Turgeman et al. | |
| 2023/0280986 A1 | 9/2023 | Taber et al. | |
| 2023/0281109 A1 | 9/2023 | Taber et al. | |
| 2023/0281342 A1 | 9/2023 | Taber et al. | |
| 2024/0061958 A1 | 2/2024 | Taber et al. | |
| 2024/0184542 A1 | 6/2024 | Taber et al. | |

FOREIGN PATENT DOCUMENTS

| | | |
|---|---|---|
| CN | 102986190 A | 3/2013 |
| CN | 103532981 A | 1/2014 |
| CN | 104050201 A | 9/2014 |
| CN | 104205096 A | 12/2014 |
| CN | 103118053 B | 12/2015 |
| CN | 106797383 A | 5/2017 |
| CN | 110210211 A | 9/2019 |
| CN | 108351807 B | 6/2022 |
| EP | 2116954 A1 | 11/2009 |
| EP | 3133524 A1 | 2/2017 |
| WO | 2010129432 A2 | 11/2010 |
| WO | 2013132377 A1 | 9/2013 |
| WO | 2015165111 A1 | 11/2015 |

OTHER PUBLICATIONS

Di Tommaso, "Nextflow enables reproducible computational workflows", 2017, Nature biotechnology, pp. 316-319 (Year: 2017).*
U.S. Appl. No. 16/665,916 | US-2020-0334377-A1, filed Oct. 28, 2019 | Oct. 22, 2022.
U.S. Appl. No. 17/743,341, filed May 12, 2022.
U.S. Appl. No. 17/684,204, filed Mar. 1, 2022.
U.S. Appl. No. 17/684,189, filed Mar. 1, 2022.
U.S. Appl. No. 17/684,210, filed Mar. 1, 2022.
U.S. Appl. No. 17/656,051, filed Mar. 23, 2022.
U.S. Appl. No. 17/656,057, filed Mar. 23, 2022.
U.S. Appl. No. 17/656,062, filed Mar. 23, 2022.
U.S. Appl. No. 17/656,073, filed Mar. 23, 2022.
U.S. Appl. No. 17/656,079, filed Mar. 23, 2022.
U.S. Appl. No. 17/656,082, filed Mar. 23, 2022.

(56) References Cited

OTHER PUBLICATIONS

"Notice of Allowance Issued in U.S. Appl. No. 17/009,407", Mailed Date: Apr. 18, 2023, 8 Pages.
"International Search Report and Written Opinion Issued in PCT Application No. PCT/US22/054022", Mailed Date: Apr. 28, 2023, 12 Pages.
"International Search Report and Written Opinion Issued in PCT Application No. PCT/US23/010524", Mailed Date: May 9, 2023, 11 Pages.
"International Search Report and Written Opinion Issued in PCT Application No. PCT/US23/011487", Mailed Date: May 4, 2023, 13 Pages.
U.S. Appl. No. 16/388,700 | US-2020-0334259-A1, filed Apr. 18, 2019 | Oct. 22, 2022.
U.S. Appl. No. 16/388,703 | US-2020-0334375-A1, filed Apr. 18, 2019 | Oct. 22, 2022.
U.S. Appl. No. 16/388,696 | US-2020-0334370-A1, filed Apr. 18, 2019 | Oct. 22, 2020.
U.S. Appl. No. 17/887,989, filed Aug. 15, 2022.
"Notice of Allowance Issued in U.S. Appl. No. 17/009,414", Mailed Date: Feb. 15, 2022, 10 Pages.
Papernot, et al., "SoK: Security and Privacy in Machine Learning", In IEEE European Symposium on Security and Privacy, Apr. 24, 2018, pp. 399-414.
"Final Office Action Issued in U.S. Appl. No. 16/388,696", Mailed Date: Feb. 28, 2022, 21 Pages.
"Notice of Allowance Issued in U.S. Appl. No. 16/388,700", Mailed Date: Mar. 16, 2022, 10 Pages.
"Notice of Allowance Issued in U.S. Appl. No. 16/388,703", Mailed Date: Mar. 16, 2022, 10 Pages.
"Notice of Allowance Issued in U.S. Appl. No. 16/665,916", Mailed Date: Mar. 23, 2022, 10 Pages.
"Non-Final Office Action Issued in U.S. Appl. No. 17/656,079", Mailed Date: Oct. 10, 2023, 31 Pages.
Batini, et al., "Methodologies for Data Quality Assessment and Improvement", In Journal of ACM Computing Surveys, vol. 41, Issue 3, Jul. 30, 2009, pp. 1-52.
"Notice of Allowance Issued in U.S. Appl. No. 16/388,696", Mailed Date: May 23, 2022, 10 Pages.
"Notice of Allowance Issued in U.S. Appl. No. 16/736,399", Mailed Date: Mar. 30, 2022, 6 Pages.
Montori, et al., "A Collaborative Internet of Things Architecture for Smart Cities and Environmental Monitoring", In Internet of Things Journal, vol. 5, Issue 2, Apr. 2018, pp. 592-605.
"Non Final Office Action Issued in U.S. Appl. No. 17/656,051", Mailed Date: Aug. 24, 2023, 37 Pages.
"Non Final Office Action Issued in U.S. Appl. No. 17/656,073", Mailed Date: Sep. 19, 2023, 32 Pages.
"Non Final Office Action Issued in U.S. Appl. No. 17/684,204", Mailed Date: Sep. 14, 2023, 10 Pages.
"Notice of Allowance Issued in U.S. Appl. No. 17/684,210", Mailed Date: Aug. 9, 2023, 12 Pages.
"Notice of Allowance Issued in U.S. Appl. No. 17/743,341", Mailed Date: Jul. 21, 2023, 11 Pages.
"Office Action Issued in Indian Patent Application No. 202117044993", Mailed Date: Aug. 3, 2023, 7 Pages.
"Office Action Issued in European Patent Application No. 20718931. 7", Mailed Date: Sep. 5, 2023, 9 Pages.
"Office Action Issued in European Patent Application No. 20719254. 3", Mailed Date: Sep. 6, 2023, 11 Pages.
"Office Action Issued in European Patent Application No. 20721859. 5", Mailed Date: Sep. 7, 2023, 8 Pages.
"Office Action Issued in European Patent Application No. 20722753. 9", Mailed Date: Sep. 7, 2023, 7 Pages.
Behl, et al., "An Analysis of Cloud Computing Security Issues", In Proceedings of the World Congress on Information and Communication Technologies, Oct. 30, 2012, pp. 109-114.
Brachmann, et al., "Data Debugging and Exploration with Vizier", In Proceedings of the International Conference on Management of Data, Jun. 30, 2019, pp. 1877-1880.
Chen, et al., "Enrichr: Interactive and Collaborative HTML5 Gene List Enrichment Analysis Tool", In Journal of BMC Bioinformatics, vol. 14, Issue 1, Apr. 15, 2013, pp. 1-14.
Dimitrova, et al., "Authorization-Aware Optimization for Multi-Provider Queries", In Proceedings of the 34th ACM/SIGAPP Symposium on Applied Computing, Apr. 8, 2019, pp. 431-438.
Hellerstein, et al., "Ground: A Data Context Service", In Proceedings of 8th Biennial Conference on Innovative Data Systems Research, Jan. 8, 2017, 12 Pages.
Liu, et al., "Mona: Secure Multi-Owner Data Sharing for Dynamic Groups in the Cloud", In Journal of IEEE Transactions on Parallel and Distributed Systems, vol. 24, Issue 6, Dec. 5, 2012, pp. 1182-1191.
Rezig, et al., "Debugging Large-Scale Data Science Pipelines using Dagger", In Proceedings of the VLDB Endowment, vol. 13, Issue 12, Aug. 1, 2020, pp. 2993-2996.
"Office Action Issued in Indian Patent Application No. 202117045000", Mailed Date: Sep. 21, 2023, 8 Pages.
"Non Final Office Action Issued in U.S. Appl. No. 17/009,407", Mailed Date: Nov. 17, 2022, 21 Pages.
"Non Final Office Action Issued in U.S. Appl. No. 17/743,341", Mailed Date: Mar. 14, 2023, 9 Pages.
"Office Action Issued in European Patent Application No. 20719528. 0", Mailed Date: Apr. 5, 2023, 5 Pages.
U.S. Appl. No. 16/736,399 | US-2020-0336488-A1, filed Jan. 7, 2022 | Oct. 22, 2020.
U.S. Appl. No. 17/009,414 | US-2022-0067200-A1, filed Sep. 1, 2020 | Mar. 3, 2022.
First Office Action Received for Chinese Application No. 202080029251.6, mailed on Feb. 26, 2024, 12 pages (English Translation Provided).
Office Action Received for Chinese Application No. 202080029000. 8, mailed on Mar. 1, 2024, 11 pages (English Translation Provided).
Final Office Action mailed on Mar. 1, 2024, in U.S. Appl. No. 17/656,051, 33 pages.
Final Office Action mailed on Mar. 1, 2024, in U.S. Appl. No. 17/656,073, 34 pages.
Notice of Allowance mailed on Feb. 26, 2024, in U.S. Appl. No. 17/743,341, 2 pages.
U.S. Appl. No. 16/388,700 | US-2020-0334259-A1 | U.S. Pat. No. 11,403,299, filed Apr. 18, 2019 | Oct. 22, 2022 | Aug. 2, 2022.
U.S. Appl. No. 16/388,703 | US-2020-0334375-A1, U.S. Pat. No. 11,409,897, filed Apr. 18, 2019 | Oct. 22, 2022 | Aug. 9, 2022.
U.S. Appl. No. 16/388,696 | US-2020-0334370-A1 | U.S. Pat. No. 11,455,410, filed Apr. 18, 2019 | Oct. 22, 2020 | Sep. 27, 2022.
U.S. Appl. No. 17/887,989 | US 2022-0398338 A1, filed Aug. 15, 2022 | Dec. 15, 2022.
U.S. Appl. No. 16/665,916 | US-2020-0334377-A1 | U.S. Pat. No. 11,409,904, filed Oct. 28, 2019 | Oct. 22, 2022 | Sep. 9, 2022.
U.S. Appl. No. 16/736,399 | US-2020-0336488-A1 | U.S. Pat. No. 11,356,456, filed Jan. 7, 2022 | Oct. 22, 2020 | Jun. 7, 2022.
U.S. Appl. No. 17/009,407 | US-2022-0067199-A1, filed Sep. 1, 2020 | Mar. 3, 2022.
U.S. Appl. No. 17/009,414 | US-2022-0067200-A1 | U.S. Pat. No. 11,361,106, filed Sep. 1, 2020 | Mar. 3, 2022 | Jun. 14, 2022.
U.S. Appl. No. 17/743,341 | US-2022-0277105-A1, filed May 12, 2022 | Sep. 1, 2022.
U.S. Appl. No. 17/684,204 | US 2023-0281109 A1, filed Mar. 1, 2022 | Sep. 7, 2023.
U.S. Appl. No. 17/684,189 | US 2023-0281342 A1, filed Mar. 1, 2022 | Sep. 7, 2023.
U.S. Appl. No. 17/684,210 | US 2023-0280986 A1, filed Mar. 1, 2022 | Sep. 7, 2023.
U.S. Appl. No. 17/656,051 | US-2022-0215119-A1, filed Mar. 23, 2022 | Jul. 7, 2022.
U.S. Appl. No. 17/656,057 | US-2022-0215120-A1, filed Mar. 23, 2022 | Jul. 7, 2022.
U.S. Appl. No. 17/656,062 | US-2022-0215121-A1, filed Mar. 23, 2022 | Jul. 7, 2022.
U.S. Appl. No. 17/656,073 | US-2022-0215123-A1, filed Mar. 23, 2022 | Jul. 7, 2022.
U.S. Appl. No. 17/656,079 | US-2022-0215124-A1, filed Mar. 23, 2022 | Jul. 7, 2022.

(56) References Cited

OTHER PUBLICATIONS

U.S. Appl. No. 17/656,082 | US-2022-0215125-A1, filed Mar. 23, 2022 | Jul. 7, 2022.
Notice of Allowance mailed on Dec. 20, 2023, in U.S. Appl. No. 17/684,210, 3 pages.
Notice of Allowance mailed on Dec. 27, 2023, in U.S. Appl. No. 17/684,204, 7 pages.
Notice of Allowance mailed on Nov. 8, 2023, in U.S. Appl. No. 17/684,210, 12 pages.
Office Action Received for Chinese Application No. 202080028567.3, mailed on Jan. 31, 2024, 14 pages (English Translation Provided).
"Non Final Office Action Issued in U.S. Appl. No. 17/656,057", Mailed Date: Nov. 13, 2023, 35 Pages.
"Non Final Office Action Issued in U.S. Appl. No. 17/656,082", Mailed Date: Oct. 27, 2023, 36 Pages.
"Notice of Allowance Issued in U.S. Appl. No. 17/743,341", Mailed Date: Nov. 15, 2023, 12 Pages.
"Office Action Issued in European Patent Application No. 20719528.0", Mailed Date: Oct. 25, 2023, 6 Pages.
Xia, et al., "MeDShare: Trust-Less Medical Data Sharing Among Cloud Service Providers via Blockchain", In Journal of IEEE Access, vol. 5, Jul. 24, 2017, pp. 14757-14767.
Jan. 9, 2024, U.S. Appl. No. 18/408,294.
"International Search Report and Written Opinion Issued in PCT Application No. PCT/US23/010526", Mailed Date: May 9, 2023, 11 Pages.
Final Office Action mailed on Jun. 6, 2024, in U.S. Appl. No. 17/656,082, 35 pages.
Final Office Action mailed on Jun. 21, 2024, in U.S. Appl. No. 17/656,062, 34 pages.
Final Office Action mailed on Mar. 14, 2024, in U.S. Appl. No. 17/656,057, 35 pages.
Final Office Action mailed on Mar. 14, 2024, in U.S. Appl. No. 17/656,079, 36 pages.
First Examination Report Received for Indian Application No. 202117045001, mailed on Jan. 24, 2024, 07 pages.
First Examination Report received in Indian Application No. 202117044994, Jan. 15, 2024, 8 pages.
First Office Action Received for Chinese Application No. 202080028730.6, mailed on Apr. 25, 2024, 09 pages. (English Translation Provided).
Non-Final Office Action issued in U.S. Appl. No. 17/656,079, mailed on Jul. 19, 2024, 39 Pages.
Non-Final Office Action mailed on Apr. 1, 2024, in U.S. Appl. No. 17/684,189, 22 pages.
Non-Final Office Action mailed on Aug. 1, 2024, in U.S. Appl. No. 17/656,051, 34 pages.
Non-Final Office Action mailed on Aug. 2, 2024, in U.S. Appl. No. 17/656,057, 38 pages.
Non-Final Office Action mailed on Aug. 2, 2024, in U.S. Appl. No. 17/656,073, 38 pages.
Non-Final Office Action mailed on Dec. 8, 2023, in U.S. Appl. No. 17/656,062, 35 pages.
Non-Final office action mailed on Sep. 12, 2024, in U.S. Appl. No. 18/499,461, 10 Pages.
Notice of Allowance mailed on May 13, 2024, in U.S. Appl. No. 17/684,204, 05 pages.
Notification to Grant Received for Chinese Application No. 202080029000.8, mailed on May 15, 2024, 4 pages.
Office Action Received for Chinese Application No. 202080029070.3, mailed on Jun. 28, 2024, 12 pages (English Translation Provided).
Office Action Received for Chinese Application No. 202080029070.3, mailed on Sep. 10, 2024, 6 pages. (English Translation available).
Office Action Received for Indian Application No. 202117044999, mailed Nov. 10, 2023, 08 pages.
Zaharia, "Resilient Distributed Datasets: A Fault-Tolerant Abstraction for In-Memory Cluster Computing," Proceedings of the 9th USENIX conference on Networked Systems Design and Implementation, 14 pages, Apr. 2012.
Communication under Rule 71(3) received in European Application No. 20719528.0, mailed on Oct. 28, 2024, 8 pages.
Final Office Action mailed on Oct. 30, 2024, in U.S. Appl. No. 17/684,189, 20 pages.
Notice of Grant Received for Chinese Application No. 202080028730.6, mailed on Sep. 24, 2024, 4 pages. (English Translation Provided).
Second Office Action Received for Chinese Application No. 202080028567.3, mailed on Oct. 12, 2024, 04 pages (English Translation Provided).
Decision to grant a European patent pursuant to Article 97(1) Received in European Patent Application No. 20719528.0, mailed on Mar. 27, 2025, 02 pages.
Final Office Action mailed on Feb. 12, 2025, in U.S. Appl. No. 17/656,051, 37 pages.
Final Office Action mailed on Jan. 29, 2025, in U.S. Appl. No. 17/656,073, 40 Pages.
Final Office Action mailed on Jan. 29, 2025, in U.S. Appl. No. 17/656,057, 41 Pages.
Final Office Action mailed on Jan. 30, 2025, in U.S. Appl. No. 17/656,079, 42 pages.
Mao, et al., "A Survey on Mobile Edge Computing: The Communication Perspective", arXiv:1701.01090v4, Jun. 13, 2017, 37 pages.
Non-Final Office Action mailed on Apr. 25, 2025, in U.S. Appl. No. 17/684,189, 22 pages.
Non-Final Office Action mailed on Feb. 12, 2025, in U.S. Appl. No. 17/656,062, 36 pages.
Non-Final Office Action mailed on Feb. 27, 2025, in U.S. Appl. No. 17/656,082, 40 pages.
Non-Final Office Action mailed on Jan. 10, 2025, in U.S. Appl. No. 17/887,989, 36 pages.
Notice of Allowance mailed on Jan. 29, 2025, in U.S. Appl. No. 18/499,461, 12 Pages.
Notice of Allowance Received for Chinese Application No. 202080029251.6, mailed on Dec. 17, 2024, 02 pages. W/o English translation.
Poller, et al., "An Asset to Security Modeling? Analyzing Stakeholder Collaborations Instead of Threats to Assets", Proceedings of the 2014 New Security Paradigms Workshop, Sep. 15, 2014, pp. 69-82.
Notice of Allowance mailed on Jun. 24, 2025, in U.S. Appl. No. 17/656,051, 10 pages.
Lee et al., "An Open Government Maturity Model for Social Media-Based Public Engagement", Government information quarterly, vol. 29, Issue 4, Oct. 2012, pp. 492-502.
Intimation of Grant Received for Indian Application No. 202117044993, mailed on May 29, 2025, 01 Page.
Notice of Allowance Received for Chinese Application No. 202080028567.3, mailed on Apr. 30, 2025, 04 pages (English Translation Provided).
Notice of Allowance mailed on Sep. 10, 2025, in U.S. Appl. No. 17/656,082, 09 Pages.
Kambatla, et al., "Trends in big data analytics", In Journal of parallel and distributed computing, vol. 74, Issue 7, Jul. 2014, pp. 2561-2573.
Cheng, et al., "Wide & Deep Learning for Recommender Systems.", Proceedings of the 1st workshop on deep learning for recommender systems, Sep. 15, 2016, 4 Pages.
Final Office Action mailed on Aug. 8, 2025, in U.S. Appl. No. 17/887,989, 35 Pages.
Final Office Action mailed on Aug. 12, 2025, in U.S. Appl. No. 17/656,062, 11 pages.
Final Office Action mailed on Sep. 9, 2025, in U.S. Appl. No. 17/684,189, 22 pages.
Notice of Allowance mailed on Aug. 4, 2025, in U.S. Appl. No. 17/656,057, 14 pages.
Notice of Allowance mailed on Aug. 22, 2025, in U.S. Appl. No. 17/656,079, 14 pages.
Notice of Allowance mailed on Jul. 31, 2025, in U.S. Appl. No. 17/656,073, 14 Pages.
Van Der Aalst, WMP., "Extracting Event Data from Databases to Unleash Process Mining", BPM, 2015, 25 pages.

(56) References Cited

OTHER PUBLICATIONS

Yang, et al., "Proof-of-Familiarity: A Privacy-Preserved Blockchain Scheme for Collaborative Medical Decision-Making", Applied Science, vol. 09, Issue No. 07, Apr. 1, 2019, 24 Pages.
Examination report Received for Indian Application No. 202317013237, mailed on Aug. 8, 2025, 7 pages.
Benedikt, et al., "Querying with access patterns and integrity constraints", Proceedings of the VLDB Endowment, vol. 8, Issue No. 06, Feb. 1, 2015, 12 Pages.
Communication under Rule 71(3) EPC, Received in European Patent Application No. 23704547.1, mailed on Sep. 8, 2025, 07 pages.
Hearing Notice Received for Indian Application No. 202117044999, mailed on Sep. 19, 2025, 04 Pages.
Le, et al., "Consistent Query Plan Generation in Secure Cooperative Data Access", Proceeding of IFIP Annual Conference on Data and Applications Security and Privacy, 2014, pp. 227-242.
Notice of Allowance mailed on Oct. 27, 2025, in U.S. Appl. No. 18/408,294, 13 Pages.

\* cited by examiner

| | From: | 16 Sep 2018 | 🔳 | To: | 17 Sep 2018 | 🔳 | ☑ Running | ☑ Succeeded | ☑ Failed | ☑ Aborted |

Jobs ⟵ 1720

| Job ID | Pipeline name | Status | Start time | Duration | Action |
|---|---|---|---|---|---|
| JOB 171914 | Calculate average number of... | Running | 17 Sep 2018 17:30 UTC | 25 min 17 sec | Abort |
| JOB 171912 | Calculate average number of... | Aborted | 17 Sep 2018 15:30 UTC | 1 hour 45 min 25 sec | |
| JOB 171910 | Calculate average number of... | Succeeded | 16 Sep 2018 12:40 UTC | 30 min 39 sec | View results |
| JOB 171909 | Calculate average number of... | Failed | 16 Sep 2018 10:45 UTC | 10 min 5 sec | View errors |
| ⋮ | ⋮ | | | | ⋮ |

Datasets
Assets
Contracts
Pipelines
Jobs
Queries
Audit

FIG. 17B

Execute query

Name:
Description: Get max compensation for a level...
Calculates the max compensation for a level...

Param-1: Free-text-value
Param-2: One-of-the-pr defined-values

Trigger — 1740

Results

| Column-A | Column-B | Column-C | Column-D | Column-E |
|----------|----------|----------|----------|----------|
| A1 | B1 | C1 | D1 | E1 |
| A2 | B2 | C2 | D2 | E2 |
| A3 | B3 | C3 | D3 | E3 |
| ... | ... | ... | ... | ... |

1745

Datasets
Assets
Contracts
Pipelines
Jobs
Queries
Audit

FIG. 17D

Audit

From: 16 Sep 2018   To: 17 Sep 2018   Object types: Jobs, Pipelines, Contracts, ...

| Event time | Object | Operation | Actor | Description |
|---|---|---|---|---|
| 17 Sep 2018 17:30 UTC | Job (17914) | Started | John Smith (johns@citenanta.on... | Job started |
| 17 Sep 2018 15:30 UTC | Job (17912) | Started | John Smith (johns@citenanta.on... | Job started |
| 16 Sep 2018 12:40 UTC | Job (17910) | Aborted | John Smith (johns@citenanta.on... | Job aborted |
| 16 Sep 2018 10:45 UTC | Proposal (182572) | Created | John Smith (johns@citenanta.on... | Proposal created |
| ... | ... | ... | ... | ... |

Datasets
Assets
Contracts
Pipelines
Jobs
Queries
Audit

FIG. 17E

```
SELECT storeid,
       AVG(sumbyuser) as AvgByUser
FROM   (SELECT storeid,
               Sum(total) AS sumByUser
        FROM data
        WHERE timestamp > Dateadd(day, -7, Getdate())
        GROUP BY customerid,
                 storeid) byUser
            GROUP BY storeid
```

```
                                                      2120

SELECT  storeid,
        Round(avgofuserinstore, 2) AS Average
FROM    (SELECT storeid,
                Avg(sumbyuser)              AS avgOfUserInStore,
                 Count(DISTINCT customerid) AS dCountUser,
                 Min(mintime)               AS aggMinTime,
                Max(maxtime)                AS aggMaxTime
         FROM   (SELECT storeid,
                        customerid,
                        Sum(total)    AS sumByUser,
                         Min(timestamp) AS minTime,
                        Max(timestamp) AS maxTime
                 FROM data
                 WHERE timestamp > Dateadd(day, -7, Getdate())
                 GROUP BY customerid,
                          storeid) byUser
         GROUP BY storeid) grouped
WHERE   Datediff(hour, aggmaxtime, aggmintime) > 48
                        AND dcountuser > 20
```

FIG. 21B

SPECIFYING A NEW COMPUTATIONAL STEP OF A DATA PIPELINE

CROSS-REFERENCE TO RELATED APPLICATIONS

This application is continuation of U.S. patent application Ser. No. 16/665,916, filed on Oct. 28, 2019, entitled "User Interface for Building a Data Privacy Pipeline and Contractual Agreement to Share Data", which itself is a continuation-in-part of U.S. patent application Ser. No. 16/388,696, filed on Apr. 18, 2019, entitled "Data Privacy Pipeline Providing Collaborative Intelligence And Constraint Computing," the contents of each of which are herein incorporated by reference in their entirety.

BACKGROUND

Businesses and technologies increasingly rely on data. Many types of data can be observed, collected, derived, and analyzed for insights that inspire progress in science and technology. In many cases, valuable intelligence can be derived from datasets, and useful products and services can be developed based on that intelligence. This type of intelligence can help advance industries such as banking, education, government, health care, manufacturing, retail, and practically any other industry. However, in many cases, the datasets owned or available to a particular data owner are incomplete or limited in some fundamental way. Information sharing is one way to bridge gaps in datasets, and sharing data has become an increasingly common practice. There are many benefits from sharing data. However, there are also many concerns and obstacles.

SUMMARY

Embodiments of the present disclosure are directed to techniques for constructing and configuring a data privacy pipeline to generate collaborative data in a data trustee environment from shared input data. At a high level, an interface of the data trustee environment, such as a graphical user interface, can enable tenants (e.g., customers, businesses, users) or other contributing parties to specify parameters for a contractual agreement to share and access data. Generally, the interface can serve as a sandbox for parties to generate, contribute to, or otherwise configure a data privacy pipeline by selecting, composing, and arranging any number of input datasets, computational steps, and contract outputs. Example contract outputs include output datasets generated from a data privacy pipeline, permissible named queries on collaborative data, and the like.

To facilitate multi-party development of collaborative intelligence contracts, in some embodiments, the interface allows a contributing party to use placeholder elements in a pipeline under development. For example, a contributing party may want to build up components of a pipeline before an input dataset or computation has been provided or identified. As such, the interface may support building a pipeline or portion thereof with one or more unspecified "placeholder" elements, such as placeholder datasets or placeholder computations. For example, a placeholder dataset may include a specified input schema without specifying the actual input data. In another example, a placeholder computation may include a specified input and output schema without specifying the actual computation to be performed. This way, another party can subsequently fill in the placeholder element. Thus, the interface can facilitate multi-party contributions made to any desired portion of a pipeline in any order. Parameterized access control may authorize designated participants to access, view, and/or contribute to designated portions of a contact or pipeline. Once the parties are done building, authorized participants may indicate their approval, and the contract and corresponding pipeline may be deployed in a data trustee environment pursuant to the agreed upon parameters.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIGS. 17A-17E are illustrations of example user interfaces for browsing and interacting with accessible resources, in accordance with embodiments described herein;

FIG. 21B is an example of a corresponding query, in accordance with embodiments described herein;

DETAILED DESCRIPTION

Overview

Figure 1:
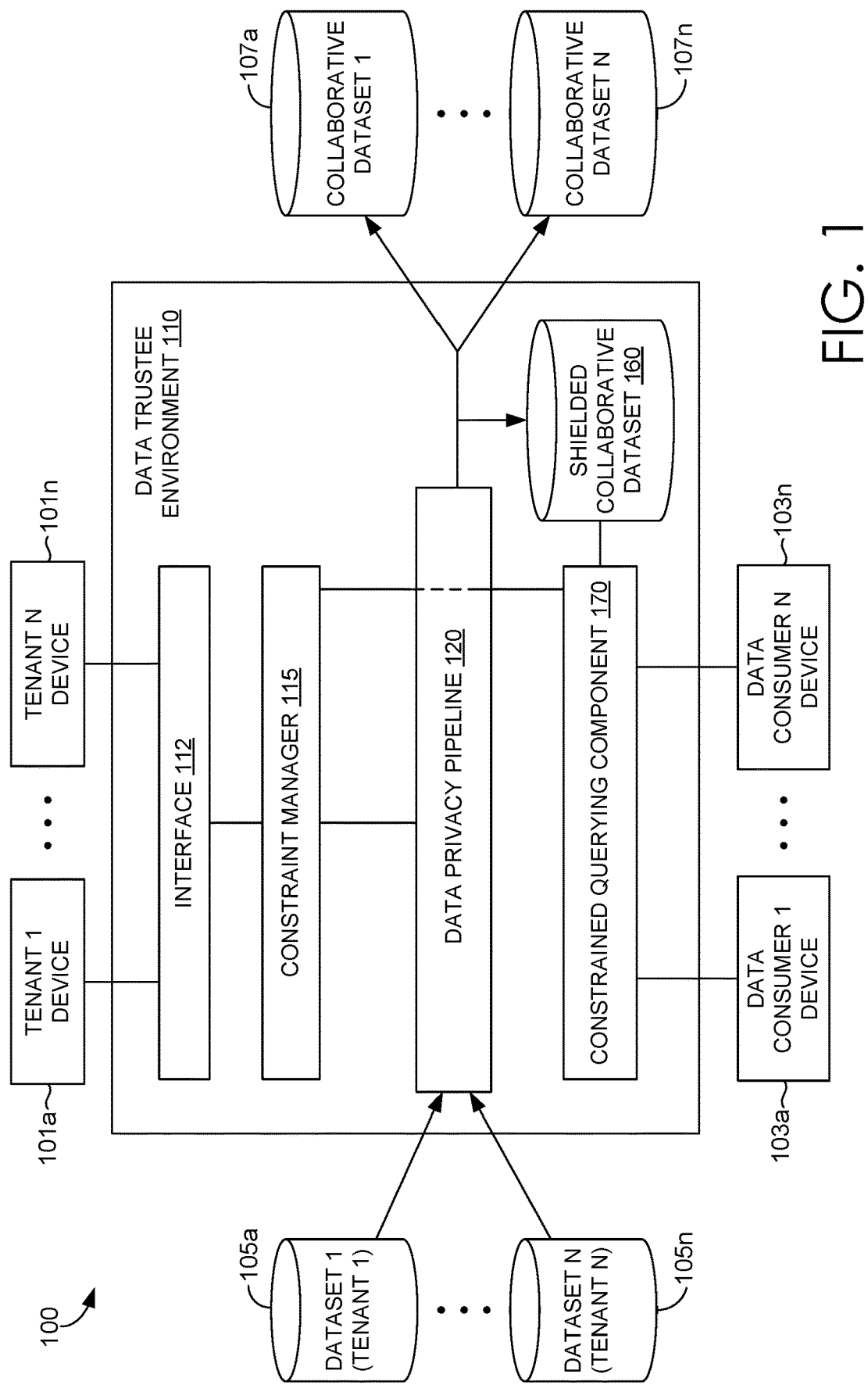
FIG. 1 is a block diagram of an example collaborative intelligence environment, in accordance with embodiments described herein.

There are many benefits from sharing data. For example, sharing data often leads to more complete datasets, encourages collaborative efforts, and produces better intelligence (e.g., understanding or knowledge of an event or circumstance, or information, relationships, and facts about different types of entities). Researchers benefit from more data being available. Further, sharing can stimulate interest in research and can incentivize the production of higher data quality. Generally, sharing can result in synergies and efficiencies in research and development.

However, there are also many concerns and obstacles to sharing data. As a practical matter, different industries vary in ability and willingness to share data. Issues with data privacy and confidentiality are fundamental to many industries such as health care and banking. In many cases, laws, regulations, and consumer demands place restrictions on the ability to share data. Furthermore, the act of observing, collecting, deriving, and analyzing datasets is often an expensive and labor-intensive exercise, and many have concerns that sharing data would give away a competitive advantage. Even when there is sufficient motivation to share data, issues with control and access to shared data are often an obstacle to sharing. In effect, the obstacles often prevent data sharing and the opportunities for progress that come with it. As such, there is a need for data sharing techniques that facilitate development of collaborative intelligence while ensuring data privacy and facilitating control and access to shared data.

Accordingly, embodiments of the present disclosure are directed to techniques for constructing and configuring a data privacy pipeline to generate collaborative data in a data trustee environment from shared input data. At a high level, an interface of the data trustee environment, such as a graphical user interface, can be provided to enable tenants (e.g., customers, businesses, users) and other designated contributors to specify parameters for a contractual agreement to share and access data. Generally, the interface can serve as a sandbox for parties to generate, contribute to, or otherwise configure a data privacy pipeline that can serve as the basis for a contractual agreement among the parties. The interface can allow authorized parties to select, compose, and arrange any number of pipeline inputs (e.g., input datasets), computational steps, and/or contract outputs (e.g., output datasets comprising collaborative data to be generated by a data privacy pipeline, permissible named queries on collaborative data, and the like). Thus, a data privacy pipeline may include contributions from multiple parties, and an agreed-upon pipeline can serve as the basis for a contract among the parties. Once the contributing parties are done building, authorized contributors may indicate their approval, and the contract and corresponding pipeline may be deployed in a data trustee environment pursuant to the agreed upon parameters. The process of building and deploying a multi-party pipeline can be thought of as spinning up a contract among the parties.

Generally, an authorized participant can build or contribute to a pipeline or contract, or some portion thereof. In some embodiments, access control may be parameterized to authorize designated participants to access, view, and/or contribute to designated portions of a pipeline or contact. This way, a participant may contribute certain elements such as computational scripts, or combinations of elements such as a network of computational steps, without exposing the elements. For example, the interface may permit participants to set visibility and/or editability properties (e.g., on an element-by-element basis) for elements that they contribute. Access control properties may be tailored to a particular user account, user group, or some other basis. As such, the interface can allow participants to selectively permit access to, viewing of, and/or editing of specific portions or even the entirety of a pipeline or contact in development.

A contractual agreement to generate collaborative data may include any number of parties or beneficiaries with differing rights, so the interface may facilitate specifying different roles for different user accounts, user groups, or the like. For example, a participant that provides data as an input dataset to a data privacy pipeline may be considered and designated a data owner. A participant that contributes an element such as a computation for a data privacy pipeline or contract may be considered and designated a contributor. A contributor may, but need not be a data owner, and vice versa. For example, and as explained in more detail below, a participant who defines an input or output schema for a pipeline need not be the same party that provides an input dataset for the pipeline. Accordingly, in some embodiments, it may be possible for a participant to contribute business logic (e.g., a software script implementing the logic) that, when deployed, runs on fused data from other participants, for example. Finally, a participant that is granted access to collaborative data generated by a data privacy pipeline, or granted access to query collaborative data to derive collaborative intelligence, may be considered and designated a data consumer. Generally, the interface can allow an authorized participant to designate an appropriate access role for a particular user account, user group, or some other basis for access.

In some embodiments, the interface may allow a contributor to specify one or more inputs to a data privacy pipeline. For example, the interface may allow a contributor to connect a new input dataset and specify or automatically import its input schema. In some cases, however, a contributor may want to build a pipeline before some or all potential input datasets are available. In other words, a contributor may want to build over a collaborator's data, but the contributor may not know what the data looks like yet. As such, in some embodiments, a contributor can specify an input schema for an unspecified "placeholder" dataset and can build computational steps that make use of the placeholder dataset, as explained in more detail below. Generally, a specified input schema for a dataset may define the form or structure for an input dataset to be provided. For example, a specified input schema may include an identification of a particular component of an input dataset (e.g., variable, array, vector, matrix, row, column, property) and one or more corresponding attributes (e.g., data type, description, dimensionality). As such, the interface may function with a placeholder dataset until another contributor pulls an actual dataset into the placeholder. Thus, placeholder datasets can provide a way to specify a placeholder input schema for use in a computational step before a corresponding dataset has been provided or otherwise identified. As such, placeholder datasets can be thought of as a possible building block for collaboratively generating a data privacy pipeline. Additionally or alternatively, the interface may allow a contributor to generate and transmit a notification to a collaborator requesting an input dataset (e.g., complying with a specified input schema). These and other ways to specify inputs to a data privacy pipeline, or parameters thereof, are contemplated within the present disclosure.

In some embodiments, the interface may allow a contributor to specify, connect, arrange, or otherwise configure computational steps for a data privacy pipeline. Generally, a pipeline may include any number of computational steps, and an authorized participant can create or modify computational steps for a particular pipeline. A specified computation step may include a specified computation platform (e.g., Javascript, Kusto Query Language, SparkQL, Python, C# Linq), a specified input to the computational step, a specified computation for the computational step, a specified output schema, some combination thereof, or otherwise.

Generally, a configured data privacy pipeline may be deployed as a distributed computing or cloud computing service (cloud service) implemented in a data trustee environment. The cloud service may be capable of running constrained versions of one or more computation platforms in a way that is compliant with collaborative intelligence (e.g., capable of performing constrained computing and/or constrained querying in a programming language of the computation platform). As such, in some embodiments, the interface may accept a specification of a compatible or supported computation platform capable of executing a corresponding computation step.

A specified input to a computational step generally identifies an input dataset, or parameters thereof, on which the computational step will operate. For example, a specified input to a particular computational step may include elements that identify an input dataset, a set of computational results that are output from another computational step, a placeholder dataset (e.g., a specified input schema), or otherwise. When creating a new computational step, for instance, an input dataset for the step may be selected from a set of available datasets. Available datasets may include datasets that were added or otherwise identified by a collaborating participant to a particular contract, datasets that are associated with a particular account (e.g., assets uploaded or otherwise accessible to a tenant account), or otherwise. If, on the other hand, a contributor wants to configure a step that runs on the output of an existing computational step or existing branch of a data privacy pipeline, the contributor may select the output of another computational step as the input for the new computational step. In this latter case, a contributor can add computational steps or build a pipeline that expands on an existing process or pipeline, or portion thereof. Additionally or alternatively, in some embodiments, a contributor may specify a placeholder dataset using a specified input schema for a computational step. These and other ways to specify inputs to a computational step, or parameters thereof, are contemplated within the present disclosure.

A specified computation for a computational step generally identifies one or more executable operations to be performed on a specified input to the computational step. A specified computation can be a template computation (e.g., map, reduce, fuse, unfold, append, filter, split, or the like, or more generally any type of arithmetic operation, aggregation, summarization, filtering, sorting, bounding, or other computation), a custom computation (e.g., identified from an existing set of assets or provided through an associated script editor), some combination thereof, or otherwise.

A specified output schema for a computational step may define the form or structure of the computational result of the step. For example, a specified output schema may include an identification of a particular component of a computational result (e.g., variable, array, vector, matrix, row, column, property) and one or more corresponding attributes (e.g., data type, description, dimensionality). In some embodiments, the output schema may be the only element of a computational step that is exposed to a collaborating participant.

In some embodiments, a contributor can define a contract or pipeline (or some portion thereof) with a computational step that has an unspecified "placeholder" computation. This way, some other authorized contributor can subsequently specify a computation to be run on an input and/or output defined by the author of the step. Thus, in some embodiments, an authorized participant to a contract in development can contribute to a pipeline by subsequently filling in a placeholder computation. As long as the contributor specifies a computation that operates on data that is compatible with the previously specified input schema and/or that outputs data that is compatible with a previously specified output schema, the computation will comply with the step. In this manner, an author of a contract, pipeline, or computational step can define a desired output schema and/or a set of specified constraints (e.g., remove city and blood pressure), without the need to have all the actual computations specified. Thus, placeholder computations can be thought of as another possible building block for collaboratively generating a data privacy pipeline. Although placeholder datasets and placeholder computations are described as two possible placeholder elements, in some embodiments, the interface may support specification of a pipeline or portion thereof (e.g., a computational step) with some other unspecified placeholder element (e.g., placeholder input schema, output schema, pipeline output). As such, techniques described herein can facilitate multi-party contributions to any desired portion of a pipeline.

At a high level, the interface described herein may support specifying outputs, or parameters thereof, to be generated based on an agreement to share and access data. As explained above, the interface can serve as a sandbox for one or more parties to generate a pipeline with any number of input datasets and computational steps that in operation can generate an output dataset of collaborative data. In some embodiments, the interface may additionally or alternatively facilitate specification of one or more constraints to be applied to pipeline computations (constrained computations) and/or to queries on an output dataset (constrained querying). More generally, the user interface can be thought of as facilitating a contractual agreement to share and access data, where the agreement has one or more contract outputs (e.g., output dataset, a set of named or whitelisted queries). Thus, in some embodiments, the interface may enable one or more participants to specify parameters for contract outputs.

Generally, the computational result of any particular computational step may be specified as an output dataset, and a designated storage location and a set of authorized data consumers may be specified. In embodiments where the output dataset is exposed, the output dataset can be thought of as an unshielded dataset. Additionally or alternatively, a shielded location can be specified for an output dataset, and access to the output dataset may restricted in full or in part. In this case, the output dataset can be thought of as a shielded dataset.

In some embodiments, one or more named queries can be specified as a contract output to an agreement to share and access data. For example, a specified named query can include one or more elements that identify a particular computational result that may be queried (e.g., stored in a data trustee environment as a shielded dataset), a specified computation platform (e.g., Javascript, Kusto Query Language, SparkQL, Python, C# Linq), and a specified computation for a named query. In some embodiments, specification of a computational result on which a named query may operate can serve as an indication that the computational result should be used as a shielded output dataset on which one or more designated data consumers can run queries. The specified computation for a named query may be a template computation (e.g., map, reduce, fuse, unfold, append, filter, split, or the like, or more generally any type of arithmetic operation, aggregation, summarization, filtering, sorting, bounding, or other computation), a custom computation (e.g., identified from an existing set of assets or provided through an associated script editor), some combination thereof, or otherwise.

Generally, the interface may facilitate approval of a developed pipeline and/or contractual agreement to share and access data. In some embodiments, the interface can provide access to a contract summary and prompt participants for an indication of assent. If any of the terms of the contract change (e.g., a portion of a specified pipeline), prior approvals may be invalidated. Once all parties have approved of the contract, the contract and corresponding pipeline may be deployed.

As such, the techniques described herein facilitate multi-party development of collaborative intelligence contracts while maintaining data privacy. Generally, a data trustee environment can be configured to derive collaborative intelligence for tenants subject to configurable constraints. The data trustee environment can be further configured for multi-party collaborations by providing a sandboxing interface, such as a graphical user interface, that lets participants design their own data privacy pipelines. The interface can provide options for including placeholder datasets and placeholder computations to facilitate development of pipeline elements in any particular order. Parameterized access control can be implemented to ensure data privacy over designated portions of a pipeline. Thus, the techniques described herein can facilitate specialization of function in generating collaborative intelligence, without exposing underlying raw data provided by the data owners or collaborative data shielded by the trustee environment.

Example Sandbox Interface for Building a Data Privacy Pipeline

Referring now to FIG. 1, a block diagram of example collaborative intelligence environment 100 suitable for use in implementing embodiments of the invention is shown. Generally, collaborative intelligence environment 100 is suitable for generation of collaborative intelligence, and, among other things, facilitates constraint computing and constraint querying. Collaborative intelligence environment 100 or a portion thereof (e.g., data trustee environment 110) may, but need not, be implemented in a distributed computing environment such as distributed computing environment 2400, discussed below with respect to FIG. 24. Any or all of the components of collaborative intelligence environment 100 can be implemented as any kind of computing device, or some portion thereof. For example, in an embodiment, tenant devices 101a through 101n and data consumer devices 103a through 103n can each be a computing device such as computing device 2500, as described below with reference to FIG. 25. Further, data trustee environment 110 may be implemented using one or more such computing devices. In embodiments, these devices can be any combination of a personal computer (PC), a laptop computer, a workstation, a server, a mobile computing device, a PDA, a cell phone, or the like. The components of collaborative intelligence environment 100 may communicate with each other via one or more networks, which may include, without limitation, one or more local area networks (LANs) and/or wide area networks (WANs). Such networking environments are commonplace in offices, enterprise-wide computer networks, intranets, and the Internet.

Collaborative intelligence environment 100 includes data trustee environment 110 that is capable of deriving collaborative data and/or collaborative intelligence from raw data provided by data owners or providers (e.g., tenants) subject to configurable constraints, without sharing the raw data. Generally, any number of tenants can input their data (e.g., datasets 105a through 105n) into data trustee environment 110 and designate one or more constraints (e.g., from one of tenant devices 101a through 101n). Data trustee environment 110 can derive collaborative data (e.g., collaborative datasets 107a through 107n, shielded collaborative dataset 160) based on the one or more constraints. Any number of data consumers (e.g., operating one of data consumer devices 103a through 103n) may issue queries on shielded collaborative dataset 160, and data trustee environment 110 may derive collaborative intelligence from shielded collaborative dataset 160, subject to the one or more constraints. In some cases, an authorized data consumer (e.g., which may be defined by one or more of the constraints) may be the same person or entity that owns or provided raw data (e.g., one or more of datasets 105*a* through 105*n*) or owns the derived collaborative data (e.g., shielded collaborative dataset 160). In some cases, an authorized data consumer may be some other person or entity.

In the embodiment illustrated in FIG. 1, data trustee environment 110 includes interface 112, constraint manager 115, data privacy pipeline 120, and constrained querying component 170. At a high level, tenants that seek to share data and other designated contributors can interact with interface 112 to specify parameters for a contractual agreement to share and access data. Generally, interface 112 can cause presentation of a user interface that serves as a sandbox for parties to generate, contribute to, or otherwise configure a data privacy pipeline (such as data privacy pipeline 120), which can serve as the basis for a contractual agreement among the parties. Various types of pipelines are possible and may include any number of pipeline inputs (e.g., input datasets), computational steps, and/or output datasets to be generated. A data privacy pipeline can be provided as a distributed computing or cloud computing service (cloud service) implemented in the data trustee environment 110, and can be spun up and spun down as needed. Constraint manager 115 can monitor and orchestrate the use of, generation of, and access to collaborative data subject to the specified specify parameters for the agreement. The specified parameters and other features of the agreement may be stored in a contact database (not depicted) accessible to constraint manager 115. Constrained querying component 170 can apply constraint querying to allow authorized data consumers (e.g., operating one of data consumer devices 103*a* through 103*n*) to query collaborative data (e.g., shielded collaborative dataset 160) in data trustee environment 110 subject to the specified parameters. Generally, the components of data trustee environment 110 may correspond to the components of data trustee environment 1810 of FIG. 18, which is described in more detail below.

In some embodiments, interface 112 can cause a presentation of a graphical or other visual user interface that includes any arrangement and orientation of interaction elements capable of receiving inputs that specify parameters for a data privacy pipeline and a corresponding agreement to share data. The user interface may allow authorized parties to select, compose, and arrange any number of pipeline inputs (e.g., input datasets), computational steps, and/or contract outputs (e.g., output datasets comprising collaborative data to be generated by a data privacy pipeline, permissible named queries on collaborative data, and the like). In some embodiments, interface 112 can be implemented as a web service that prompts users on client devices to specify parameters through a series of related pages, screens, and/or other interface elements. An example implementation of interface 112 may cause presentation, on a client device, of one or more of the user interfaces depicted in FIGS. 3-17 and described in more detail below. Although in some embodiments, various user interfaces are described as being a graphical user interface, this need not be the case. Other examples of possible interfaces includes programmatic interfaces, command line interfaces, menu-driven interfaces, form-based interfaces, natural language interfaces, gesture-driven interfaces, optical interfaces, haptic interfaces, and 3D interfaces, to name a few. Generally, any suitable interface capable of implementing the functionality described herein is contemplated within the scope of the present disclosure.

Figure 2:
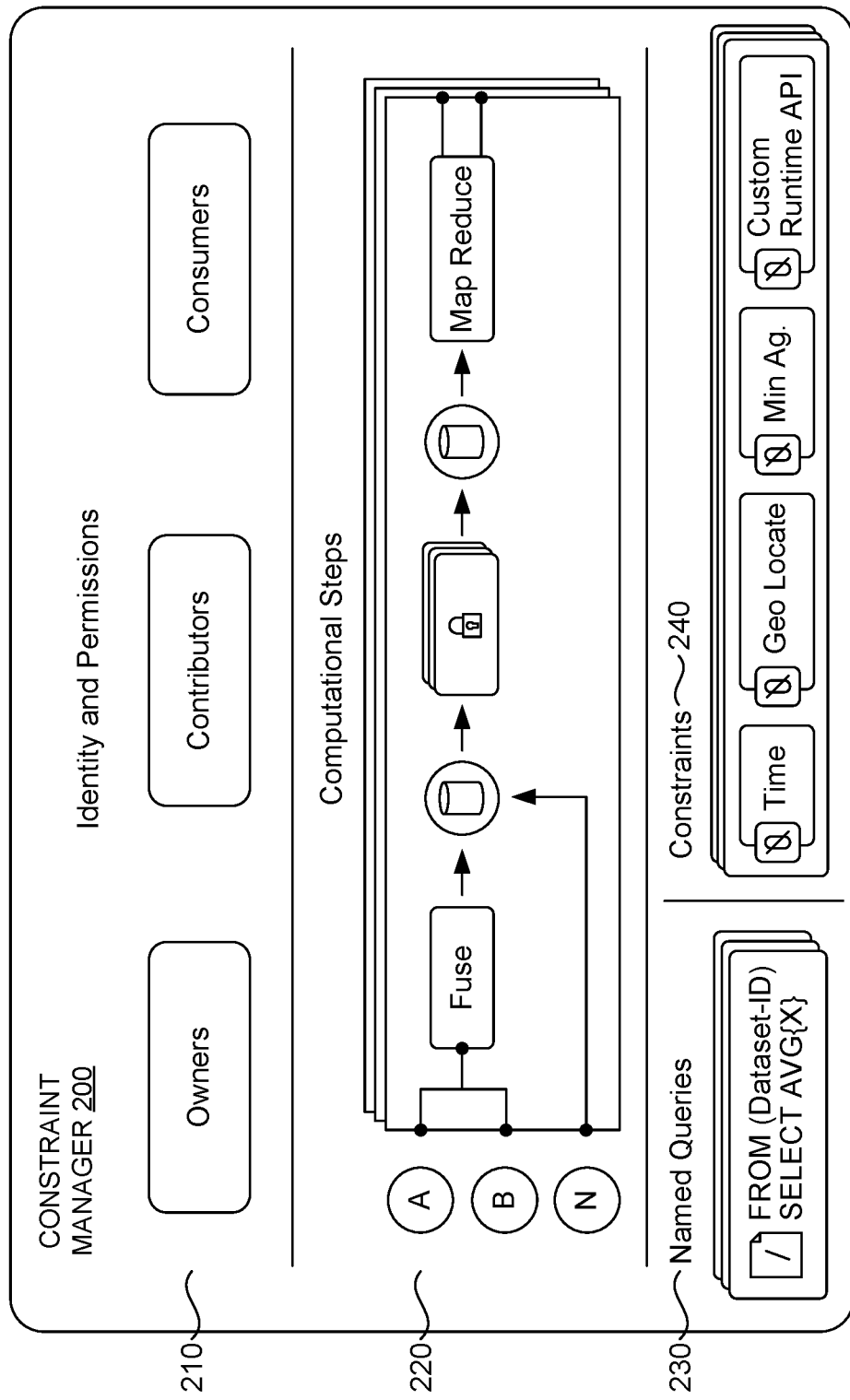
FIG. 2 is a block diagram of an example constraint manager, in accordance with embodiments described herein.

Generally, interface 112 can prompt contributors to a data privacy pipeline to specify various parameters for the pipeline or the corresponding agreement, and constraint manager 115 can store the parameters and orchestrate deploying the pipeline and contract. FIG. 2 illustrates an example constraint manager 200, which may correspond to constraint manager 115 of FIG. 1. For any given project (e.g., contract under development), constraint manager 200 may store a set of roles 210, an arrangement of computational steps 220 that form a data privacy pipeline, permissible named queries 230, and specified constraints 240. For example, the set of roles 210 may include a designation of data owners, authorized contributors, and authorized data consumers. The roles 210 may be applied on an element-by-element basis to different elements of computational steps 220 in order to parameterize access control on an element-by-element basis. For example, computational steps 220 may authorize data owners to provide an input dataset into slots A and/or B, and may authorize a contributor to provide a computational script through slot N.

Generally, a specified computation step may include a specified computation platform (e.g., Javascript, Kusto Query Language, SparkQL, Python, C# Linq), a specified input to the computational step, a specified computation for the computational step, a specified output schema, some combination thereof, or otherwise. In FIG. 2, computational steps 220 are illustrated with an example configuration of a selection of these elements, including slots for inputs A and B, template fuse and map reduce computations, slot N for a custom computation, and a set of unexposed computations (illustrated with a padlock symbol). This configuration is meant merely as an example, and any suitable computational step may be specified.

Figure 3:
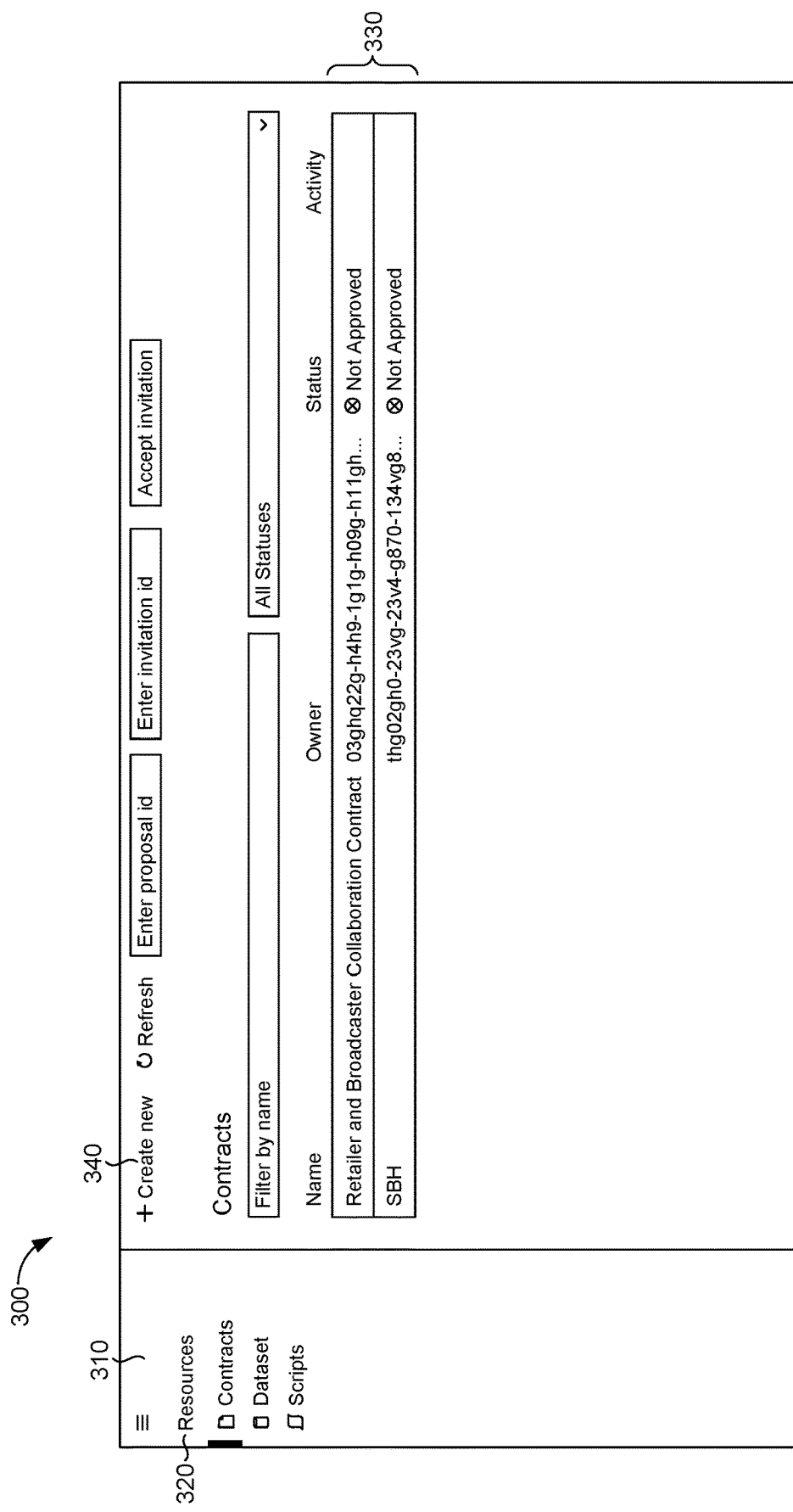
FIG. 3 is an illustration of an example user interface for browsing collaborative intelligence contracts, in accordance with embodiments described herein.

FIGS. 3-17 illustrate a variety of example user interfaces capable of receiving inputs for constructing and configuring a data privacy pipeline to generate collaborative data. FIG. 3 is an illustration of an example user interface 300 for browsing collaborative intelligence contracts. User interface 300 may be accessible through a portal of a distributed or cloud computing service, such as AZURE®, by Microsoft Corporation of Redmond, Washington More specifically, a collaborative intelligence service may be associated with an authorized tenant account, thereby granting access to the collaborative intelligence service through the tenant account. User interface 300 is an example interface that allows a user to browse assets that are available to the tenant account, such as existing collaborative intelligence contracts for which the tenant account is an authorized participant. For example, banner 310 may provide a resources menu 320 that allows a user to browse existing contracts, accessible datasets (e.g., stored by the tenant account), accessible scripts (e.g., stored by the tenant account), pipelines (e.g., for which the tenant account is authorized), jobs (e.g., initiated by, associated with, or otherwise accessible by a tenant account), queries (e.g., initiated by, associated with, or otherwise accessible by a tenant account), audit events (e.g., operations relevant to one of the foregoing resources that were initiated by, associated with, or otherwise accessible by a tenant account), and the like. In the example illustrated in FIG. 3, available contracts are selected for browsing from resources menu 320, and user interface 300 presents existing contracts 330, including an indication of the status of each contract. The presented contracts 330 may be selectable for viewing and/or editing. User interface 300 may include an interaction element 340 that accepts an input indicating a new contract should be created.

User interface 300 provides an example interface for browsing collaborative intelligence contracts. Other interfaces corresponding to other resources are not depicted, but may be implemented with functionality corresponding to a resource being browsed. For example, a user interface configured to browse available scripts may allow filtering by name, owner, and/or script type (e.g., computational platform, category of functionality, and the like). In another example, a user interface configured to browse available datasets may present or otherwise make available (e.g., by clickable link or menu) information about the dataset, such as name, identifier, owner, storage location, creation time, last read time, last write time, tags associated with the dataset, and/or any other type of relevant information. Generally, a user interface configured to browse an available resource may include functionality that allows a user to create, select, edit, delete, grant access to, or otherwise manipulate properties of a particular resource. Example implementations of such functionality are described in more detail below.

Figure 4:
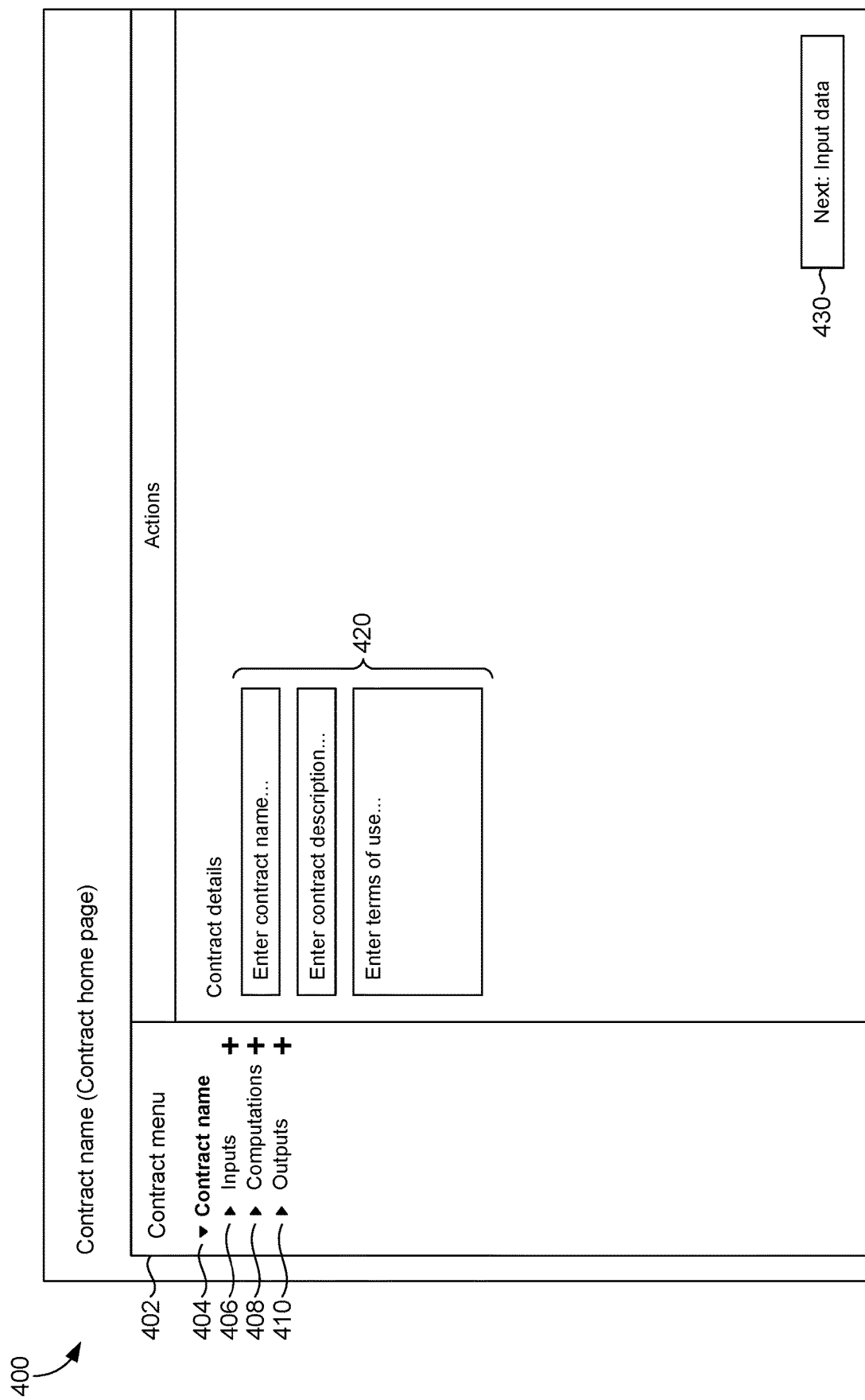
FIG. 4 is an illustration of an example user interface for naming a new collaborative intelligence contract, in accordance with embodiments described herein.

In some embodiments, when an input indicating a new contract should be created is received, a user interface may prompt for inputs that specify parameters of the new contract. For example, FIG. 4 is an illustration of an example user interface 400 for naming a new collaborative intelligence contract. User interface 400 may include a contract menu 402 that presents a representation of the new contract. For example, contract menu 402 may include a nested menu item 404 representing the new contract. The nested menu item 402 may be expanded to present selectable representations of the elements of the new contract, such as inputs 406, computations 408, and outputs 410. Generally, menu items from contract menu 402 may be similarly expandable, and selecting a menu item from contract menu 402 may prompt a user to enter or edit parameters corresponding to the selected menu item. For example, selecting menu item 404 representing the new contract can prompt for inputs (e.g., via input fields 420) specifying details for the new contract. In this example, the inputs include contract name (e.g., "Advertising efficiency"), a brief description of the contract (e.g., "how well ads work"), and a textual description of the proposed terms of use. When the user is finished, selection of an interaction element (e.g., next button 430) can navigate the user to a subsequent screen. Similar or other navigational interaction elements may be presented to navigate through a series of related pages, screens, and/or other interface elements.

Figure 5:
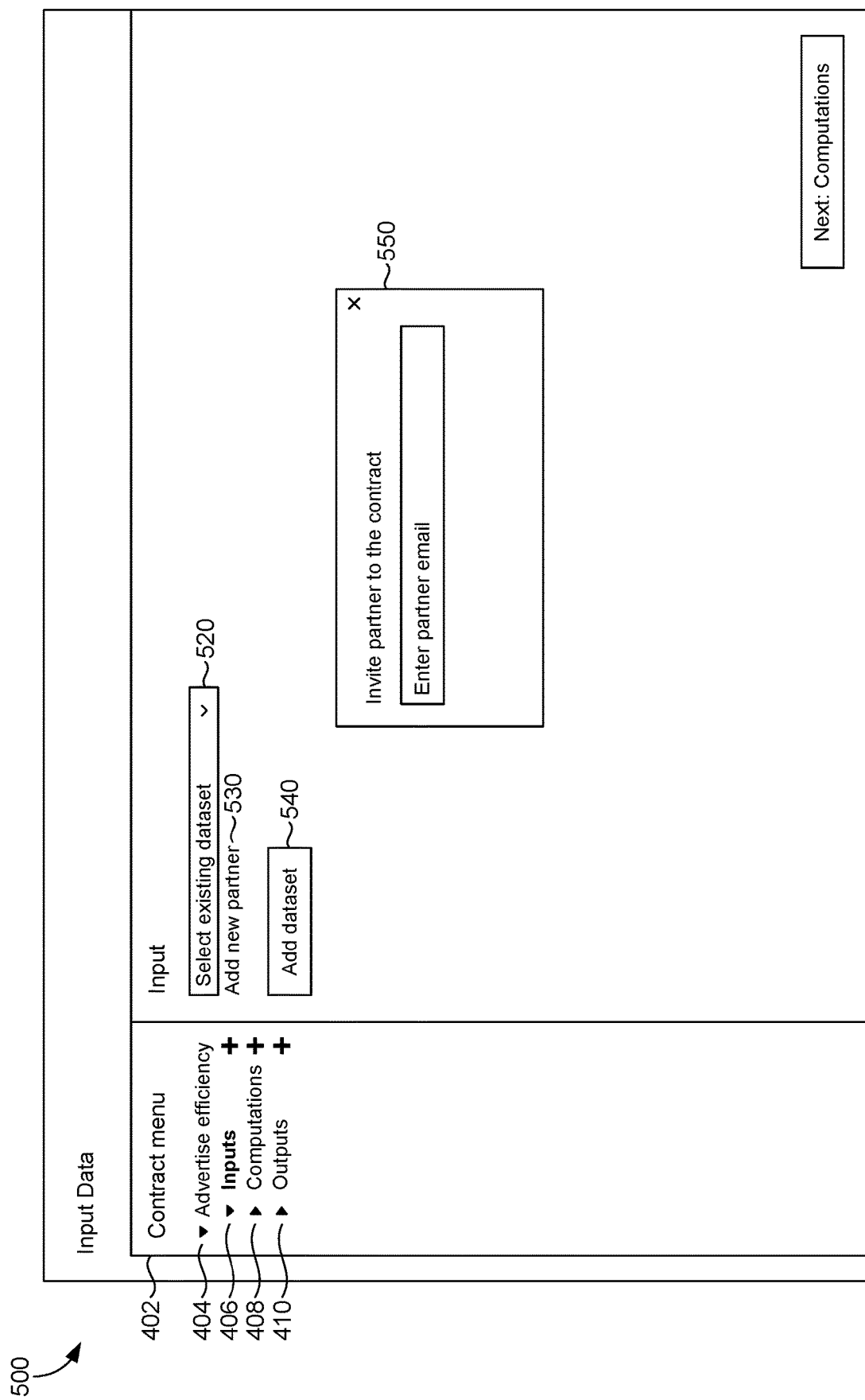
FIG. 5 is an illustration of an example user interface for specifying inputs to a data privacy pipeline associated with a collaborative intelligence contract, in accordance with embodiments described herein.
Figure 6:
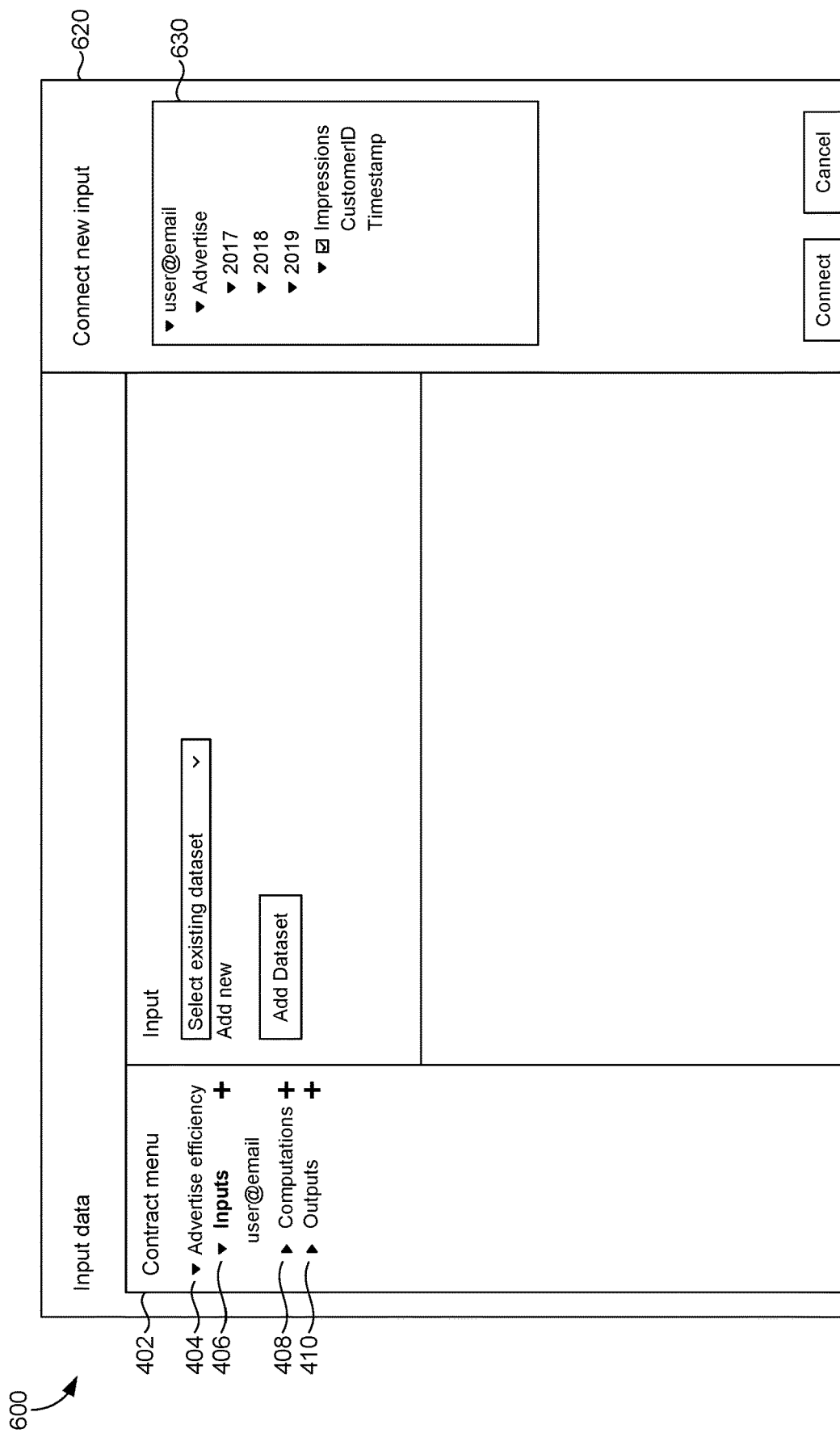
FIG. 6 is an illustration of another example user interface for specifying inputs to a data privacy pipeline associated with a collaborative intelligence contract, in accordance with embodiments described herein.

FIG. 5 is an illustration of an example user interface 500 for specifying inputs to a data privacy pipeline associated with a collaborative intelligence contract. In user interface 500, menu item 404 has been renamed to reflect the specified name of the new contract (Advertise efficiency). Selection of menu item 406 for the contract inputs may prompt the user to enter parameters for the inputs. For example, interaction element 520 can allow a user to select an existing, accessible dataset (e.g., stored by the tenant account). In another example, interaction element 530 can allow a user to invite a contributor to the contract or otherwise associate an account with the contract (e.g., by specifying an email address or some other indication of a particular account in popup window 550). In yet another example, interaction element 540 can allow a user to connect a new input dataset. For example, selection of interaction element 540 can cause a presentation of a directory of available datasets (e.g., local datasets available for upload, authorized datasets associated with a participating contributor account, datasets associated with a selected project or contract). FIG. 6 depicts an example user interface 600 with a panel 620 that presents a directory 630 of available datasets. An available dataset (e.g., Impressions) can be selected and connected, to associate the selected dataset with an active contract (e.g., associated with a selected element in contract menu 402).

Figure 7A:
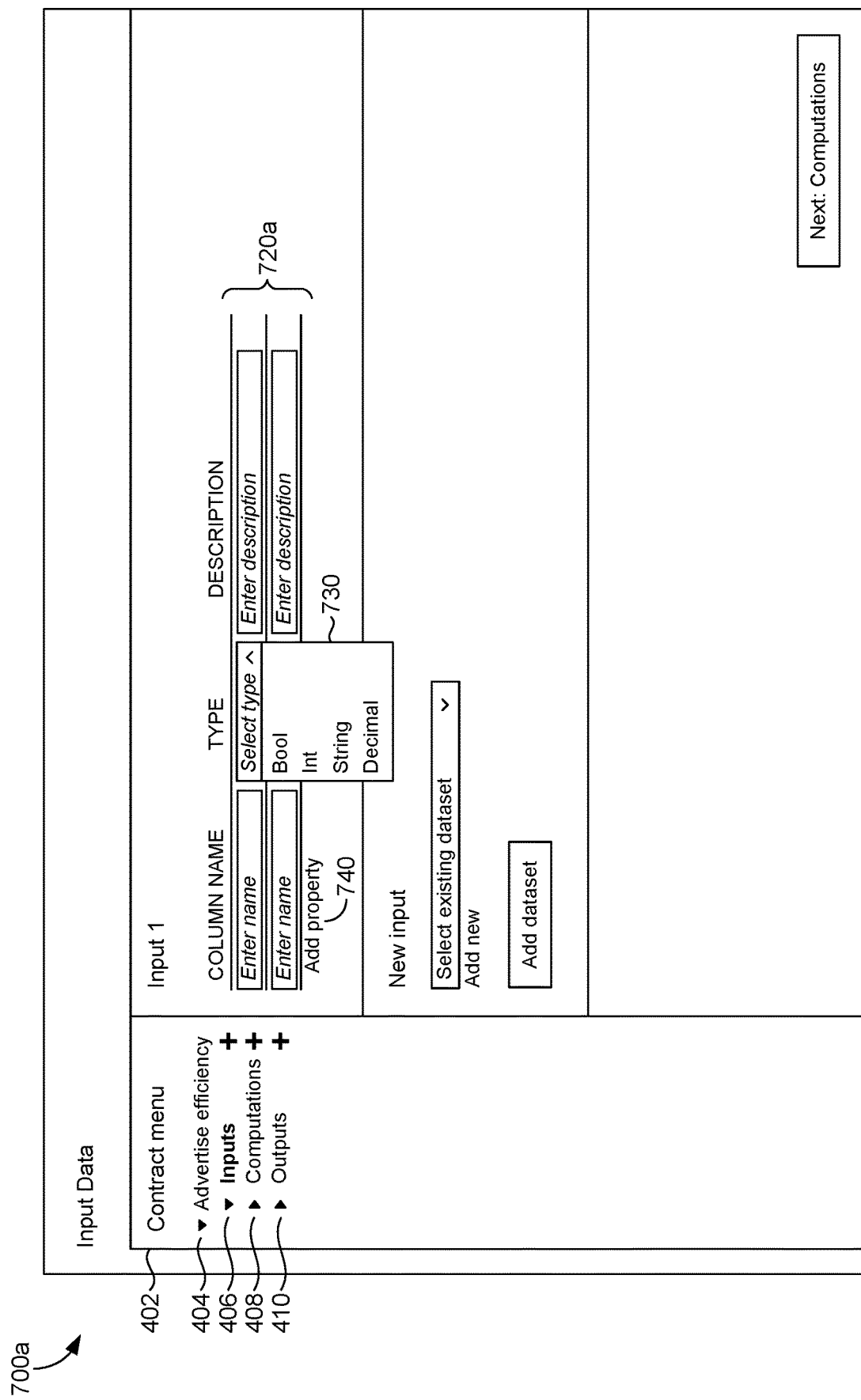
FIGS. 7A-B are illustrations of example user interfaces for specifying an input schema for an input dataset associated with a collaborative intelligence contract, in accordance with embodiments described herein.
Figure 7B:
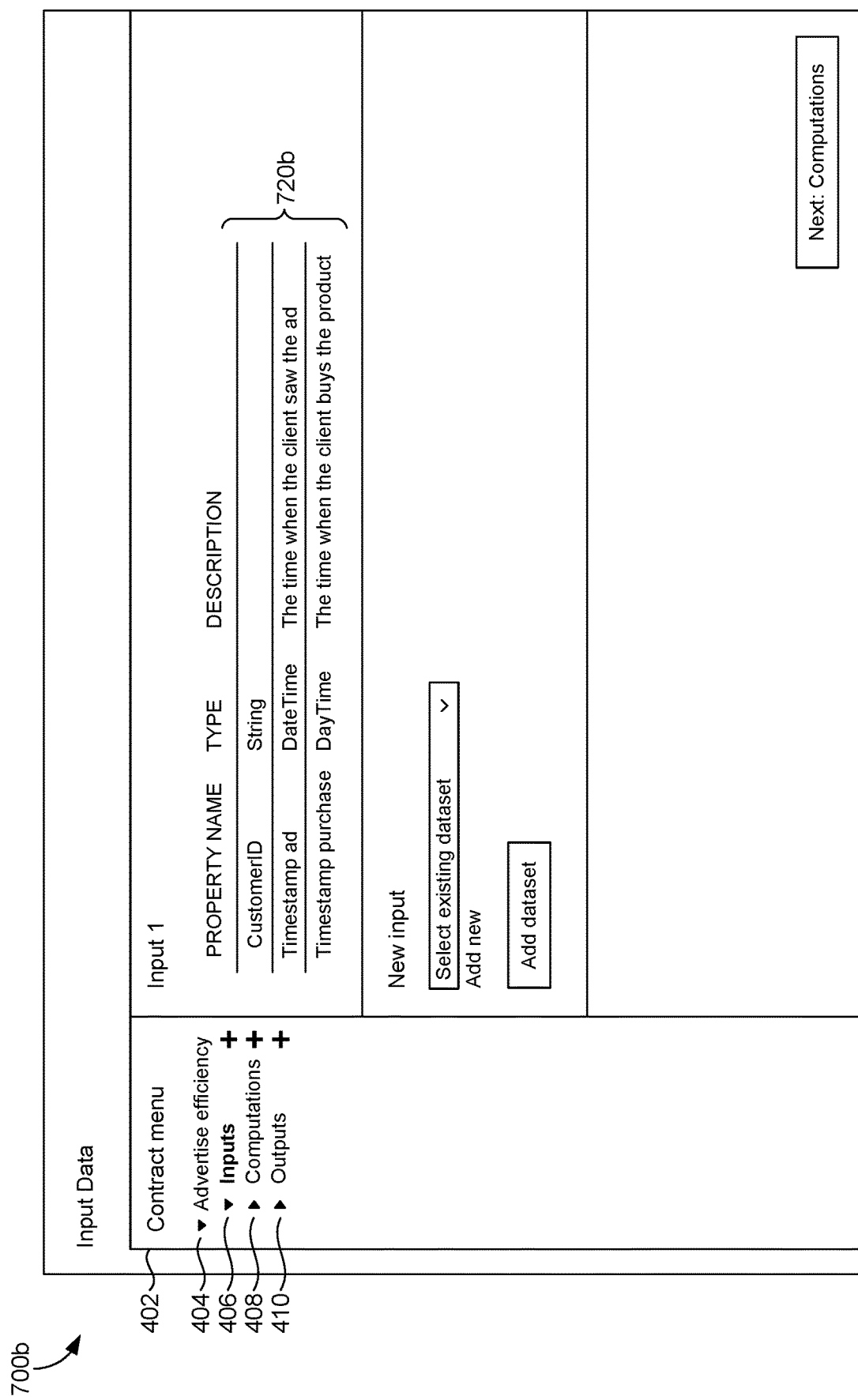

In some embodiments, an input schema for an input dataset may be specified. FIGS. 7A-B illustrate example user interfaces 700a and 700b for specifying an input schema. User interface 700a of FIG. 7A includes input fields 720a that allow a user to define parameters of an input schema for an input dataset. For example, a specified input schema may include an identification of a particular component of an input dataset (e.g., variable, array, vector, matrix, row, column, property) and one or more corresponding attributes (e.g., name, data type, description, dimensionality). If a user is connecting a new input dataset, input fields 720a may allow the user to specify particular portions of the input dataset to connect (e.g., designated columns). If a user is specifying a placeholder dataset, input fields 720a may allow the user to specify an input schema for an input dataset to be provided at some point in the future. In some embodiments, a menu of available options (e.g., dropdown menu 730) may be limited to a set of detected or compatible values. In some embodiments, new properties can be added to the set of input fields 720a (e.g., by selecting an interaction element such as add property 740). User interface 700b of FIG. 7B illustrates an example in which input fields 720b are automatically populated (e.g., detected from a connected input dataset). These are just a few examples, and other variations for specifying an input schema for an input dataset are contemplated.

Figure 8A:
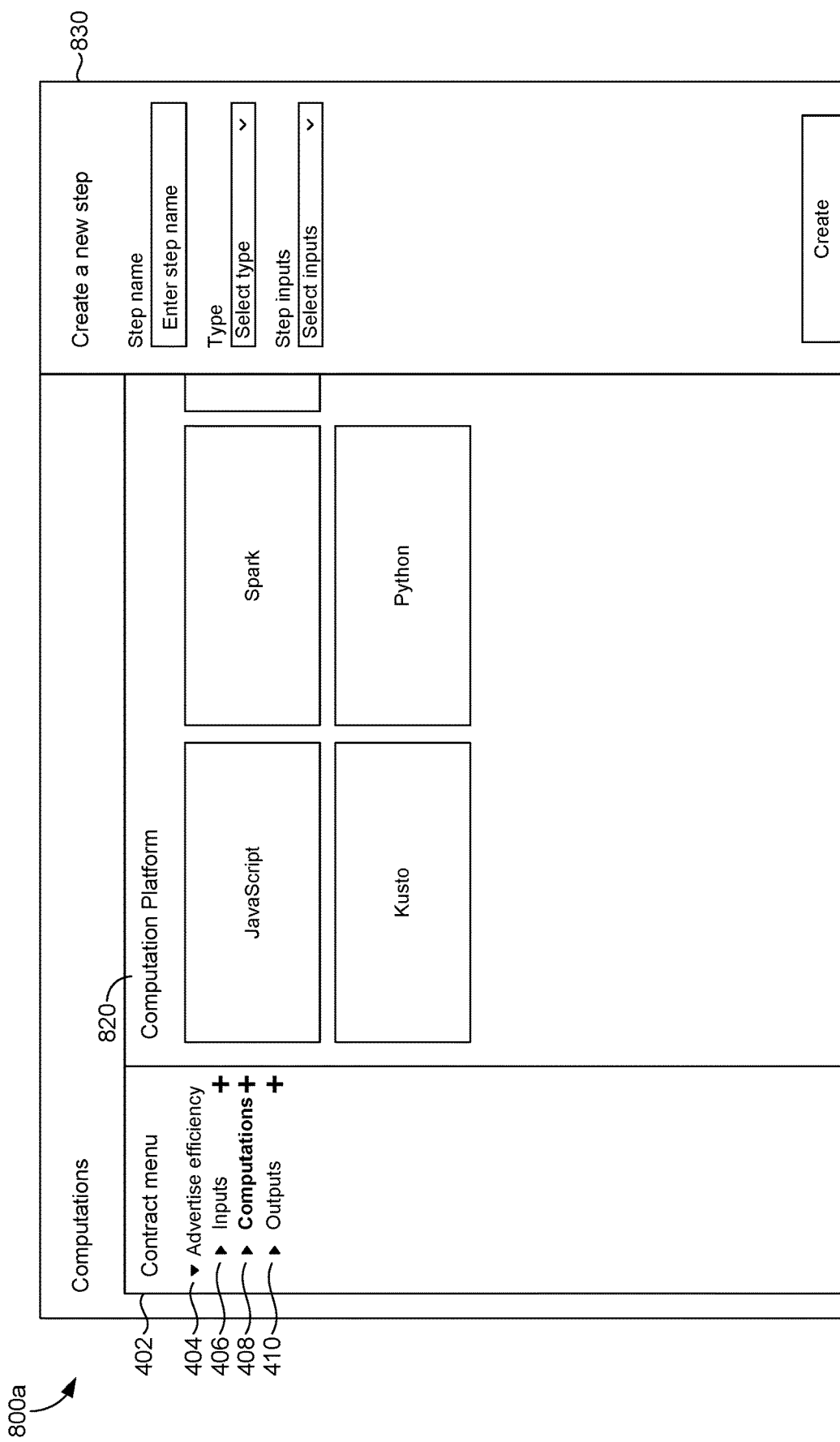
FIGS. 8A-C are illustrations of example user interfaces for creating a new computational step in a data privacy pipeline associated with a collaborative intelligence contract, in accordance with embodiments described herein.
Figure 8B:
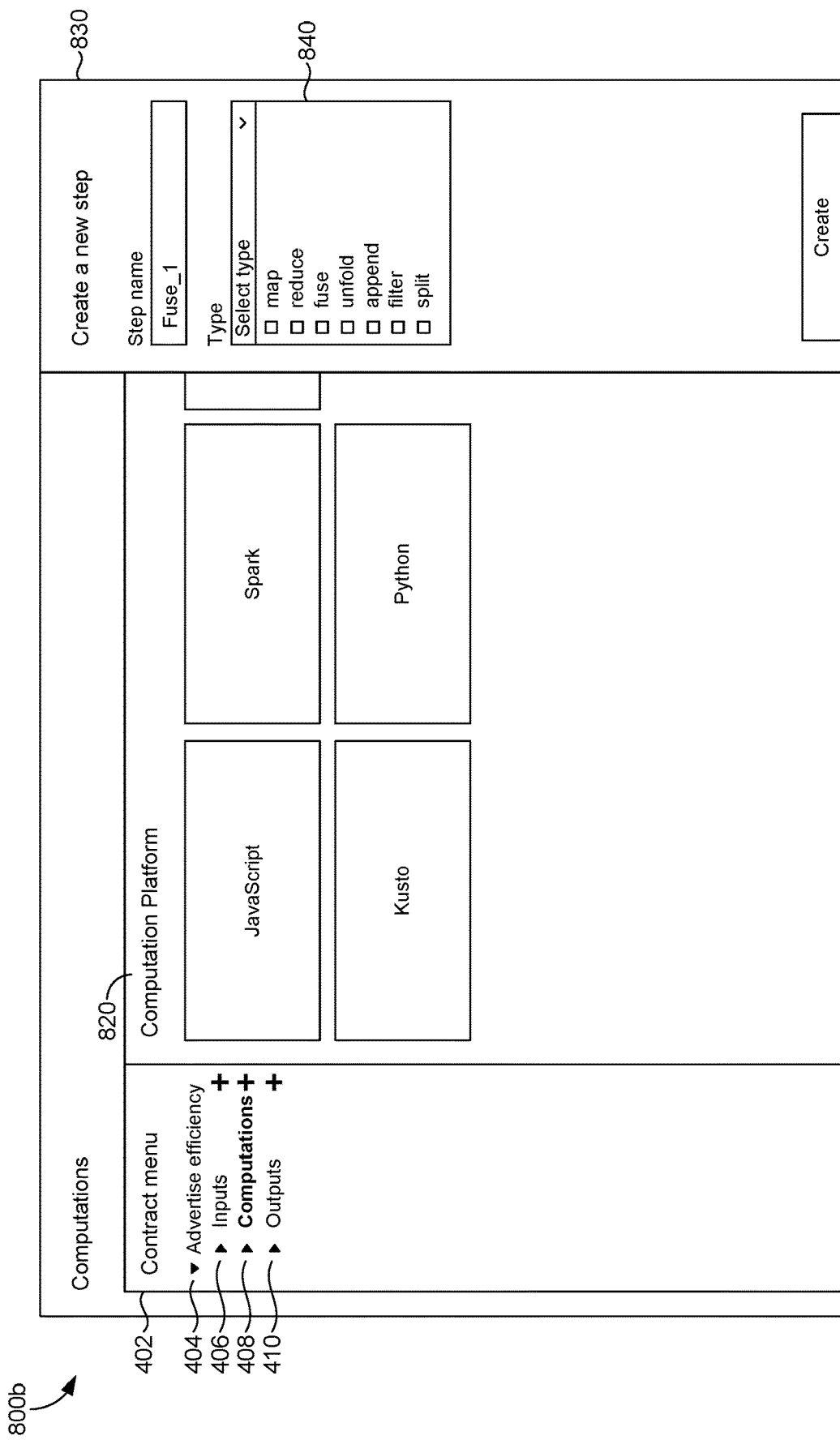
Figure 8C:
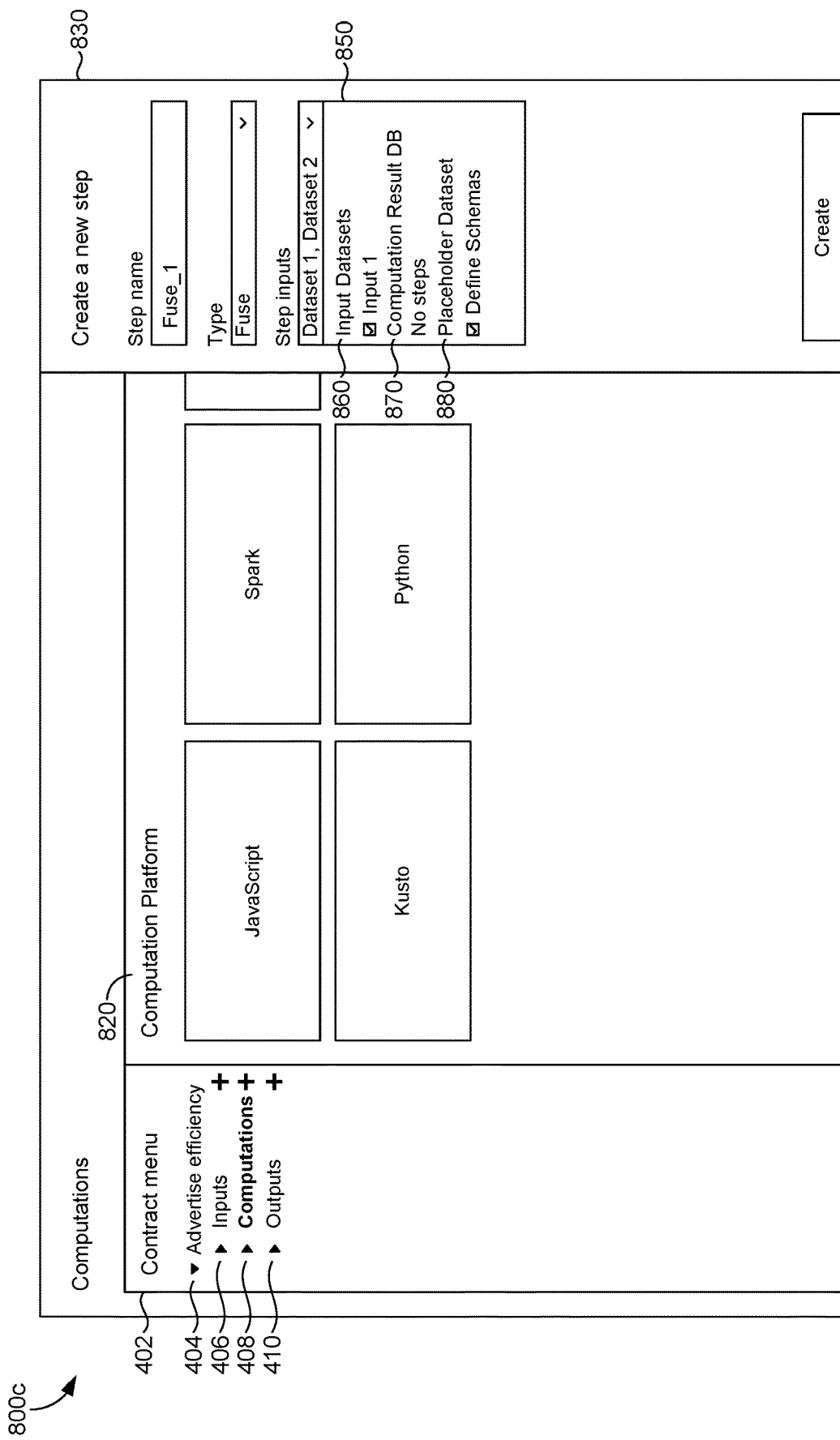

FIGS. 8A-C are illustrations of example user interfaces 800a, 800b, and 800c for creating a new computational step in a data privacy pipeline associated with a collaborative intelligence contract. Generally, selection of an interaction element associated with a menu item in contract menu 402 (e.g., the plus sign next to the computations menu item 408 in contract menu 402 in FIG. 8A) can prompt a user to specify parameters for an associated new element (e.g., a new computational step). For example, panel 820 of FIG. 8A can prompt a user to select a compatible or supported computation platform capable of executing a specified computation step. Panel 830 can prompt a user to select parameters such as step name, step type, and step inputs. FIG. 8B illustrates an example new step called Fuse_1. In FIG. 8B, the step type input field includes an interactive dropdown menu 840 that accepts a selection of one or more template computations. In FIG. 8C, a template fuse computation has been selected for the step type. Also in FIG. 8C, the step inputs field includes an interactive dropdown menu 850 that accepts a selection of one or more computational step inputs. For example, available computational step inputs may include connected inputs 860, computational results 870 (i.e., an output of an existing computational step associated with the project or contract), and placeholder datasets 880. In FIG. 8C, dropdown menu 850 presents an indication that there are no computational results available (e.g., because, in this example, Fuse_1 is the first computational step for this particular contract). In the example illustrated by FIG. 8C, the user has selected two inputs to the Fuse_1 computational step: one of the input datasets 860 (i.e., the input dataset that was connected in association with FIG. 6) and a placeholder dataset 880 (i.e., an indication to define an input schema for a placeholder dataset). These and other variations for specifying inputs to a computational step may be implemented.

Figure 9A:
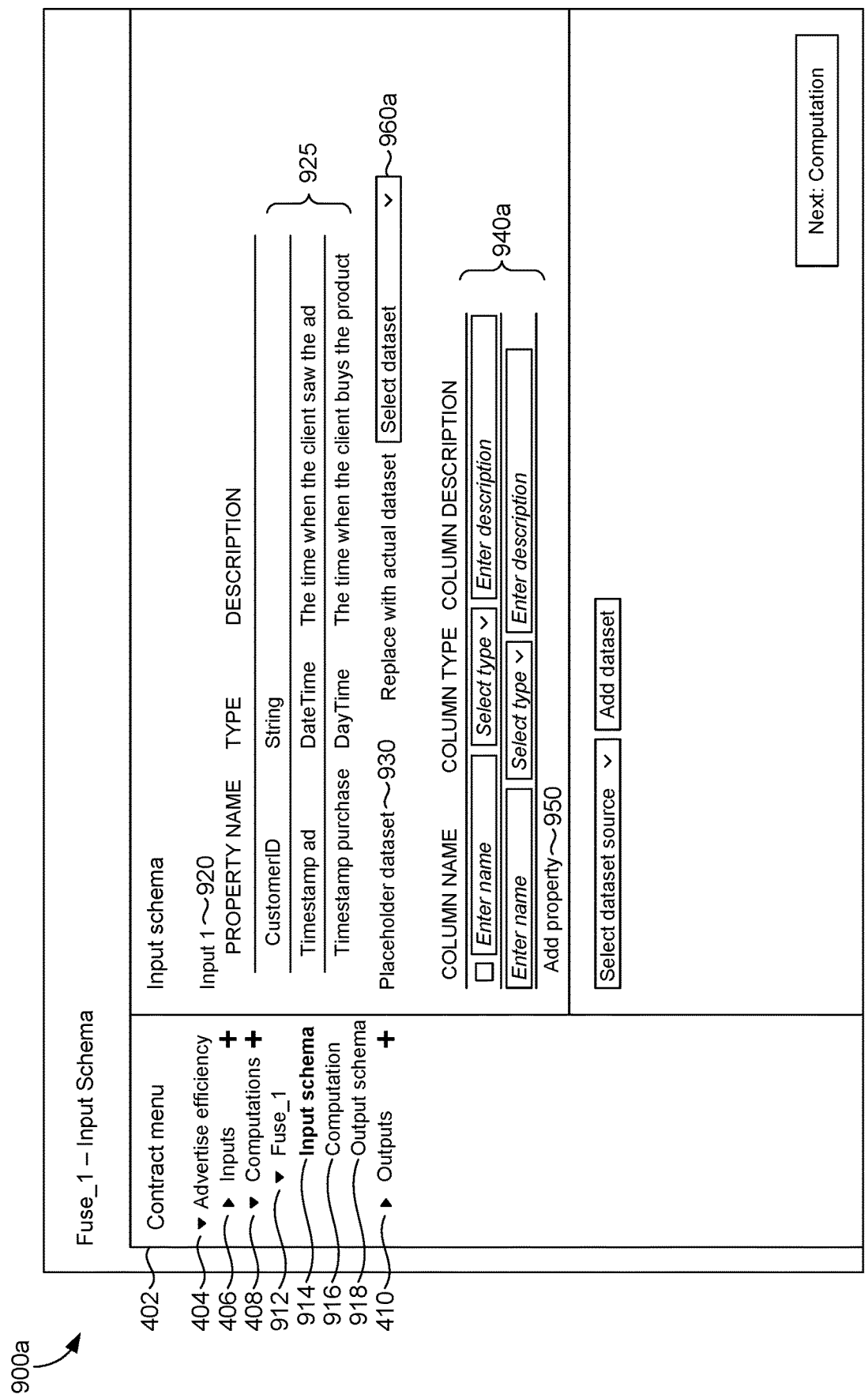
FIGS. 9A-B are illustrations of example user interfaces for specifying an input schema for a computational step in a data privacy pipeline associated with a collaborative intelligence contract, in accordance with embodiments described herein.
Figure 9B:
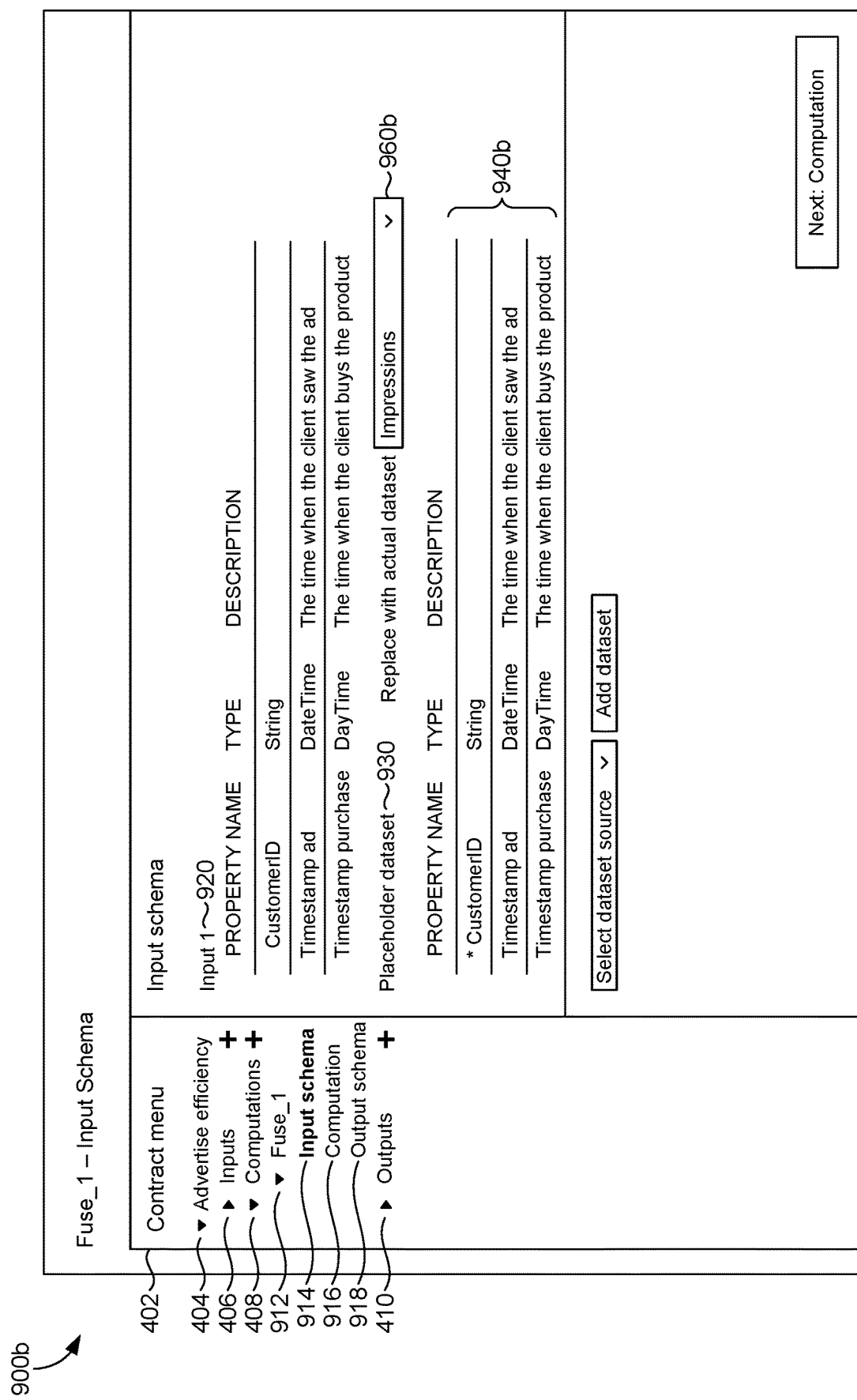

Continuing with the present example, once the user selects a set of inputs to the computational step, the user can be prompted to specify an input schema for the inputs. FIGS. 9A-B are illustrations of example user interfaces 900a and 900b for specifying an input schema for a computational step. Note that in contract menu 402, nested menu item 912 has been added representing the Fuse_1 step. As with other menu items in contract menu 402, nested menu item 912 may be expanded to present selectable representations of the elements of the associated computational step, such as input schema 914, computation 916, and output schema 918. In user interface 900a of FIG. 9A, menu item 914 for the input schema to the Fuse_1 computational step is selected. User interface 900a presents an input schema 925 for input dataset 920 (which may have been previously specified or otherwise identified) and input fields 940a for the input schema for placeholder dataset 930 (which may be filled out via user interface 900a). In some embodiments, new properties can be added to the set of input fields 940a for the input schema (e.g., by selecting an interaction element such as add property 950). In some embodiments, user interface 900a may include an interaction element that allows a user to replace a selected input with another one. For example, dropdown menu 960a may allow a user to replace placeholder dataset 930 with an available input dataset or a computational result. User interface 900b of FIG. 9B illustrates a selection of a connected input dataset (Impressions) to replace placeholder dataset 930, and input fields 940b have been updated to reflect the input schema for the selected input dataset. User interfaces 900a and 900b can also be thought of as presenting a summary of the step inputs for a particular computational step. Generally, interaction elements (e.g., a button, clickable link, clickable entry) may be provided for a particular step input that allows a user to rename the step input, remove the step input, unassociate a dataset with the step input (i.e., convert the input to a placeholder dataset), associate a dataset with the step input (i.e., populate a placeholder dataset), edit a schema for the step input, or otherwise manipulate properties of the step input.

Figure 10A:
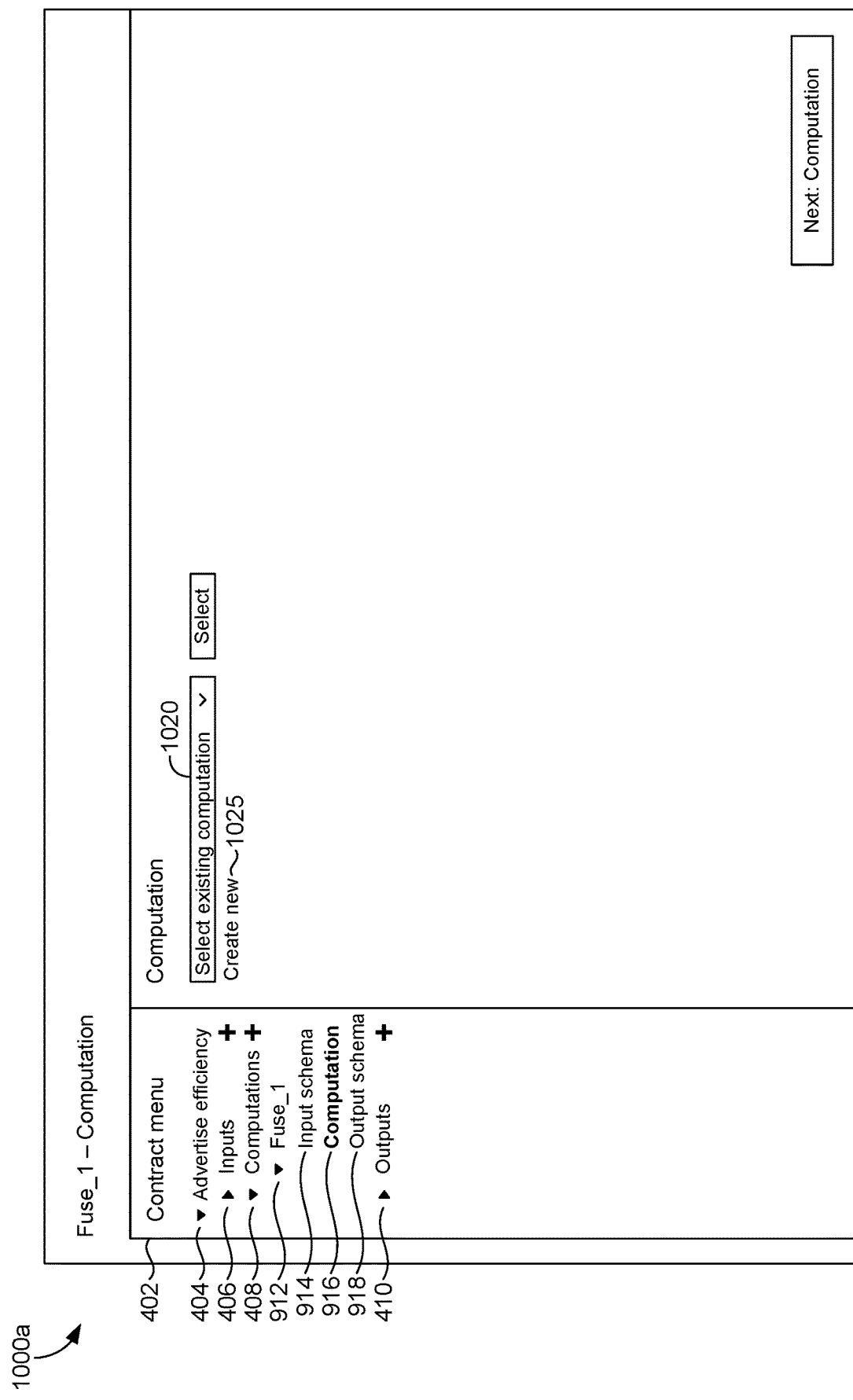
FIGS. 10A-C are illustrations of example user interfaces for specifying a computation for a computational step in a data privacy pipeline associated with a collaborative intelligence contract, in accordance with embodiments described herein.
Figure 10B:
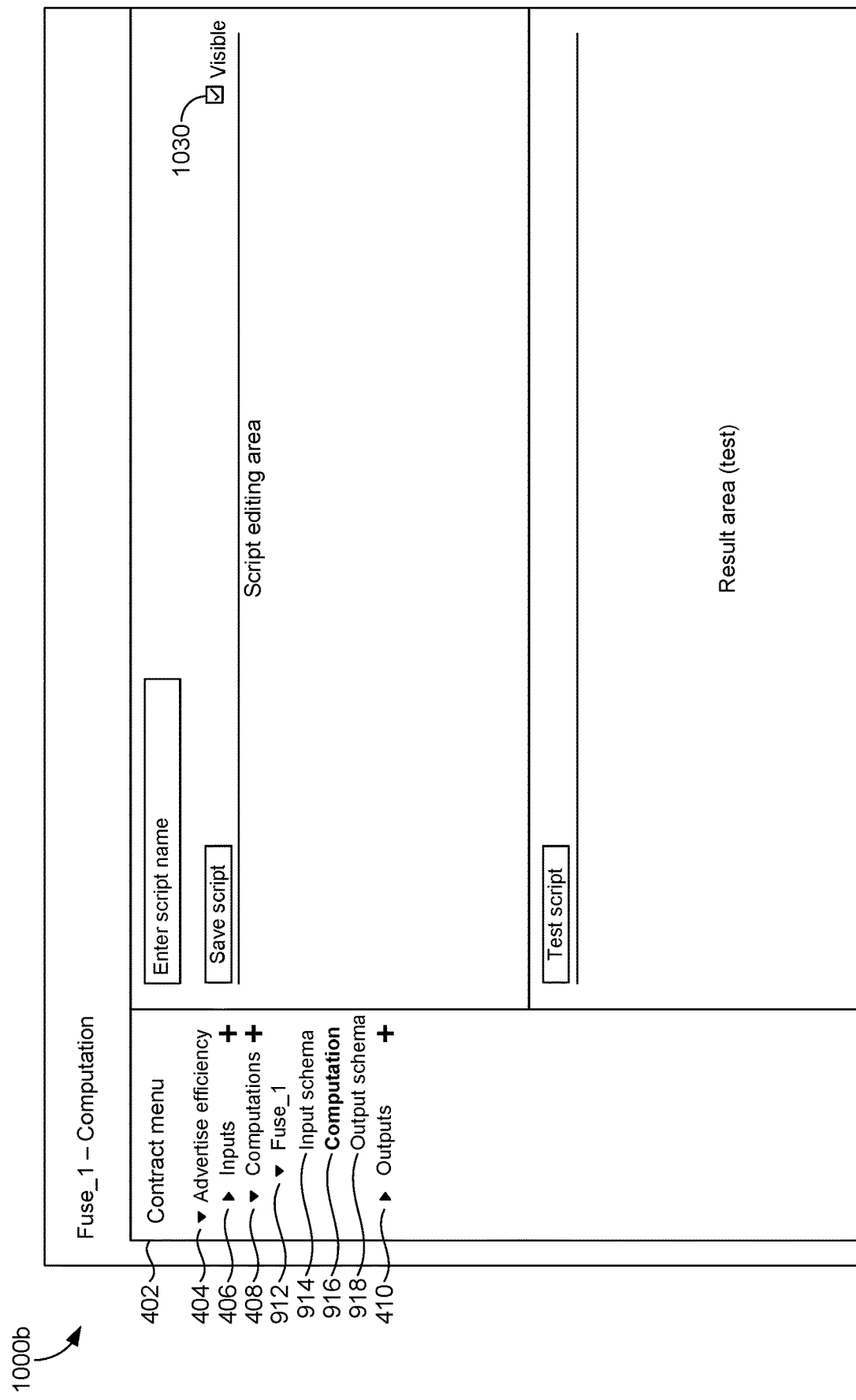
Figure 10C:
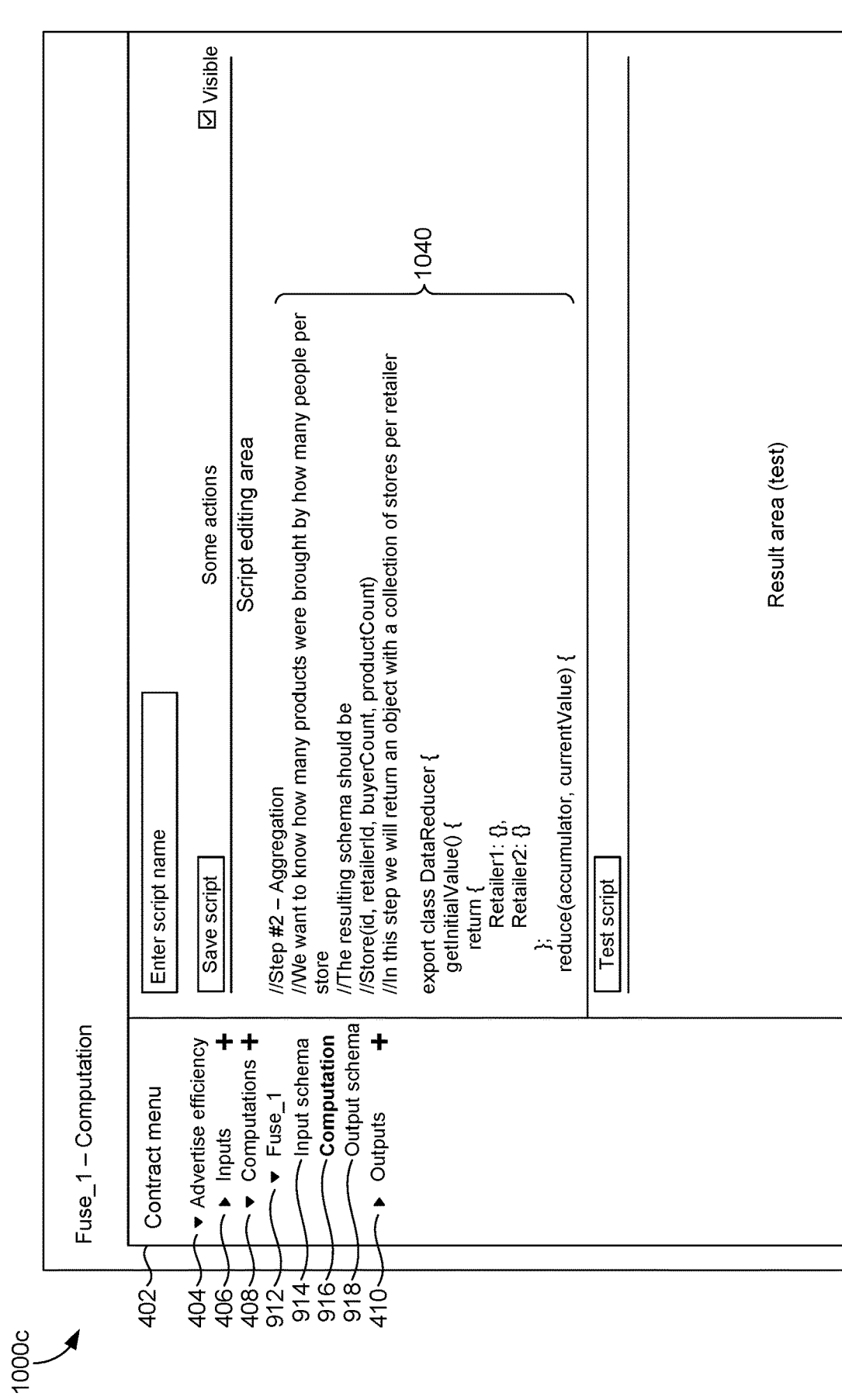

Turning now to FIGS. 10A-C, FIGS. 10A-C illustrate example user interfaces 1000a, 1000b, and 1000c for specifying a computation for a computational step. In user interface 1000a of FIG. 10A, menu item 916 for the computation to the Fuse_1 computational step is selected. User interface 1000a includes an interaction element 1020 that allows a user to select an available computation (e.g., via a dropdown menu) and an interaction element 1025 that allows a user to create a new one. User interface 1000b illustrates an example in which a user selects to create a new computation. In response to such a selection, a user interface such as user interface 1000b may be presented with a script editor and/or a compiler for a specified computational platform. The embodiment illustrated in FIG. 10B includes a script editor, a compiler, and an interaction element 1030 that allows a user to specify whether the specified computation should be visible to others. FIG. 10C illustrates an example script 1040 that may be provided.

Figure 11A:
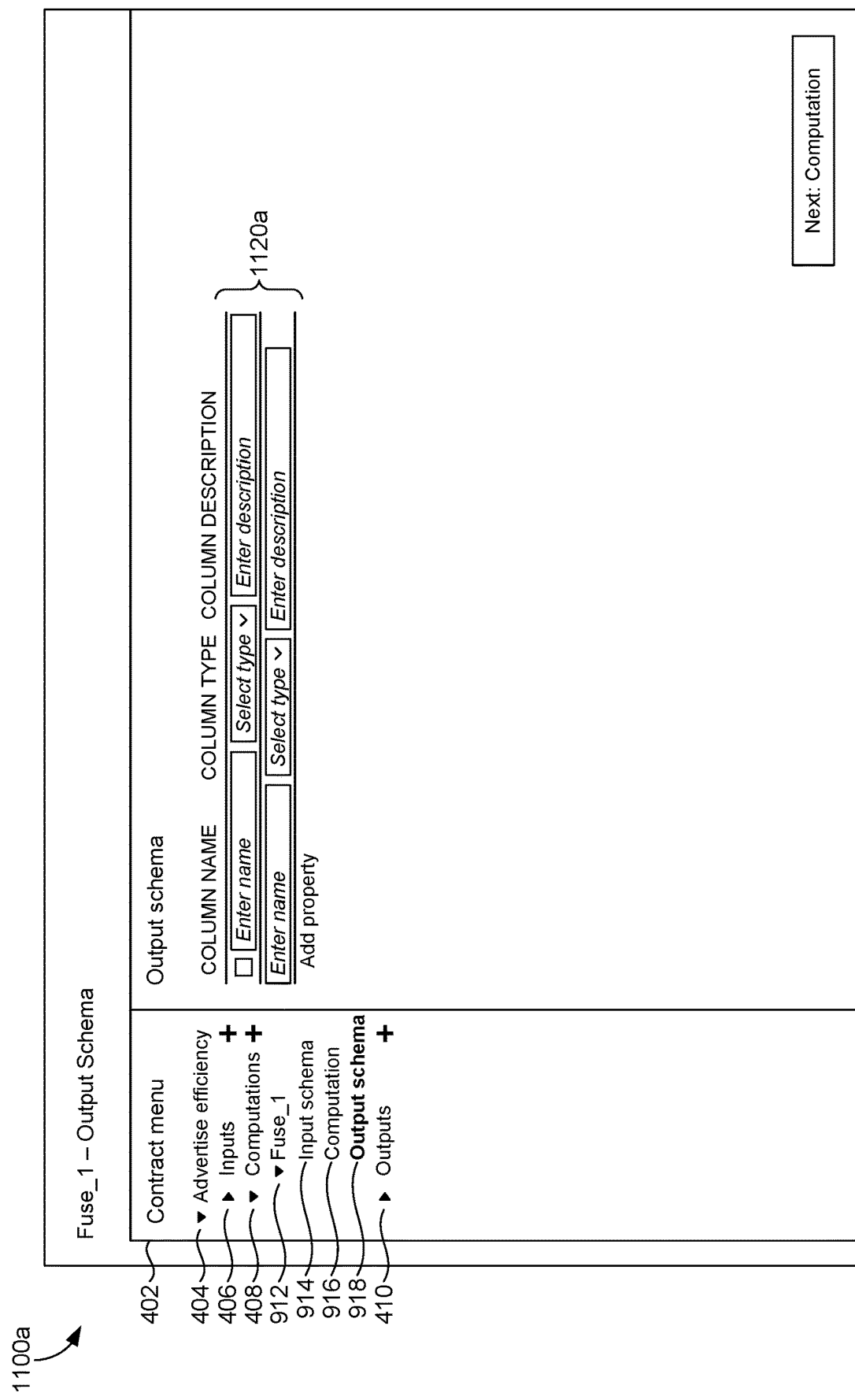
FIGS. 11A-B are illustrations of example user interfaces for specifying an output schema for a computational step in a data privacy pipeline associated with a collaborative intelligence contract, in accordance with embodiments described herein.
Figure 11B:
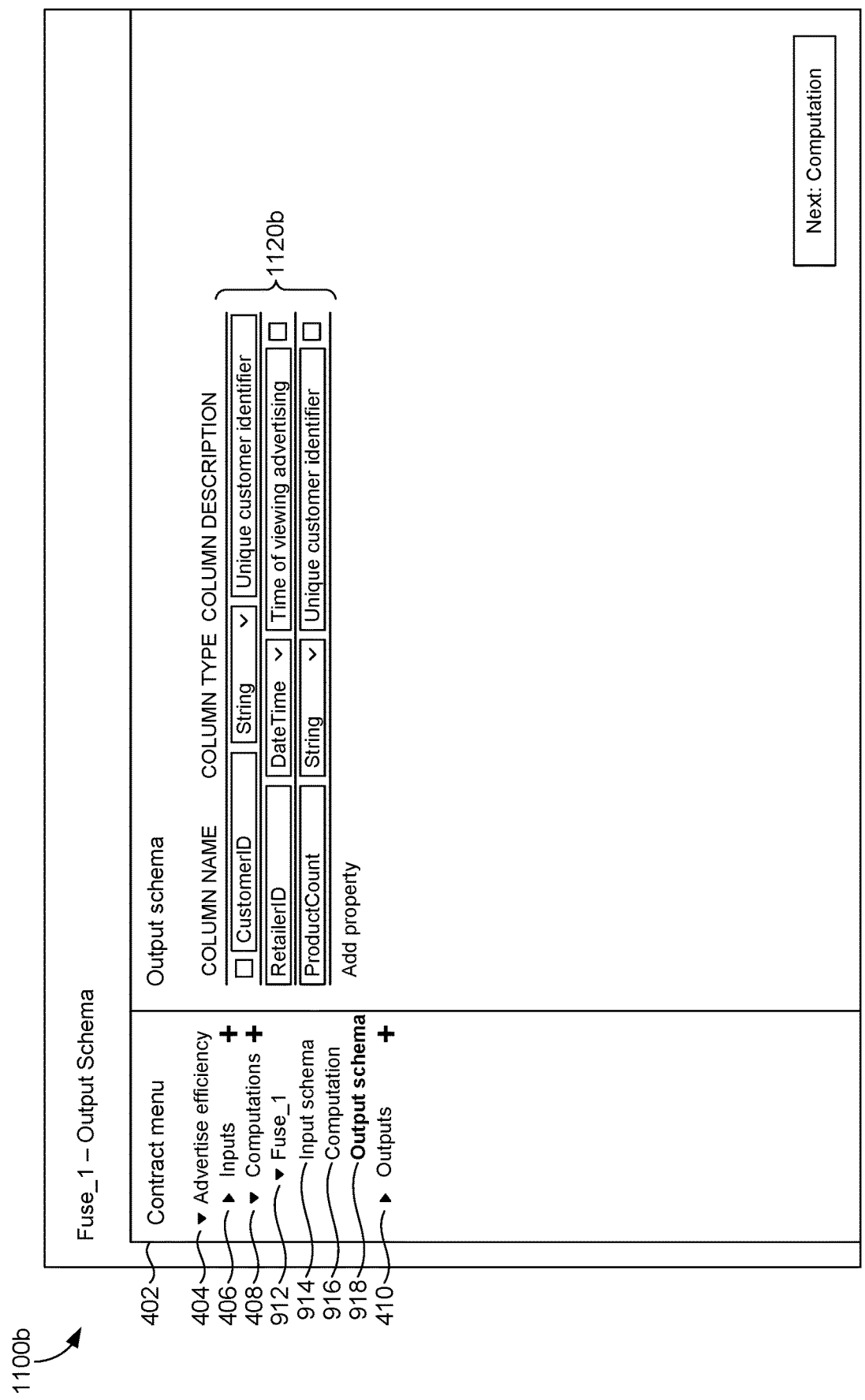

FIGS. 11A-B illustrate example user interfaces 1100a and 1100b for specifying an output schema for a computational step. In user interface 1100a of FIG. 11A, menu item 918 for the output schema to the Fuse_1 computational step is selected, and input fields 1120a may be populated to specify parameters for the output schema. User interface 1100b depicts an example output schema 1120b that may be provided for the Fuse_1 step. User interfaces 1100a and 1100b can also be thought of as presenting a summary of the step outputs for a particular computational step (although only one step output is depicted in FIGS. 11A and 11B). Generally, interaction elements (e.g., a button, clickable link, clickable entry) may be provided for a particular step output that allows a user to rename the step output, remove the step output, designate a location to export the step output, edit a schema for the step output, or otherwise manipulate properties of the step output.

Figure 12:
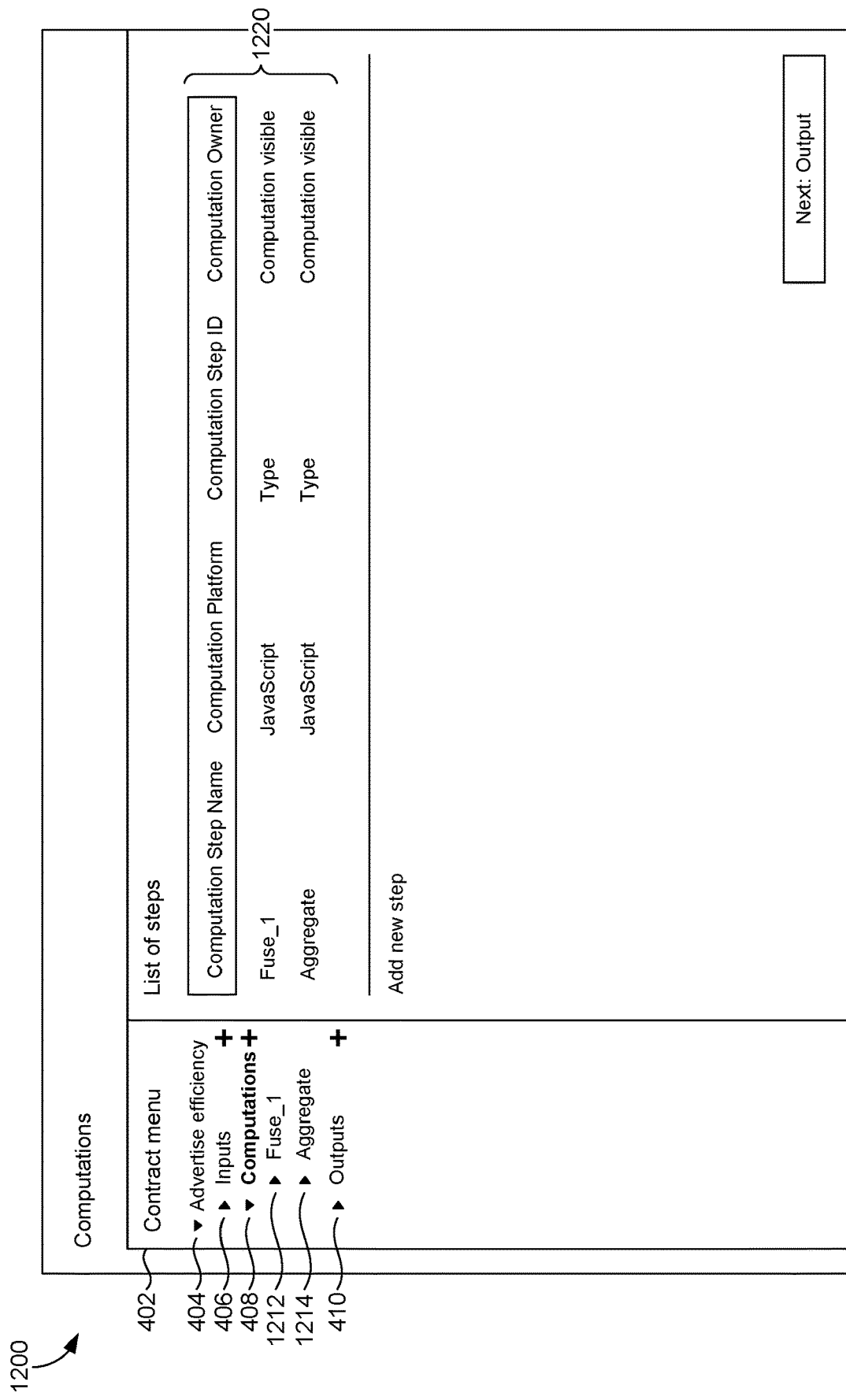
FIG. 12 is an illustration of an example user interface summarizing computation steps in a data privacy pipeline associated with a collaborative intelligence contract, in accordance with embodiments described herein.

FIG. 12 is an illustration of an example user interface 1200 summarizing computation steps in a selected contract and/or an associated data privacy pipeline. In user interface 1200a, menu item 408 for the computational steps in the Advertise efficiency contract is selected. In this example, contract menu 402 has been updated with menu items reflecting two completed computational steps: Fuse_1 (menu item 1212) and Aggregate (menu item 1214). Furthermore, table 1220 displays a summary of the computational steps for the contract, including an indication of the computation platform, an indication of the owner of the step, and/or an indication of the visibility of the step. In some embodiments, an interaction element may be provided that links to a corresponding interface configured to edit a selected computational step (e.g., a button, selectable text such as the name of the computational step, a selectable entry such as a row in table 1220). Additionally or alternatively, an interaction element may be provided that deletes a selected computational step (e.g., prompting for confirmation first), renames a computational step, changes access rights, or other manipulations.

Figure 13:
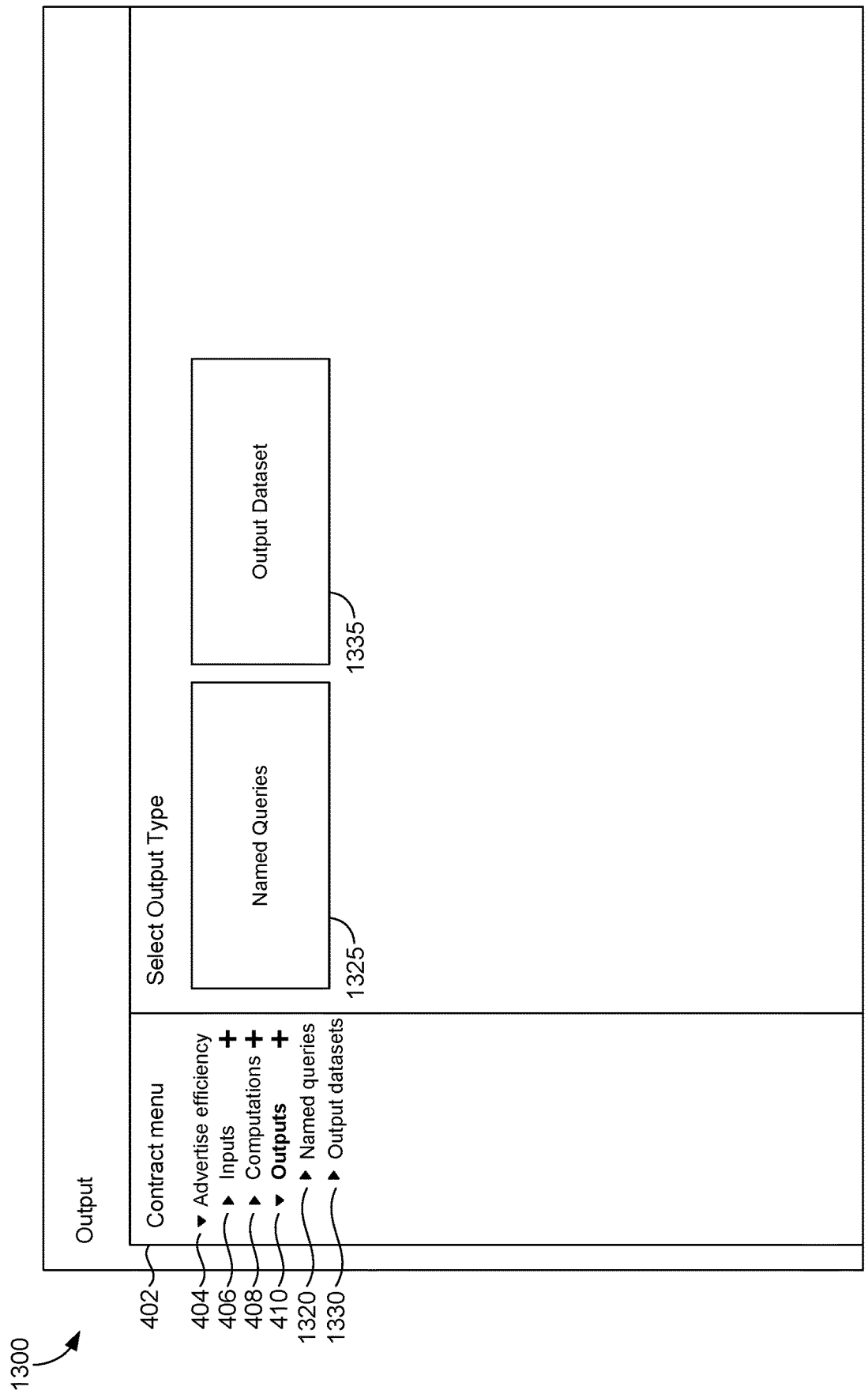
FIG. 13 is an illustration of an example user interface for specifying contract outputs associated with a collaborative intelligence contract, in accordance with embodiments described herein.

FIG. 13 illustrates an example user interface 1300 for specifying contract outputs associated with a collaborative intelligence contract. In user interface 1300, menu item 410 for the outputs of the Advertise efficiency contract is selected. Generally, any type of output may be supported. In the embodiment illustrated in FIG. 13, user interface 1300 include interaction elements 1325 and 1335 that allow a user to enter parameters for named queries and output datasets, respectively. Note that corresponding menu items 1320 and 1330 are nested underneath the menu item 410 for the outputs of the Advertise efficiency contract.

Figure 14A:
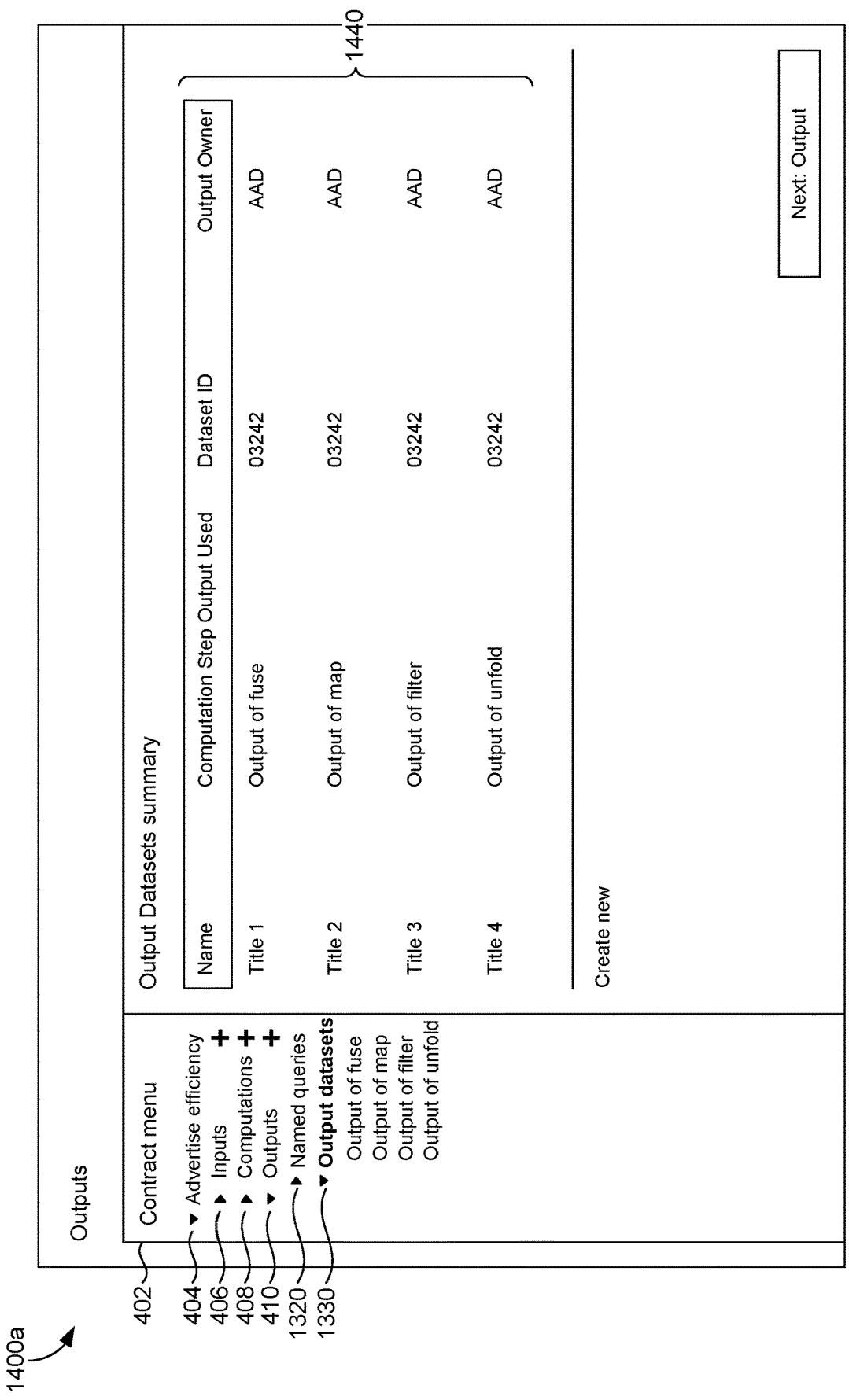
FIGS. 14A-B are illustrations of example user interfaces for specifying output datasets from a data privacy pipeline associated with a collaborative intelligence contract, in accordance with embodiments described herein.
Figure 14B:
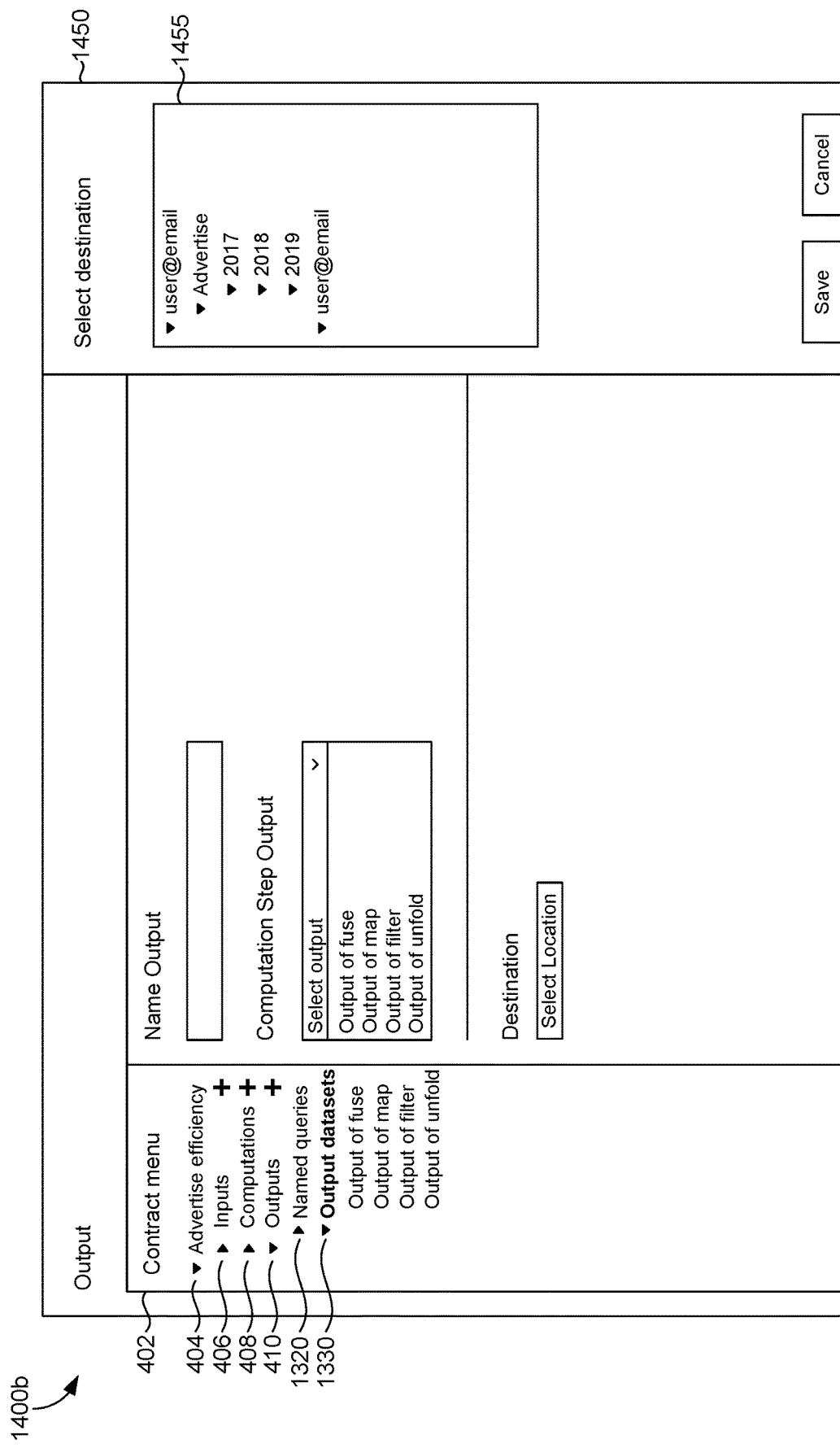

FIGS. 14A-B illustrate example user interfaces 1400a and 1400b for specifying output datasets to be generated by a data privacy pipeline. In user interfaces 1400a and 1400b, menu item 1330 for the outputs datasets for the Advertise efficiency contract is selected. User interface 1400a of FIG. 14A may include a summary 1440 of the specified output datasets to be generated. Further, menu item 1330 may be expandable to display the currently specified output datasets as corresponding menu items in contract menu 402. As with other user interfaces described here, user interface 1400a may include an interaction element that allows a user to create a new contract element, here a new output dataset. In response, a user interface such as user interface 1400b of FIG. 14B may prompt the user to specify parameters for the new output dataset. For example, user interface 1400b may prompt the user to specify a computational step from which a corresponding computational result should be used as an output dataset. In some embodiments, user interface 1400b may prompt the user to specify a destination for the output dataset. In response, a directory 1455 of available locations may be presented (e.g., via panel 1450), and a desired location can be selected.

Figure 15A:
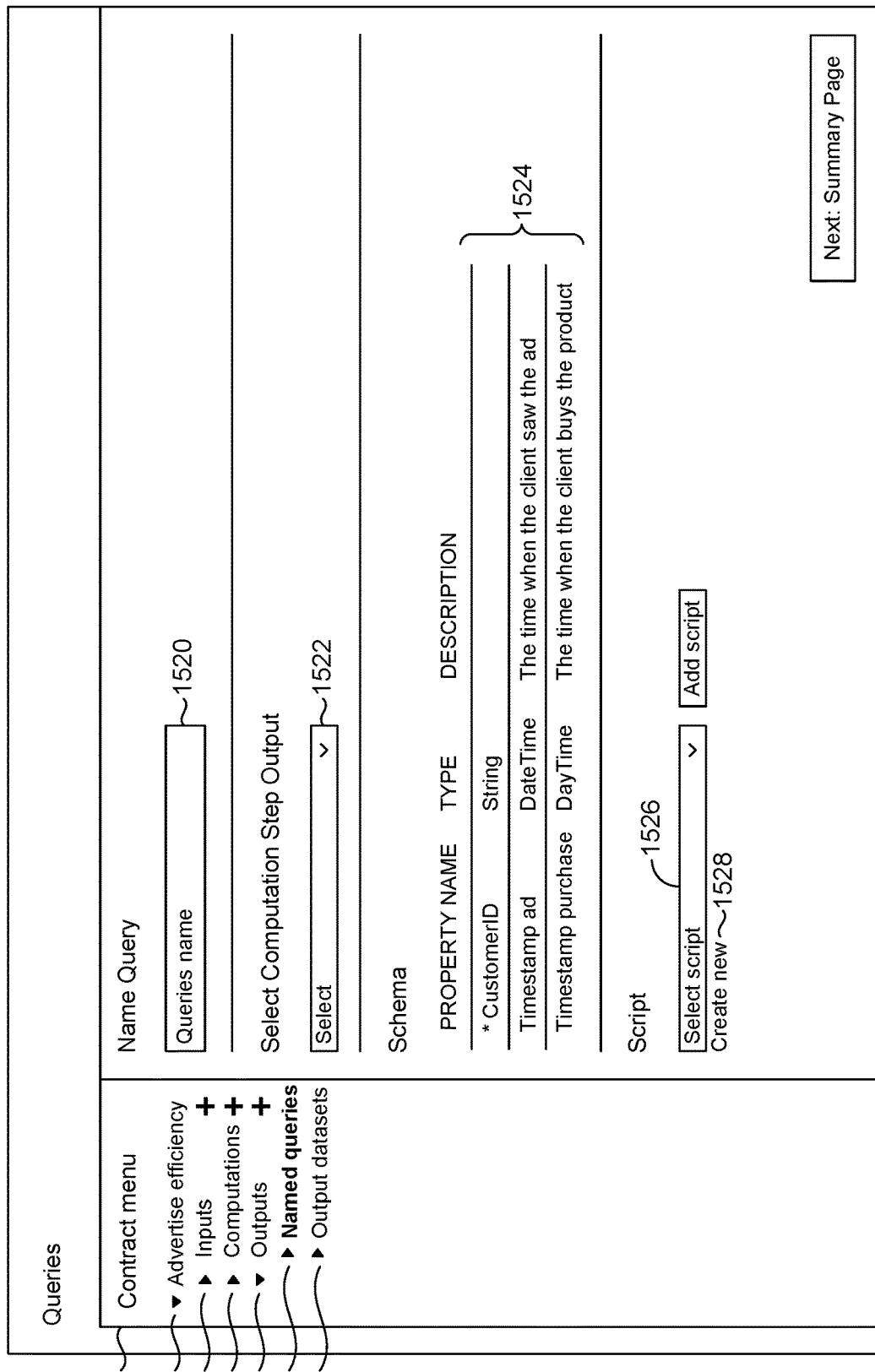
FIGS. 15A-D are illustrations of example user interfaces for specifying permissible named queries associated with a collaborative intelligence contract, in accordance with embodiments described herein.
Figure 15B:
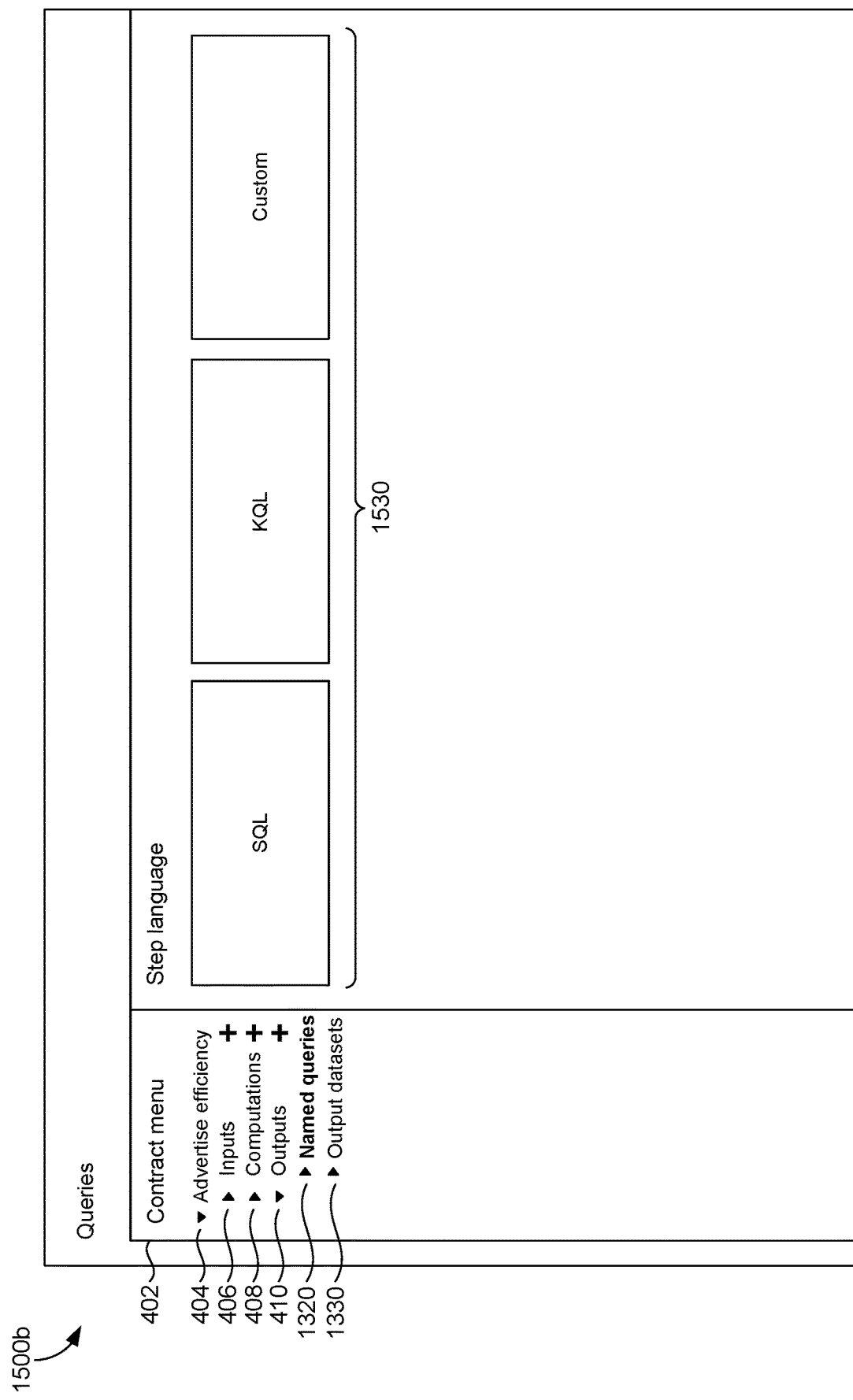
Figure 15C:
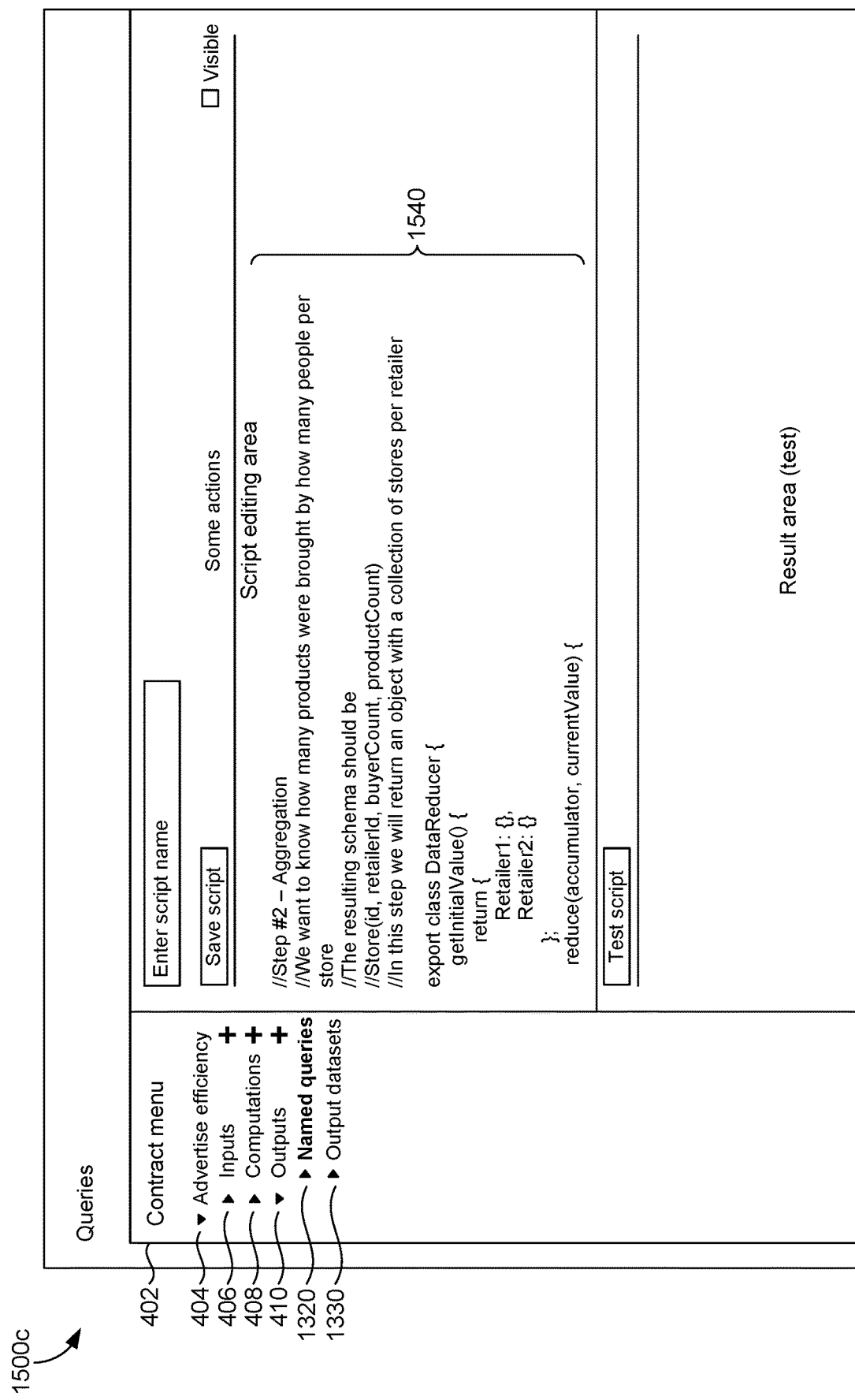
Figure 15D:
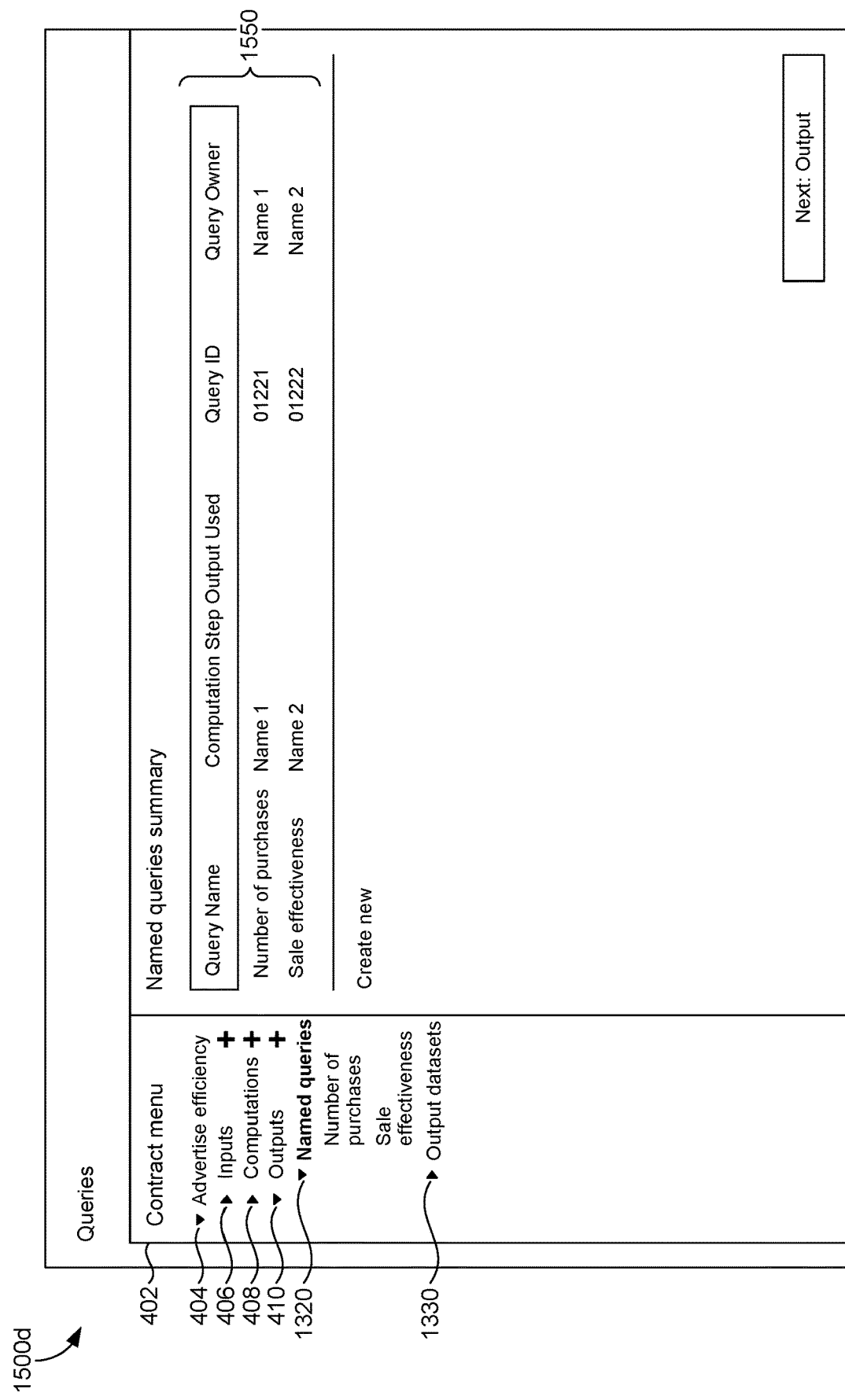

FIGS. 15A-D illustrate example user interfaces 1500a, 1500b, 1500c, and 1500d for specifying permissible named queries associated with a collaborative intelligence contract. In these user interfaces, menu item 1320 for permissible named queries for the Advertise efficiency contract is selected. Generally, parameters that may be specified for a named query may be similar to the parameters that may be specified for a computation for a computational step. For example, user interface 1500a may include a query name field 1520, a field 1522 for specifying the output of a particular computational step on which the query may operate, input fields 1524 for specifying an input schema, an interaction element 1526 for selecting an existing available script, and/or an interaction element 1528 for creating a new script 1528. Selection of interaction element 1528 to create a new script may cause presentation of a user interface such as user interface 1500b of FIG. 15B that accepts a selection of a programming language 1530 for the new script. Additionally or alternatively, a user interface such as user interface 1500c of FIG. 15C may be presented to accept an input of a script such as script 1540. In some embodiments, user interface 1500c may include a script editor and a compiler (e.g., for a specified programming language). FIG. 15D illustrates a summary 1550 of the named queries associated with the Advertise efficiency contract. Note that corresponding menu items for the named queries in summary 1550 have been added to menu item 1320 in the contract menu 402. Generally, interaction elements (e.g., a button, clickable link, clickable entry) may be provided for a particular named query that allows a user to rename the named query, remove the named query, view or edit a description of the named query, or otherwise manipulate properties of the named query.

Figure 16A:
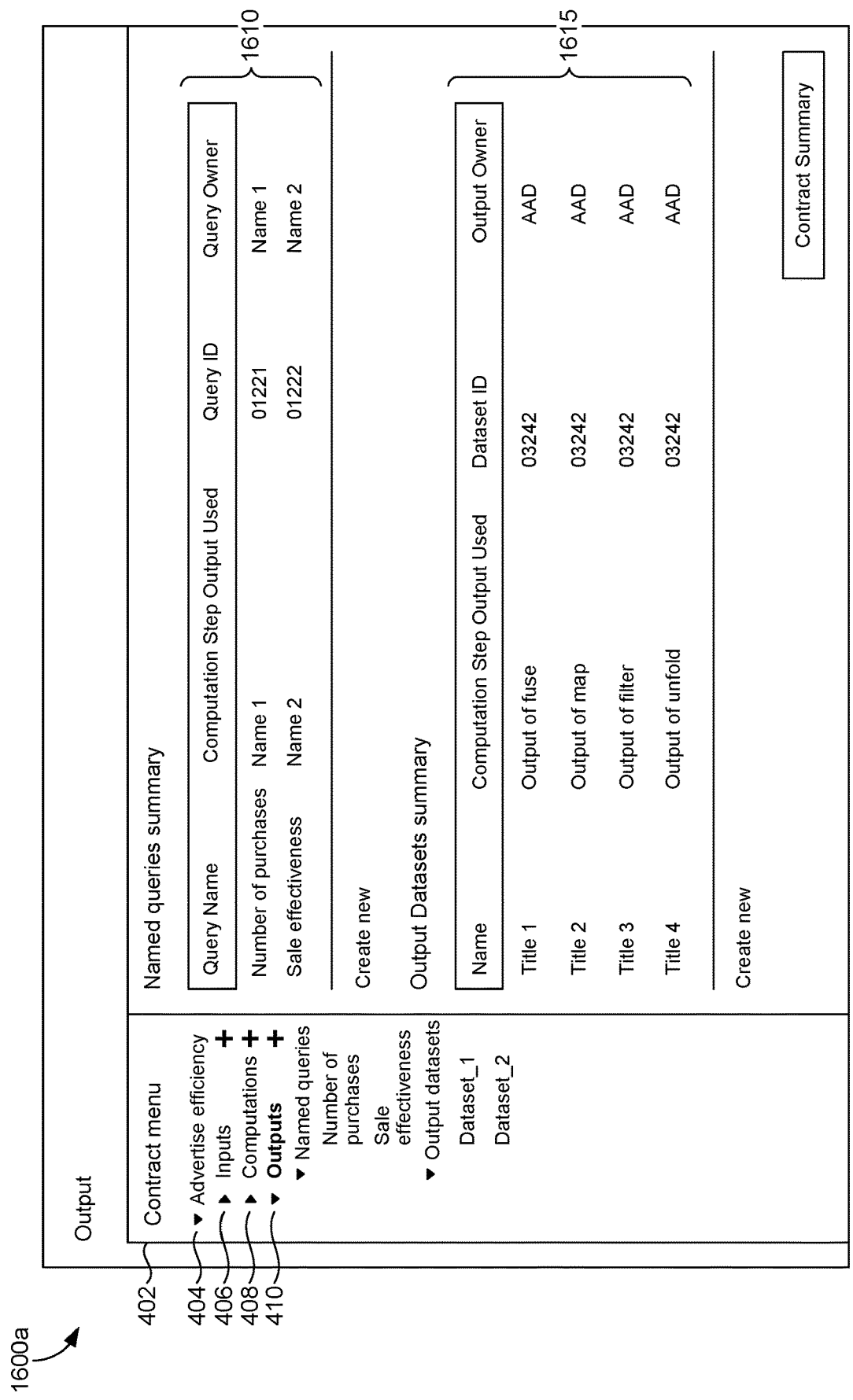
FIG. 16A is an illustration of an example user interface summarizing contract outputs associated with a collaborative intelligence contract.

FIG. 16A illustrates an example user interface 1600a summarizing contract outputs associated with a collaborative intelligence contract. In user interface 1600a, menu item 410 for the outputs to the Advertise efficiency contract is selected. User interface 1600a includes summary 1610 of the named queries associated with the contract and summary 1615 of the output datasets to be generated by deploying the data privacy pipeline associated with the contract.

Figure 16B:
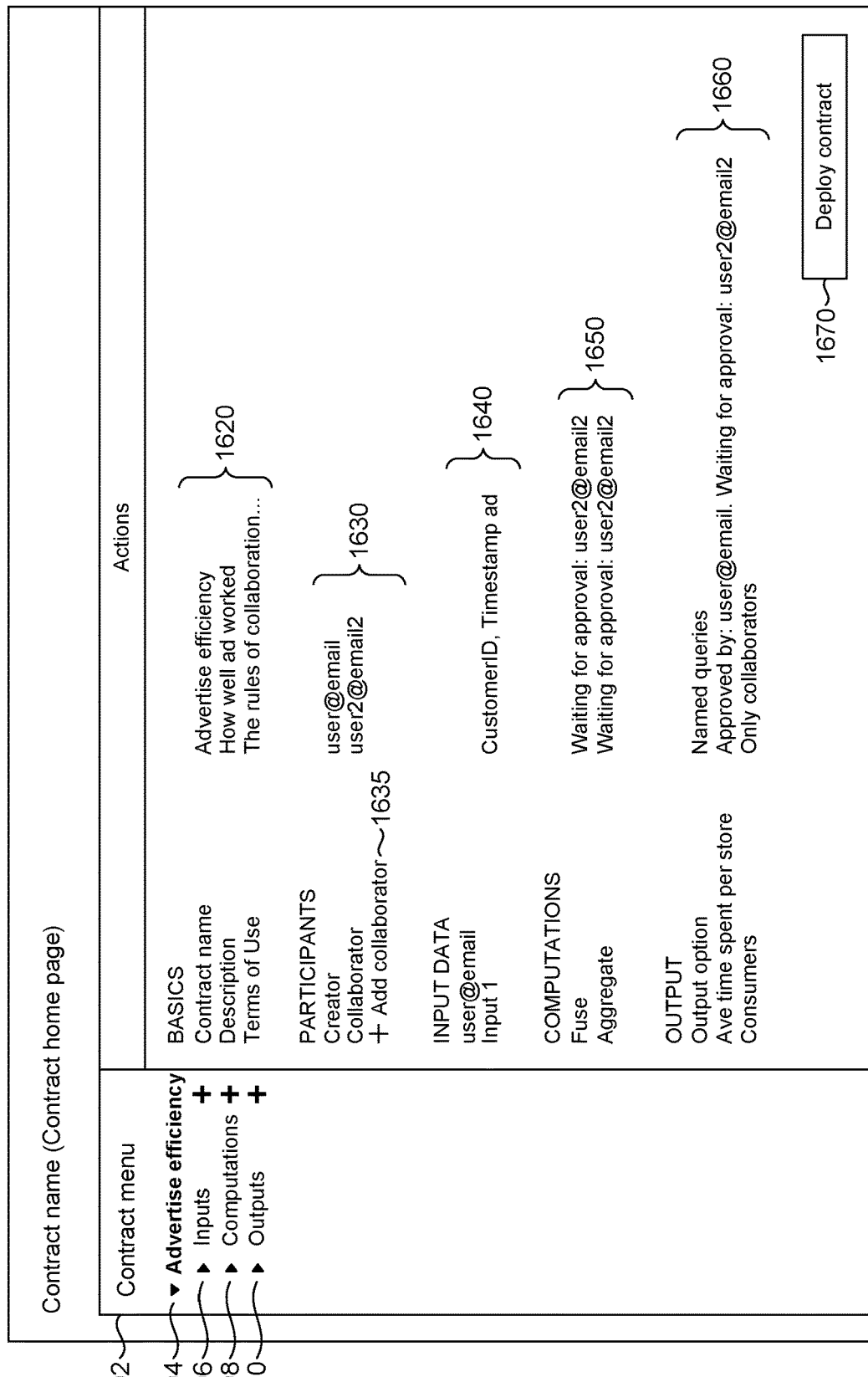
FIG. 16B is an illustration of an example user interface for reviewing approvals and deploying a collaborative intelligence contract, in accordance with embodiments described herein.

FIG. 16B illustrates an example user interface 1600b for reviewing approvals and deploying a collaborative intelligence contract. In user interface 1600b, menu item 404 for the Advertise efficiency contract is selected. In this example, user interface 1600b may include a summary of the specified parameters for the contract, including a basic description 1620, authorized participants 1630, input datasets 1640, specified computations 1650, and contract outputs 1660. In some embodiments, user interface 1600b may include an interaction element (e.g., interaction element 1635) that allows a user to add a participant and define access rights (e.g., a role) for the new participant. User interface 1600b may prompt each participant to approve the contract. In some embodiments, interaction elements (e.g., buttons) can be provided that allow a participant to sign a contract, revoke an existing signature, or edit contract details (e.g., basic description 1620). When all participants have approved, user interface 1600b may prompt a user to deploy the contract and corresponding data privacy pipeline (e.g., via interaction element 1670).

Figure 17A:
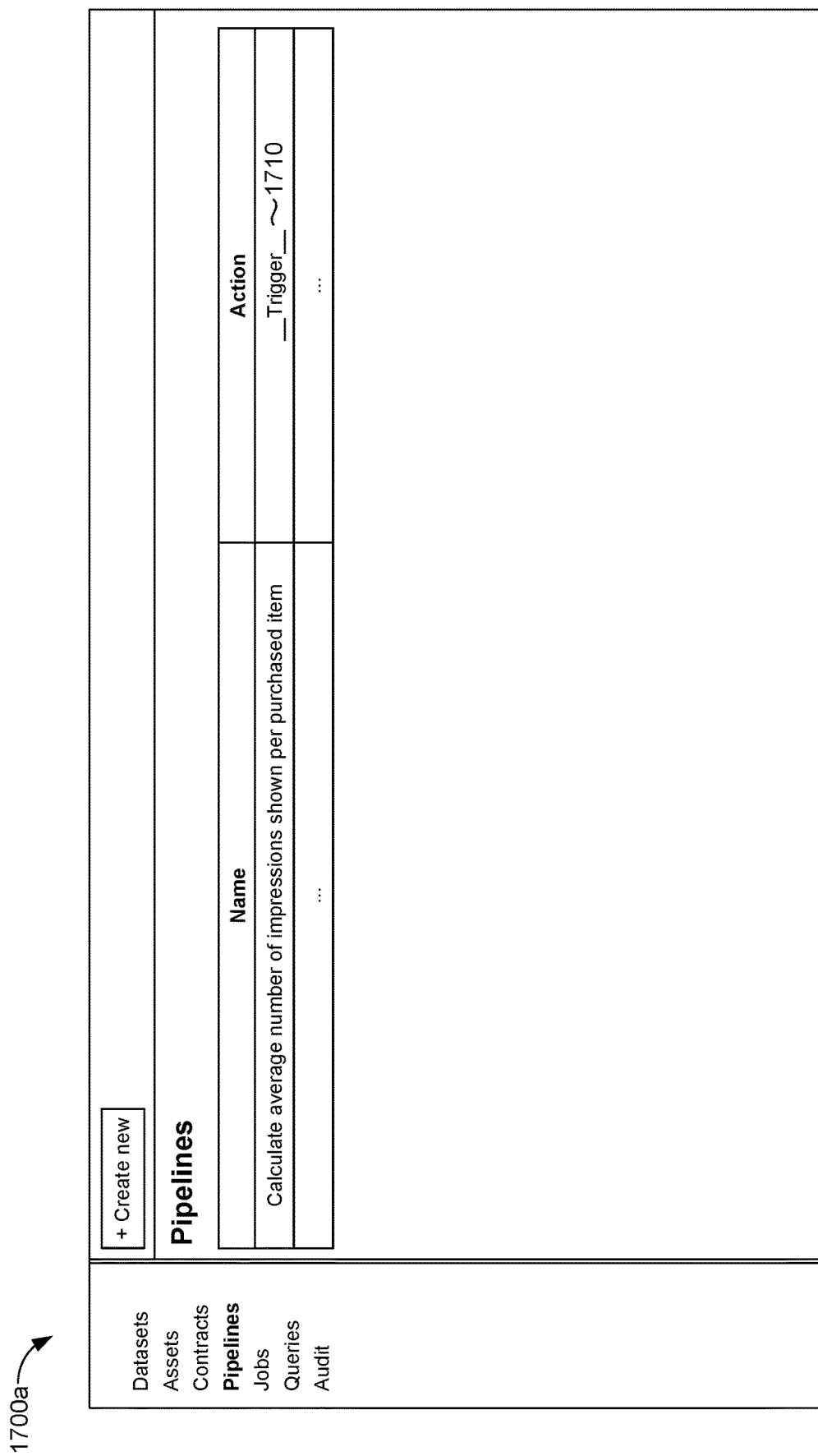

FIGS. 17A-17E are illustrations of example user interfaces for browsing and interacting with accessible resources, such as data privacy pipelines (FIG. 17A), jobs (FIG. 17B), named queries (FIGS. 17C and 17D), and audit events (FIG. 17E).

FIG. 17A illustrates an example user interface 1700a for browsing and interacting with available pipelines (e.g., for which a tenant account is authorized). For example, a particular account may be authorized to trigger a pipeline based on a corresponding permission specified in an associated collaborative intelligence contract. An accessible pipeline may be presented with a corresponding interaction element (e.g., trigger 1710) that triggers a request to initiate a job defined by the pipeline. In some embodiments, when a triggered job succeeds, a tool tip may be shown indicating the successful creation. Conversely, when a triggered job fails, a tool tip may be shown indicating the failure.

FIG. 17B illustrates an example user interface 1700b for browsing and interacting with available jobs (e.g., collaborative intelligence jobs initiated by, associated with, or otherwise accessible by a tenant account). For example, a table 1720 of collaborative intelligence jobs (e.g., triggered pipeline jobs) may be presented along with information about the jobs, such as an identifier for a job, an identifier for the pipeline a job was created from, the execution status of a job (e.g., running, aborted, succeeded, failed), duration of the job from the moment it was started, and the like. In some embodiments, a job may be presented with an associated interaction element (e.g., button, clickable link, clickable entry) configured to perform an available action related to the job. For example, if a job is running, an available action may be an abort action. If a job has succeeded, an available action may be a view results action. If a job has failed, an available action may be a view errors action. In some embodiments, table 1720 may include associated interaction elements configured to filter the jobs being presented (e.g., by date, status, name, start time, duration). These and other variations are contemplated within the present disclosure.

Figure 17C:
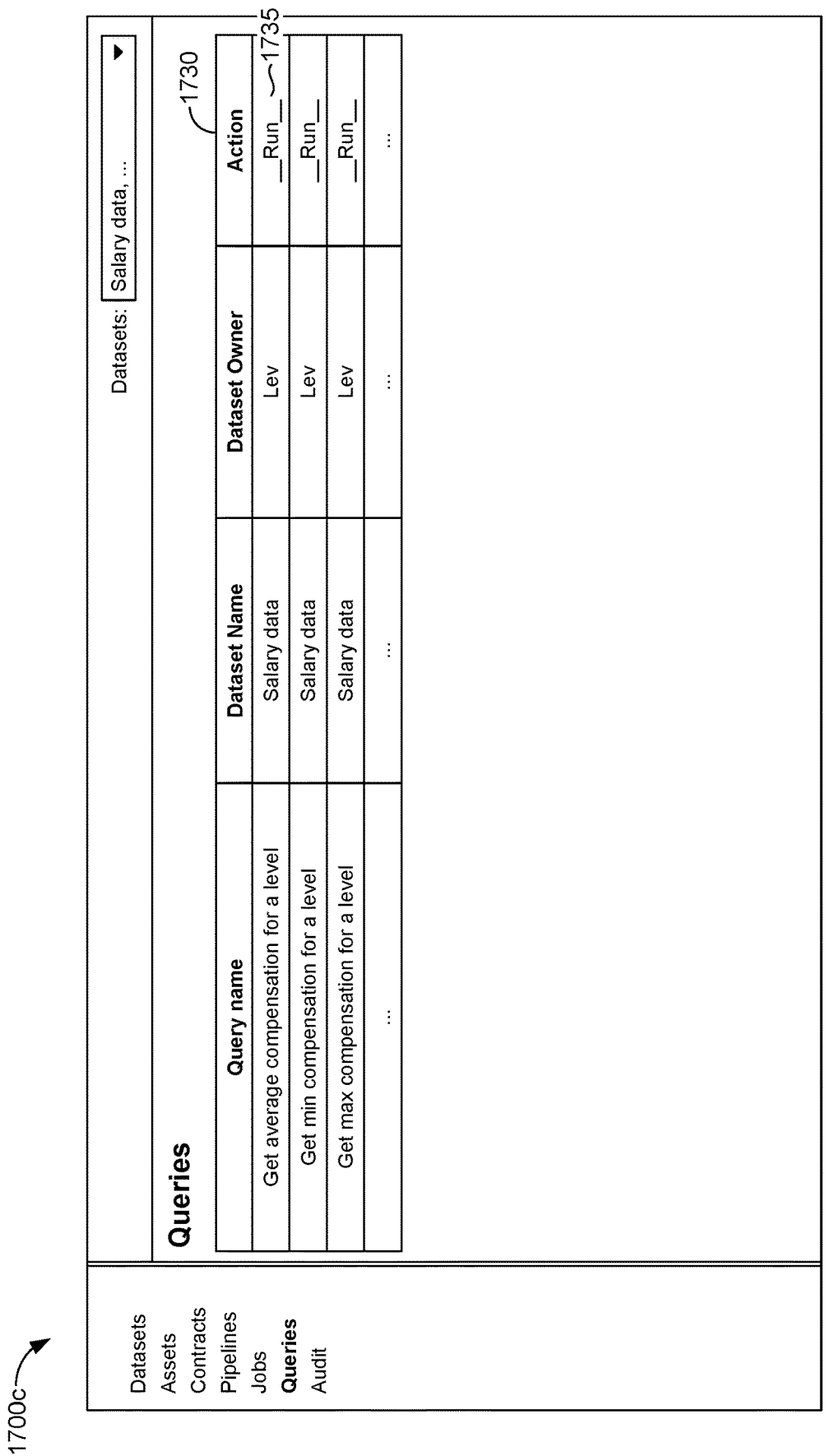

FIGS. 17C and 17D illustrate example user interfaces 1700c and 1700d for browsing and interacting with available named queries (e.g., initiated by, associated with, or otherwise accessible by a tenant account). For example, a table 1730 of permissible named queries available to the account may be presented along with information about the named queries, such as an identifier for the named query, a corresponding dataset on which the named query is configured to operate, an identifier for an owner of the corresponding dataset, and the like. In some embodiments, a named query may be presented with an associated interaction element (e.g., button, clickable link, clickable entry) configured to perform an available action related to the named query, such as run action element 1735, which may be configured to initiate a request to run a named query. In some embodiments, as a precursor to initiating a request to run a named query, one or more prompts for entry of relevant parameters for the named query can be presented. For example, user interface 1700d may be presented and may prompt for a description for the named query, a selection of permissible configurable parameters (e.g., defined by an associated collaborative intelligence contract), and the like. In the embodiment illustrated in 1700d, trigger button 1740 may initiate the named query, and results (e.g., results table 1745) may be presented.

FIG. 17E illustrates an example user interface 1700e for browsing and interacting with available audit events (e.g., jobs, collaborative intelligence contract proposals, or other operations relevant to a collaborative intelligence resource that were initiated by, associated with, or otherwise accessible by a tenant account). For example, a table 1750 of audit events available to the account may be presented along with information about the audit events, such as date and time for an event, a type of object operated on (e.g., job, proposal), a corresponding identifier for the object, a type of performed operation (e.g., started, aborted, created), an identifier for an account that initiated or is otherwise associated with the event, and the like. In some embodiments, table 1750 may include associated interaction elements configured to filter the audit events being presented (e.g., by date, object type, operation, associated account, description). These and other variations are contemplated within the present disclosure.

In this manner, one or more user interfaces can guide collaborators to build and configure a data privacy pipeline and a corresponding contractual agreement to share data. Although the interfaces described herein have been described with a certain configuration of interaction elements, these examples are not meant to be limiting. Generally, any suitable interface(s) capable of facilitating multi-party collaboration, generation of a data privacy pipeline, and/or specification of corresponding parameters is contemplated within the scope of the present disclosure.

Example Collaborative Intelligence Environment

Some embodiments of the present disclosure are directed to techniques for deriving collaborative intelligence based on constraint computing and constraint querying. At a high level, a data trustee can operate a trustee environment configured to derive collaborative intelligence for tenants subject to configurable constraints, without exposing underlying raw data provided by the tenants or collaborative data shielded by the trustee environment. As used herein, collaborative data refers to data that has been derived from shared input data (e.g., data from different users). Shared input data can come from any number of sources (e.g., different users), and can be processed to generate intermediate data, which itself can be processed to generate collaborative data. Collaborative data may include an exposable portion that is allowed to be shared and a restricted portion that is not allowed to be shared. Although the restricted portion of the collaborative data may not be shared, it may include an operable portion that may be used to derive collaborative intelligence that may be shared. In some embodiments, collaborative intelligence may be derived from exposable data and/or restricted data, and the collaborative intelligence may be provided without exposing the restricted data. For example, configurable constraints may programmatically manage limitations (e.g., allowing some operations, but not others) on certain underlying data (e.g., personally identifiable information, some other sensitive information, or any other designated information that is collected, stored, or used) and how the underlying data can and cannot be accessed, used, stored, or displayed (or variations thereof). Further, the configurable constraints may programmatically support collaborative intelligence operations on accessible data (e.g., deriving aggregate statistics), without displaying the individual data entries that were operated on.

By relying on trustee computing to perform data processing, tenants can derive collaborative intelligence from each other's data without compromising data privacy. To accomplish this, the trustee environment can include one or more data privacy pipelines through which data can be ingested, fused, derived, and/or sanitized to generate collaborative data. A data privacy pipeline can be provided as a distributed computing or cloud computing service (cloud service) implemented in the trustee environment, and can be spun up and spun down as needed. In some embodiments, tenants providing data into a data privacy pipeline cannot access the pipeline. Instead, the pipeline outputs collaborative data subject to constraints provided by one or more of the tenants. Depending on the designated constraints, the collaborative data can be output from the trustee environment (e.g., because it has been sanitized according to specified constraints) and/or may be stored in, and shielded by, the trustee environment. Shielded collaborative data can be queried to derive collaborative intelligence subject to the configurable constraints (e.g., without exposing the shielded collaborative data).

Generally, a data privacy pipeline can accept data provided by one or more tenants. Initially, the data privacy pipeline may determine whether input data is joint data pursuant to a contract or other tenant agreement with one or more tenants. Data that is determined to be joint data can be ingested, and data that is determined not to be joint data can be dropped. In this regard, joint data refers to any shared data that is designated for ingestion in generating collaborative data (e.g., a c designated or otherwise identified in a tenant agreement with one more tenants). Ingested data can include data from multiple sources, so the data privacy pipeline may fuse data from multiple sources according to computations and constraints specified in the tenant agreement. For example, constrained data fusion can implement one or more constraints to combine ingested data to form fused joint data in any number of ways, including the use of one or more join operations (e.g., left, right, inner, outer, anti), custom joins (e.g., via imperative scripts), data appends, normalization operations, some combination thereof, and others.

In some embodiments, a data privacy pipeline can perform constrained computations to generate derived joint data. Constrained computing can take data from one source (e.g., ingested data, fused joint data) and perform any number of specified computations (e.g., arithmetic operations, aggregation, summarization, filtering, sorting, bounding). A simple example of a constraint computation is a calculation of average age per city, where the computation is only to be performed for a city if the underlying dataset includes entries for at least five people in the city. Additionally or alternatively, a data privacy pipeline can perform data sanitation to generate collaborative data that implements constraints for storage, access, precision, and the like. For example, data sanitation can implement constraints specified in the tenant agreement designating whether collaborative data should be shielded (e.g., stored in the trustee environment), whether collaborative data can be exported, whether exported collaborative data should be restricted (e.g., do not export email, credit card numbers, portions thereof), and the like. As such, a data privacy pipeline can generate collaborative data from data provided by one or more tenants, and provide agreed-upon access to the collaborative data without sharing the underlying raw data with all the tenants.

In some embodiments, to enable constraint computing and querying, the use and generation of collaborative data in a trustee environment can be monitored and orchestrated subject to configurable constraints. At a high level, constraints can be provided through a user interface to enable tenants (e.g., customers, businesses, users) to specify desired computations and constraints on the use of and access to their data in the trustee environment, including eligible data sources and how their data may be processed or shared. Any number of various types of constraints may be implemented, including data access constraints, data processing constraints, data aggregation constraints, and data sanitation constraints.

For example, data access constraints can be specified to allow or forbid access (e.g., to a specific user, account, organization). In some embodiments, designated constraints can be universal such that the constraints apply to all potential data consumers (e.g., only allow access to average age no matter the data consumer). In some embodiments, a designated constraint can be applied to a designated user, account, organization, and the like (e.g., do not allow group A to access salary data, but allow group B to access it). Generally, a tenant may specify constraints defining how the tenant's data can be merged with designated datasets or portions thereof, constraints limiting the schema of data being read from the tenant's data (e.g., specifying horizontal filtering to be applied to a tenant's data), constraints limiting the size of ingested data (e.g., specifying storage limitations, sub-sampling of the tenant's data, vertical filtering to be applied to a tenant's data), constraints limiting the schema of collaborative data that can be output, constraints defining ownership of collaborative data, constraints defining whether collaborative data should be open, encrypted, or shielded (e.g., stored in the trustee environment), and the like.

In some embodiments, various types of data processing constraints may be designated, such as constraints designating what operations can be performed (e.g., allowable and restricted computations, binary checks), constraints limiting a comparison precision (e.g., for numeric data, geographic data, date and time data), constraints limiting an accumulation precision (e.g., for geographical data, numerical data, date or time data), constraints limiting location bounding precision (e.g., limiting allowable geofencing determinations to specific grids, minimum geographic divisions such as neighborhood, county, city, state, or country, and the like), and other precision and/or data processing requirements.

Additionally or alternatively, one or more data aggregation constraints can be specified, such as constraints requiring a minimum aggregation amount (e.g., at least N rows or distinct field values), constraints requiring some statistical distribution condition to be valid (e.g., minimum standard deviation), constraints defining allowed aggregation functions (e.g., allow min, max, average, but not percentiles), to name a few examples.

In some embodiments, one or more data sanitation constraints can be specified, such as constraints requiring sanitation of personally identifiable information (e.g., remove e-mails, names, IDs, credit card numbers), constraints requiring lower precision sanitation (e.g., lower the numeric, data and time, and/or geographical precision), constraints requiring sanitization of values coming from specific fields (which may entail tracking transformations applied in a data privacy pipeline), constraints requiring custom sanitations (e.g., requiring execution of one or more custom and/or third party sanitation scripts), constraints requiring data masking (e.g., output certain data such as phone numbers, credit cards, dates, but mask a portion of the number), and the like.

Additionally or alternatively to the constraints listed above, one or more constraints can be specified limiting a number of allowable queries and/or data accesses per unit time (e.g., minute, hour, day). Such a constraint can operate to reduce the risk of brute-force attempts to reverse engineer shielded data by asking a set of slightly different questions within a relatively small time window. In general, one or more custom constraints can be specified such as a constraint requiring that some designated property match some designated criteria. These and other types of constraints are contemplated within the present disclosure.

In some embodiments, a constraint manager can monitor and orchestrate data flow, generation, and access, subject to the designated constraints. For example, the constraint manager can communicate with various components in the trustee environment (e.g., a data privacy pipeline) to implement the constraints, which may be maintained in a contract database accessible to the constraint manager. In some embodiments, components can issue requests to the constraint manager for permission to execute a particular command, function call, or other executable unit of logic. The constraint manager can evaluate the request and grant or deny permission. In some cases, permission may be granted subject to one or more conditions corresponding to one or more of the constraints. By way of nonlimiting example, some possible conditions that can be implemented include requiring operations that shift, filter, or reshape data (e.g., application of comparison constraints such as only allowing a merge with certain precision), requiring substitution of one or more executable units of logic (e.g., commands or operations) with one or more constrained executable units of logic (e.g., replace average with constrained average), and the like.

Generally, a constraint can be checked, validated, or otherwise enforced at any time or step (e.g., in association with any portion of a data privacy pipeline, constrained querying). Accordingly, corresponding functionality enforcing a constraint can be applied at any step, or multiple steps. In some embodiments, enforcement of certain constraints can be allocated to certain portions of a data privacy pipeline (e.g., data access constraints get applied during ingestion, processing and aggregation constraints get applied during data fusion and/or constrained computation, sanitation constraints get applied during data sanitation). In another example, a particular data access constraint (e.g., only pass data for patients who participated in at least five different studies) may be applied during data fusion. These are meant merely as examples, and any suitable constraint enforcement regime may be implemented within the present disclosure.

Enforcement of a constraint (e.g., precision or aggregation constraints) on a particular executable unit of logic (e.g., for a designated computation, a requested operation) can result in any number of scenarios. In one example, a particular executable unit of logic can be rejected entirely. In another example, a particular executable unit of logic can be allowed, but the result is filtered (e.g., no value is returned for a particular row or entry of data). In yet another example, a particular executable unit of logic can be allowed, but the result is changed (e.g., precision reduced, a question is answered with false). These and other variations may be implemented.

As constraints are applied to generate collaborative data, any combination of schema, constraints, and/or attribution metadata can be associated with the collaborative data, intermediate data used to arrive at the collaborative data, or otherwise. Generally, constraints can be enforced across multiple steps and computations. As such, in some embodiments, applicable and/or satisfied constraints for each step can be tracked and/or associated with data produced by a given step. Taking aggregation constraints as an example, once an aggregation constraint has been fulfilled during a particular step, subsequent steps no longer need to consider this constraint. In another example where different constraints have been specified for different datasets to be merged, a merging operation may only need to apply the stricter constraint. Generally, an appropriate allocation or combination of constraints can be applied and/or tracked as data flows through a data privacy pipeline. This tracking can facilitate validating whether a particular constraint has been applied to particular data. Accordingly, as constraints are applied and data is generated, corresponding schema, applicable or satisfied constraints, and/or attribution metadata indicating ownership or providence can be associated with a dataset, or a corresponding entry, row, field, or other element of data. In some embodiments, any intermediate data used in arriving at collaborative data (e.g., ingested data, fused joint data, derived joint data) may be deleted, and collaborative data may be stored in the trustee environment and/or provided as an output, depending on an applicable constraint.

In some embodiments, constraint querying can be applied to allow data consumers to query collaborative data in a trustee environment subject to configurable constraints. At a high level, constraint querying can operate as a search engine that allows data consumers to access or derive collaborative intelligence from collaborative data without exposing underlying raw data provided by the tenants or collaborative data shielded by the trustee environment. Constraints can be applied in response to a query in any number of ways, including reformatting a query prior to execution, applying constraints after executing a query, constraining eligible queries for execution, applying access constraints prior to execution, and others.

By way of nonlimiting example, an issued query can be validated against a specified aggregation constraint by ensuring that the query contains at least one aggregation element and ensuring that the aggregation element(s) are consistent the aggregation constraint. In another example, an execution plan corresponding to the issued query can be executed, and the results can be validated against the aggregation constraint and/or the aggregation element(s) of the query (e.g., confirming the results correspond to a requested number of distinct rows, fields, statistical distribution). In some embodiments, a constraint can be enforced on a corresponding element of a query by modifying the element based on the constraint (e.g., to limit a corresponding number of distinct rows, fields, statistical distribution), by executing the modified element prior to the other elements of the query, some combination thereof, or otherwise.

By way of background, queries are generally not executable code. In order to execute a query, it is normally converted into an execution plan that is executable. In some embodiments, in order to enforce constraints on a received query, the query can be parsed into a corresponding execution tree comprising a hierarchical arrangement of executable units of logic that, when executed, implement the query. Applicable constraints can be accessed, and the executable units of logic can be validated against the constraints. In some embodiments, if one or more of the executable units of logic is not allowed, the query can effectively be reformatted by altering one or more of the executable units of logic based on one or more constraints. More specifically, the execution tree corresponding to the query can be reformatted into a constrained execution tree by traversing the execution tree and replacing executable units of logic inconsistent with a particular constraint with custom executable units of logic that are consistent with the constraint. Additionally or alternatively, one or more executable units of logic may be added to the constrained execution tree to enforce constraints (e.g., precision constraints) on the output. These are simply meant as examples, and any suitable technique for generating a constrained execution tree can be implemented.

Generally, an executable unit of logic of an execution tree can be validated against a corresponding constraint context comprising an applicable accessed constraint and runtime information such as information identifying the requesting data consumer issuing the query, information identifying an applicable tenant agreement, information identifying target collaborative data on which to operate, and the like. Validation of an executable unit of logic can involve validation of a constituent command or operation, one or more constituent parameters, and/or consideration of other parts of the execution tree. Validation of an executable unit of logic can result in a number of possible results. For example, an executable unit of logic can be allowed (e.g., the executable unit of logic can be copied into a constrained execution tree), an executable unit of logic can be disallowed (e.g., the query can be disallowed in its entirety), or an executable unit of logic can be allowed but with changes (e.g., copying a corresponding constrained executable unit of logic into the constrained execution tree). In some embodiments, the resulting constrained execution tree is translated into a language used by the trustee environment. The resulting execution tree can be executed (e.g., by traversing and executing the hierarchy of executable units of logic of the tree), and the results can be returned to the requesting data consumer.

As such, using implementations described herein, users can efficiently and effectively share data through a data trustee that allows them derive collaborative intelligence, while ensuring data privacy and providing configurable control and access to shared data.

Figure 18:
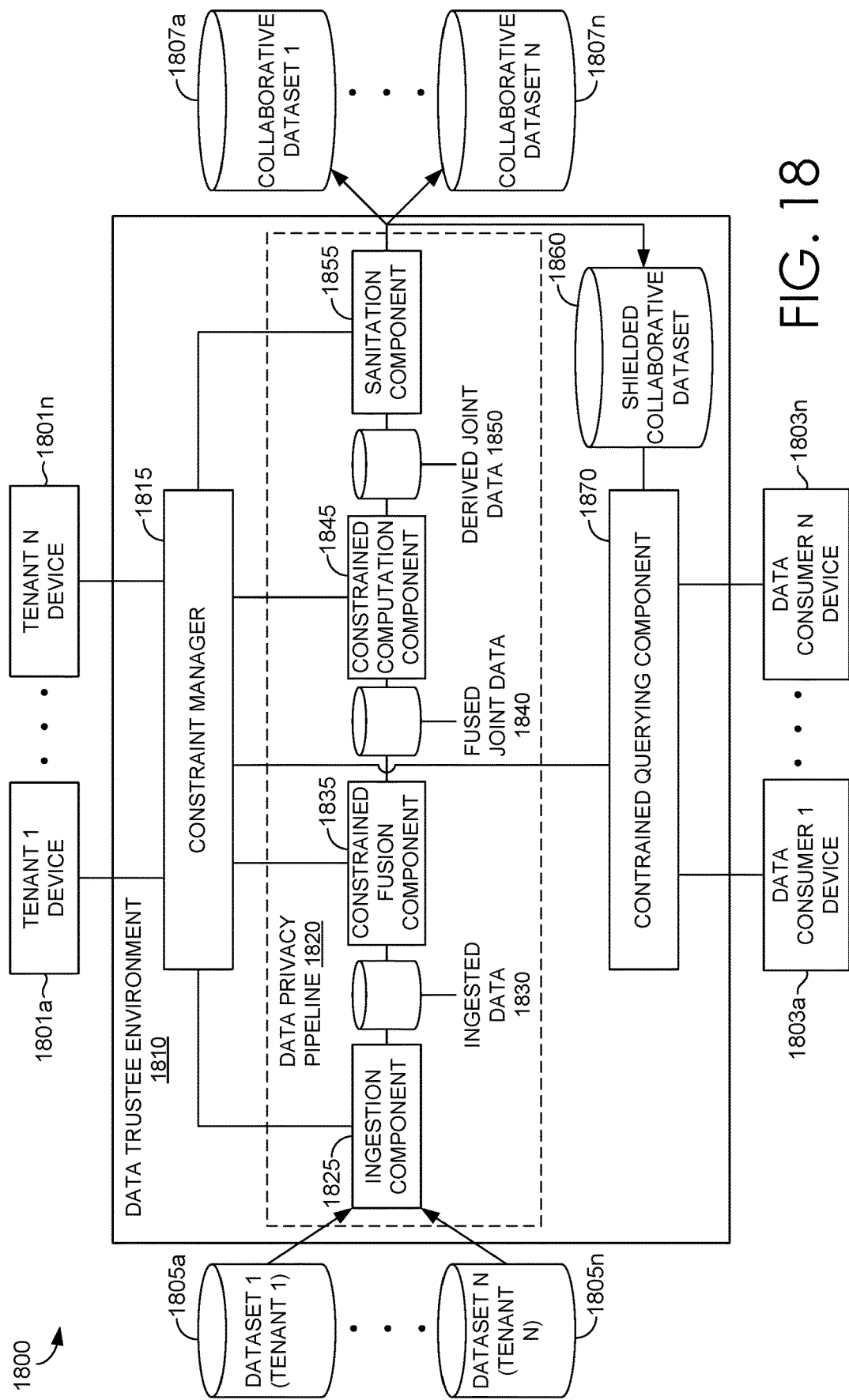
FIG. 18 is a block diagram of an example collaborative intelligence environment, in accordance with embodiments described herein.

Referring now to FIG. 18, a block diagram of example collaborative intelligence environment 1800 suitable for use in implementing embodiments of the invention is shown. Generally, collaborative intelligence environment 1800 is suitable for generation of collaborative intelligence, and, among other things, facilitates constraint computing and constraint querying. Collaborative intelligence environment 1800 or a portion thereof (e.g., data trustee environment 1810) may, but need not, be implemented in a distributed computing environment such as distributed computing environment 2400, discussed below with respect to FIG. 24. Any or all of the components of collaborative intelligence environment 1800 can be implemented as any kind of computing device, or some portion thereof. For example, in an embodiment, tenant devices 1801*a* through 1801*n* and data consumer devices 1803*a* through 1803*n* can each be a computing device such as computing device 2500, as described below with reference to FIG. 25. Further, data trustee environment 1810 may be implemented using one or more such computing devices. In embodiments, these devices can be any combination of a personal computer (PC), a laptop computer, a workstation, a server, a mobile computing device, a PDA, a cell phone, or the like. The components of collaborative intelligence environment 1800 may communicate with each other via one or more networks, which may include, without limitation, one or more local area networks (LANs) and/or wide area networks (WANs). Such networking environments are commonplace in offices, enterprise-wide computer networks, intranets, and the Internet.

Collaborative intelligence environment 1800 includes data trustee environment 1810 that is capable of deriving collaborative data and/or collaborative intelligence from raw data provided by data owners or providers (e.g., tenants) subject to configurable constraints, without sharing the raw data. Generally, any number of tenants can input their data (e.g., datasets 1805*a* through 1805*n*) into data trustee environment 1810 and designate one or more constraints (e.g., from one of tenant devices 1801*a* through 1801*n*). Data trustee environment 1810 can derive collaborative data (e.g., collaborative datasets 1807*a* through 1807*n*, shielded collaborative dataset 1860) based on the one or more constraints. Any number of data consumers (e.g., operating one of data consumer devices 1803*a* through 1803*n*) may issue queries on shielded collaborative dataset 1860, and data trustee environment 1810 may derive collaborative intelligence from shielded collaborative dataset 1860, subject to the one or more constraints. In some cases, an authorized data consumer (e.g., which may be defined by one or more of the constraints) may be the same person or entity that owns or provided raw data (e.g., one or more of datasets 1805*a* through 1805*n*) or owns the derived collaborative data (e.g., shielded collaborative dataset 1860). In some cases, an authorized data consumer may be some other person or entity.

In the embodiment illustrated in FIG. 18, data trustee environment 1810 includes constraint manager 1815. At a high level, tenants that seek to share data can provide one or more desired computations and constraints (which may be embodied in a contractual agreement) to constraint manager 1815 through a user interface of data trustee environment 1810. The user interface can enable tenants to specify the desired computations and constraints that will control the use of their data in data trustee environment 1810, including eligible data sources (e.g., one or more of datasets 1805*a* through 1805*n*) and how their data may be processed or shared. Various types of constraints may be implemented, including data access constraints, data processing constraints, data aggregation constraints, data sanitation constraints, some combination thereof, or others. The specified computations and constraints, and other features of a tenant agreement, may be stored in a contact database (not depicted) accessible to constraint manager 1815.

In the embodiment illustrated in FIG. 18, data trustee environment 1810 includes data privacy pipeline 1820. At a high level, data privacy pipeline 1820 can accept data from one or more specified sources (e.g., one or more of datasets 1805*a* through 1805*n*). The data can be ingested, fused, derived, and/or sanitized to generate collaborative data (e.g., one or more of collaborative datasets 1807*a* through 1807*n*, shielded collaborative dataset 1860) based on one or more specified computations and/or constraints. The data privacy pipeline 1820 can be provided as a distributed computing or cloud computing service (cloud service) implemented in data trustee environment 1810, and can be spun up and spun down as needed. In some embodiments, tenants providing data into data privacy pipeline 1820 cannot access the pipeline. Instead, the pipeline outputs collaborative data subject to applicable constraints. Depending on the designated constraints, the collaborative data can be output from data trustee environment 1810 as one or more of collaborate datasets 1807*a* through 1807*n* (e.g., because it has been sanitized according to specified constraints) and/or may be shielded (e.g., stored as shielded collaborative dataset 1860) in data trustee environment 1810. As explained in more detail below, collaborative dataset 1860 can be queried to derive collaborative intelligence subject to the configurable constraints.

In the embodiment illustrated in FIG. 18, data privacy pipeline 1820 includes ingestion component 1825 (which produces ingested data 1830), constrained fusion component 1835 (which produces fused joint data 1840), constrained computation component 1845 (which produces derived joint data 1850), and sanitation component 1855 (which produces collaborative datasets 1807*a* through 1807*n* and 1860). Initially, one or more of datasets 1805*a* through 1805 may be provided to data privacy pipeline 1820 (e.g., through a user interface, a programming interface, or some other interface of data trustee environment). Ingestion component 1825 can determine whether input data or some portion thereof, is joint data pursuant to a contract or other tenant agreement. For example, input data or some portion thereof may be identified in some way, and ingestion component 1825 can communicate with constraint manager 1815 to confirm whether the identified data is joint data pursuant to a tenant agreement represented in the contract database. Data determined to be joint data can be stored as ingested data 1830, and data determined not to be joint data can be dropped.

Ingested data can include data from multiple sources, so constrained fusion component 1835 may fuse ingested data from multiple sources according to computations and constraints specified in a tenant agreement. For example, constrained fusion component 1835 can communicate with constraint manager 1815 to obtain, validate, or request a specified fusion operation pursuant to a tenant agreement represented in the contract database. By way of nonlimiting example, constrained fusion component 1835 can implement one or more constraints to combine ingested data (e.g., ingested data 1830) to form fused joint data (e.g., fused joint data 1840) in any number of ways, including the use of one or more join operations (e.g., left, right, inner, outer, anti), custom joins (e.g., via imperative scripts), data appends, normalization operations, some combination thereof, and others.

Generally, constrained computation component 1845 can perform constrained computations (e.g., on ingested data 1830, fused joint data 1840) to generate derived joint data (e.g., derived joint data 1850). Constrained computing can involve any number of specified computations (e.g., arithmetic operations, aggregation, summarization, filtering, sorting, bounding). Generally, constrained computation component 1845 can communicate with constraint manager 1815 to obtain, validate, or request a specified computation pursuant to a tenant agreement represented in the contract database. By way of a simple example, a number of retailers may agree to expose average sales data, so a corresponding computation may involve averaging. A simple example of a constraint computation is a calculation of average age per city, where the computation is only to be performed for a city if the underlying dataset includes entries for at least five people in the city. These are meant simply as examples, and any type of computation and/or constraint can be implemented.

In some embodiments, sanitation component 1855 can perform data sanitation (e.g., on derived joint data 1850) to generate collaborative data (e.g., one or more of collaborative datasets 1807*a* through 1807*n*, shielded collaborative dataset 1860) in a manner that implements constraints for storage, access, precision, and the like. For example, sanitation component 1855 can communicate with constraint manager 1815 to obtain, validate, or request a specified sanitation operation pursuant to a tenant agreement represented in the contract database. As such, sanitation component 1855 can implement a constraint specified in a tenant agreement that designates whether collaborative data should be shielded (e.g., stored as shielded collaborative dataset 1860 in data trustee environment 1810), whether collaborative data can be exported (e.g., as one or more of collaborative datasets 1807*a* through 1807*n*), whether exported collaborative data should be restricted (e.g., do not export email, credit card numbers, portions thereof), some combination thereof, and the like. In some embodiments, any or all intermediate data used in arriving at collaborative data (e.g., ingested data, fused joint data, derived joint data) may be deleted, for example, in association with spinning down data privacy pipeline 1820. As such, data privacy pipeline 1820 can generate collaborative data from data provided by one or more tenants.

As explained above, constraint manager 1815 can monitor and orchestrate the use and generation of collaborative data subject to one or more specified constraints. Additionally or alternatively, constraint manager 1815 can monitor and orchestrate access to collaborative data subject to the constraints. Generally, constraint manager 1815 can communicate with various components in data trustee environment 1810 and/or data privacy pipeline 1820 to implement specified computations and/or constraints, which may be maintained in a contract database accessible to constraint manager 1815. In some embodiments, components can issue requests to constraint manager 1815 for permission to execute a particular command, function call, or other executable unit of logic. Constraint manager 1815 can evaluate the request and grant or deny permission. In some cases, permission may be granted subject to one or more conditions corresponding to one or more of the constraints. By way of nonlimiting example, some possible conditions that can be implemented include requiring operations that shift, filter, or reshape data (e.g., application of comparison constraints such as only allowing a merge with certain precision), requiring substitution of one or more executable units of logic (e.g., commands or operations) with one or more constrained executable units of logic (e.g., replace average with constrained average), and the like.

Generally, a constraint can be checked, validated, or otherwise enforced at any time or step (e.g., in association with any component of data privacy pipeline 1820, data trustee environment 1810). Accordingly, corresponding functionality enforcing a constraint can be applied at any step, or multiple steps. In some embodiments, enforcement of certain constraints can be allocated to certain components of data privacy pipeline 1820 (e.g., data access constraints get applied by ingestion component 1825, processing and aggregation constraints get applied by constrained fusion component 1835 and/or constrained computation component 1845, sanitation constraints get applied by sanitation component 1855). In another example, a particular data access constraint (e.g., only pass data for patients who participated in at least five different studies) may be applied by constrained fusion component 1835. These are meant merely as examples, and any suitable constraint enforcement regime may be implemented within the present disclosure.

In some embodiments, constraint manager 1815 can enforce a constraint (e.g., precision or aggregation constraints) on a particular executable unit of logic (e.g., for a designated computation, a requested operation) by communicating, indicating, or otherwise facilitating any number of dispositions. In one example, constraint manager 1815 can reject a particular executable unit of logic entirely. In another example, constraint manager 1815 can allow a particular executable unit of logic, but require the result to be filtered (e.g., no value is returned for a particular row or entry of data). In yet another example, constraint manager 1815 can allow a particular executable unit of logic, but require the result to be changed (e.g., precision reduced, a question is answered with false). These and other variations may be implemented.

As constraints are applied to generate collaborative data (e.g., collaborative datasets 1807a through 1807n, shielded collaborative dataset 1860), any combination of schema, constraints, and/or attribution metadata can be associated with the collaborative data, intermediate data used to arrive at the collaborative data (e.g., ingested data 1830, fused joint data 1840, derived joint data 1850), or otherwise. Generally, constraints can be enforced across multiple steps and computations. As such, in some embodiments, applicable and/or satisfied constraints for each step can be tracked and/or associated with data produced by a given component of data privacy pipeline 1820. Taking aggregation constraints as an example, once an aggregation constraint has been fulfilled by a particular component of data privacy pipeline 1820, downstream components no longer need to consider this constraint. In another example where different constraints have been specified for different datasets to be merged, a merging operation may only need to apply the stricter constraint. Generally, an appropriate allocation or combination of constraints can be applied and/or tracked as data flows through data privacy pipeline 1820. This tracking can facilitate validating whether a particular constraint has been applied to particular data. Accordingly, as constraints are applied and data is generated, corresponding schema, applicable or satisfied constraints, and/or attribution metadata indicating ownership or providence of the data can be associated with a dataset, or a corresponding entry, row, field, or other element of data. Generally, the schema, applicable or satisfied constraints, and/or attribution metadata can be generated pursuant to a tenant agreement represented in the contract database (e.g., via communication with constraint manager 1815). In some embodiments, any or all intermediate data used in arriving at collaborative data (e.g., ingested data 1830, fused joint data 1840, derived joint data 1850) may be deleted, and collaborative data may be stored in data trustee environment 1810 as shielded collaborative dataset 1860 and/or exported as one or more of collaborative datasets 1807a through 1807n, depending on an applicable constraint.

In some embodiments, data trustee environment 1810 includes constrained querying component 1870, which can apply constraint querying to allow data consumers (e.g., operating one of data consumer devices 1803a through 1803n) to query collaborative data (e.g., shielded collaborative dataset 1860) in data trustee environment 1810 subject to one or more specified constraint. At a high level, constrained querying component 1870 can operate as a search engine that allows data consumers to access or derive collaborative intelligence from shielded collaborative dataset 1860, without exposing raw data provided by a tenant (e.g., one or more of datasets 1805a through 1805n), intermediate data used to generate the shielded collaborative dataset 1860 (e.g., ingested data 1830, fused joint data 1840, derived joint data 1850), and/or shielded collaborative dataset 1860. Generally, constrained querying component 1870 can communicate with constraint manager 1815 to obtain, validate, or request a specified operation pursuant to a tenant agreement represented in the contract database. Constrained querying component 1870 can facilitate enforcement of constraints in response to a query in any number of ways, including reformatting a query prior to execution, applying constraints after executing a query, constraining eligible queries for execution (e.g., only permit a set of whitelisted queries), applying access constraints prior to execution, and others.

Figure 19:
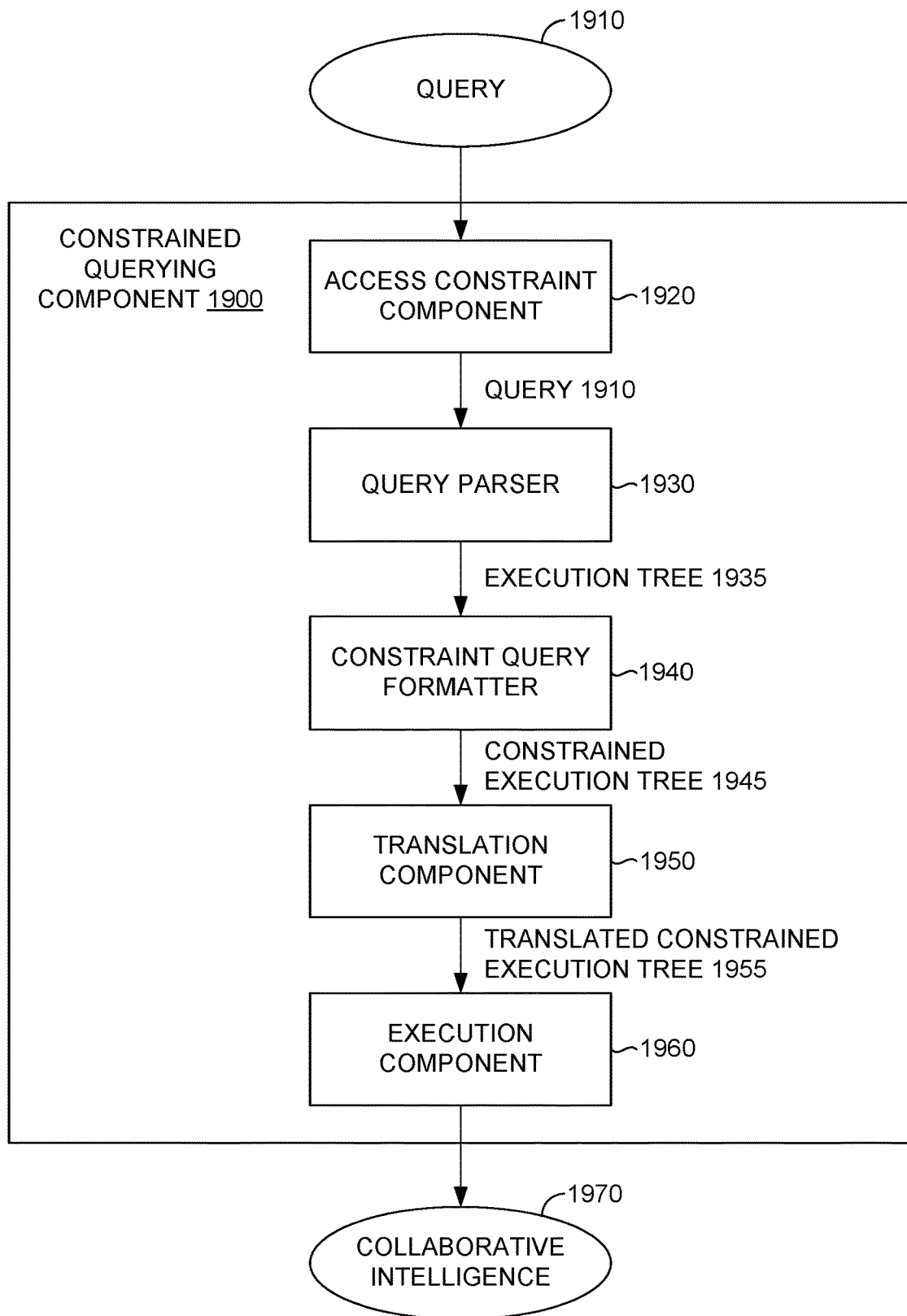
FIG. 19 is a block diagram of an example constrained querying component, in accordance with embodiments described herein.

Turning now to FIG. 19, FIG. 19 is a block diagram of an example constrained querying component 1900, in accordance with embodiments described herein. Constrained querying component 1900 may correspond with constrained querying component 1870 of FIG. 18. At a high level, constrained querying component 1900 can operate as a search engine, enabling data consumers to query collaborative data and derive collaborative intelligence therefrom, subject to one or more constraints designated in a corresponding tenant agreement. By way of background, queries are generally not executable code. In order to execute a query, the query is normally converted into an execution tree, which serves as the basis for an execution plan that is executable. Generally, constrained querying component 1900 can enforce constraints, or facilitate the enforcement of constraints, by reformatting an execution tree corresponding to a received query to account for any applicable constraints prior to execution. In a simple example, a constraint may permit queries on compensation data, but the result has to be rounded. As such, the query and/or its corresponding execution tree can be reformatted prior to execution, such that any returned search results account for applicable constraints. In the embodiment illustrated in FIG. 19, constrained querying component 1900 includes access constraint component 1920, query parser 1930, constraint query formatter 1940, translation component 1950, and execution component 1960. This configuration is meant merely as an example, and other configurations with similar or different functionality may be implemented in accordance with the present disclosure.

At a high level, constrained querying component 1900 may receive query 1910 issued by a data consumer (e.g., operating one of data consumer devices 1803a through 1803n of FIG. 18) requesting collaborative intelligence based on collaborative data (e.g., shielded collaborative dataset 1860 of FIG. 18). Query 1910 may take any suitable form or query language, and may comprise one or more requested operations on collaborative data. In some embodiments, query 1910 may specify or otherwise be associated with runtime information, such as information identifying the requesting data consumer issuing the query, information identifying an applicable tenant agreement, information identifying target collaborative data on which to operate, and the like.

In some embodiments, access constraint component 1920 can use the runtime information associated with query 1910 to trigger a lookup and enforcement of an applicable data access constraint (e.g., via communication with constraint manager 1815 of FIG. 18). For example, access constraint component 1920 can validate query 1910 against a corresponding constraint context comprising an applicable data access constraint and the runtime information associated with query 1910. Generally, in scenarios where a data consumer is not authorized to access a collaborative dataset, target collaborative data within a collaborative dataset (e.g., a particular row of data), a particular type of requested collaborative intelligence to be derived, access constraint component 1920 can deny the request. In this case, access constraint component 1920 may return a notification to the issuing data consumer informing the data consumer that the requested query was denied. If the requested access is determined to be authorized and/or consistent with an applicable data access constraint, query 1910 can be passed to query parser 1930.

Generally, query parser 1930 can parse query 1910 and generate a corresponding execution tree 1935. At a high level, execution tree 1935 comprises a hierarchical arrangement of executable units of logic that, when executed, implement query 1910. The executable units of logic can include any suitable arrangement and combination of commands, operations, function calls, and the like. Constraint query formatter 1940 can access applicable constraints (e.g., via communication with constraint manager 1815 of FIG. 18) and can validate the executable units of logic of execution tree 1935 against the constraints. In some embodiments, if one or more of the executable units of logic is not allowed, query 1910 can effectively be reformatted by adding, removing, and/or altering one or more executable units of logic based on one or more constraints.

More specifically, constraint query formatter 1940 can reformat execution tree 1935 into constrained execution tree 1945 by traversing execution tree 1935 and replacing executable units of logic inconsistent with a particular constraint with custom executable units of logic that are consistent with the constraint. Additionally or alternatively, constraint query formatter 1940 can add or remove one or more executable units of logic to enforce constraints (e.g., precision constraints) on the output. Generally, constraint query formatter 1940 can validate an executable unit of logic of execution tree 1935 against a corresponding constraint context comprising an applicable constraint and the runtime information associated with query 1910. This check can involve validation of a constituent command or operation, one or more constituent parameters, and/or consideration of other parts of execution tree 1935, and can result in a number of possible results. For example, an executable unit of logic can be allowed (e.g., the executable unit of logic can be copied into constrained execution tree 1945), an executable unit of logic can be disallowed (e.g., query 1910 can be disallowed in its entirety), or an executable unit of logic can be allowed but with changes (e.g., copying a corresponding constrained executable unit of logic into constrained execution tree 1945). These are meant simply as examples, and other variations are contemplated within the present disclosure.

As such, constraint query formatter 1940 can evaluate each executable unit of logic against the constraints, add or remove executable units of logic, and/or replace one or more executable units of logic inconsistent with a constraint with a custom executable unit of logic that incorporates and/or applies the constraint. Mappings between executable units of logic and custom executable units of logic and/or executable units of logic corresponding to one or more constraints (e.g., a list of rules) can be retrieved, accessed, and/or maintained in any suitable manner (e.g., stored locally, accessed via communication with constraint manager 1815 of FIG. 18, some combination thereof, or otherwise). Mappings can be one-to-one, one-to-many, or many-to-one.

In some embodiments, a received query may not be in the same query language used by the target collaborative dataset (e.g., shielded collaborative dataset 1860 of FIG. 18). As such, translation component 1950 can translate constrained execution tree 1945 from a first query language to a second query language. That is, translation component can translate constrained execution tree 1945 into translated constrained execution tree 1955. Any suitable query language may be implemented (e.g., SQL, SparkQL, Kusto Query Language, C# Linq). In some embodiments, constrained execution tree 1945 and/or translated constrained execution tree 1955 can be executed to test for failure, and a failure may result in rejection of a particular execution, a set of executable units of logic, the entire query 1910, or otherwise.

A resulting execution tree (e.g., constrained execution tree 1945 and/or translated constrained execution tree 1955, as the case may be) can be passed to execution component 1960 for execution (e.g., execution of a corresponding execution plan). Generally, this execution operates to derive collaborative intelligence 1970 from collaborative data. In some embodiments, collaborative intelligence 1970 is returned to the requesting data consumer as is. In some embodiments, one or more constraints may additionally or alternatively be enforced on collaborative intelligence 1970 prior to transmission to the requesting data consumer.

Figures 20A, 20B:
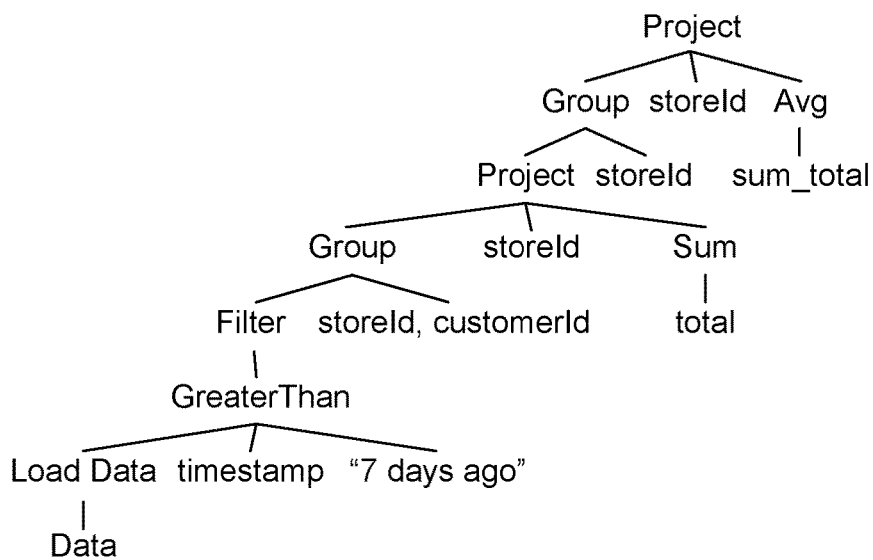
FIG. 20A is an example of an issued query.
FIG. 20B is an example of a corresponding execution tree, in accordance with embodiments described herein.

By way of nonlimiting example, assume that pursuant to a particular tenant agreement, a number of retailers have agreed to expose sales data that includes some sensitive customer information that should not be exposed. In this example, the tenant agreement specifies a number of constraints, including requirements of at least 20 unique customers per aggregation, aggregations must span at least 48 hours, no aggregation by userid, no export of userid, and round numeric results to the nearest two digits. Assume further that the tenant agreement allows a data consumer to derive the average amount of money spent by each customer in each store each week. FIG. 20A illustrates an example of a corresponding query 2010 in Structured Query Language (SQL). This query language is meant merely as an example, and any suitable query structure may be implemented.

Query 2010 may be parsed and converted into a corresponding execution tree (e.g., by query parser 1930 of FIG. 19). FIG. 20B illustrates a simplified representation of an example execution tree 2020 that corresponds with query 2010 of FIG. 20A. Generally, in a query execution tree, each executable unit of logic receives data from a previous executable unit of logic and one or more parameters for transforming the data. When executing execution tree 2020, data gets passed along the left branch of execution tree 2020, from the bottom to the top. As the data gets passed, each executable unit of logic applies one or more associated commands or operations. As will be appreciated by those of ordinary skill in the art, execution tree 2020 comprises a hierarchical arrangement of executable units of logic that, if executed, would implement query 2010.

Figure 21A:
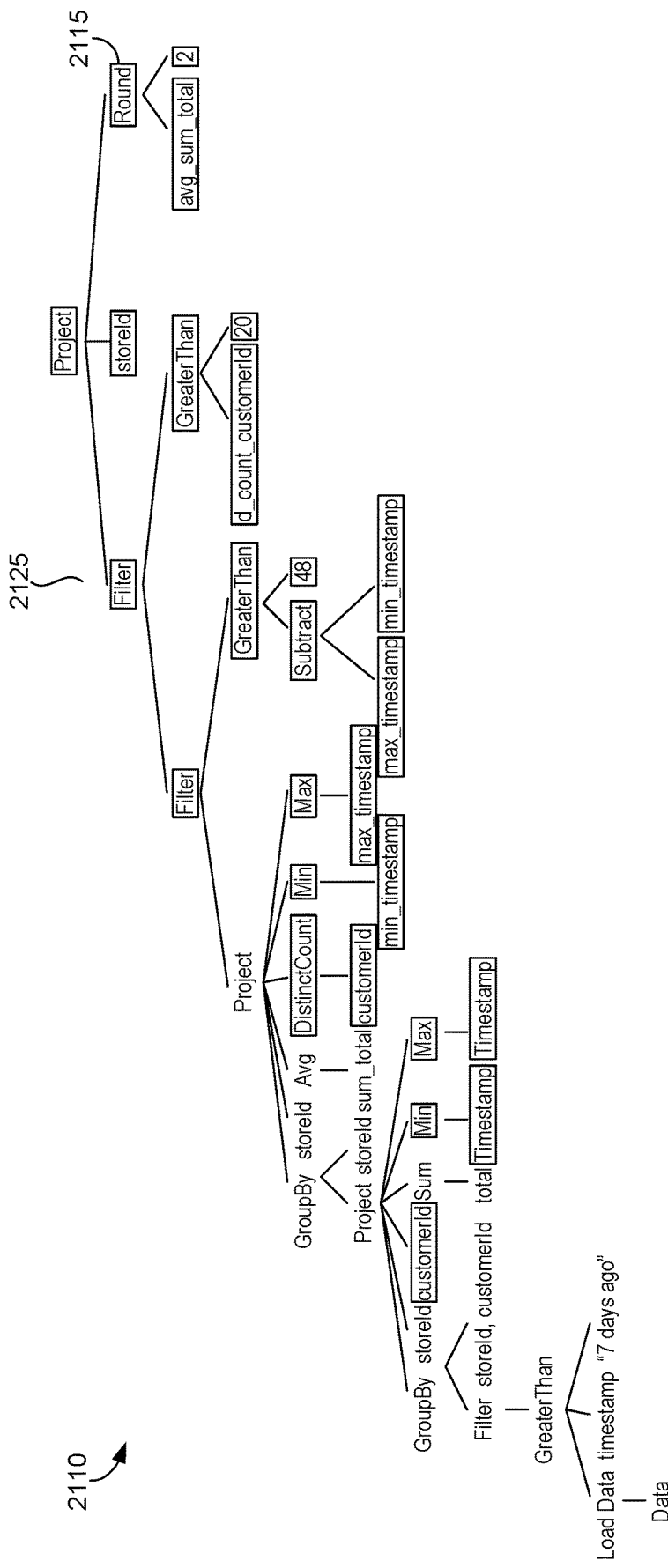
FIG. 21A is an example of a constrained execution tree.

To account for applicable constraints, execution tree 2020 can be converted into constrained execution tree 2110 of FIG. 21A (e.g., by constraint query formatter 1940 of FIG. 19). Differences between execution tree 2020 of FIG. 20B and constrained execution tree 2110 of FIG. 21A are illustrated with boxes drawn around the different elements. For example, constrained execution tree 2110 includes a rounding operation 2115 that implements the constraint described above in which numeric results must be rounded to the nearest two digits. In another example, constrained execution tree 2110 includes a filtering operation 2125 that implements the constraint described above in which aggregations must include data for at least 20 unique customers. This configuration for constrained execution tree 2110 is simply meant as an example, and any suitable configuration may be implemented. FIG. 21B illustrates an example of a corresponding query 2120 that corresponds with constrained execution tree 2110, for illustration purposes. As will be appreciated, query 2120 includes additional elements not present in query 2010 that serve to enforce the example constraints described above. Constrained execution tree 2110 can be executed by traversing and executing the hierarchy of executable units of logic of the tree along the left branch, from bottom to top, as will be appreciated by those of ordinary skill in the art. As such, constrained execution tree 2110 can be executed to derive collaborative intelligence, and the collaborative intelligence can be returned to a requesting data consumer.

Example Flow Diagrams

Figure 22:
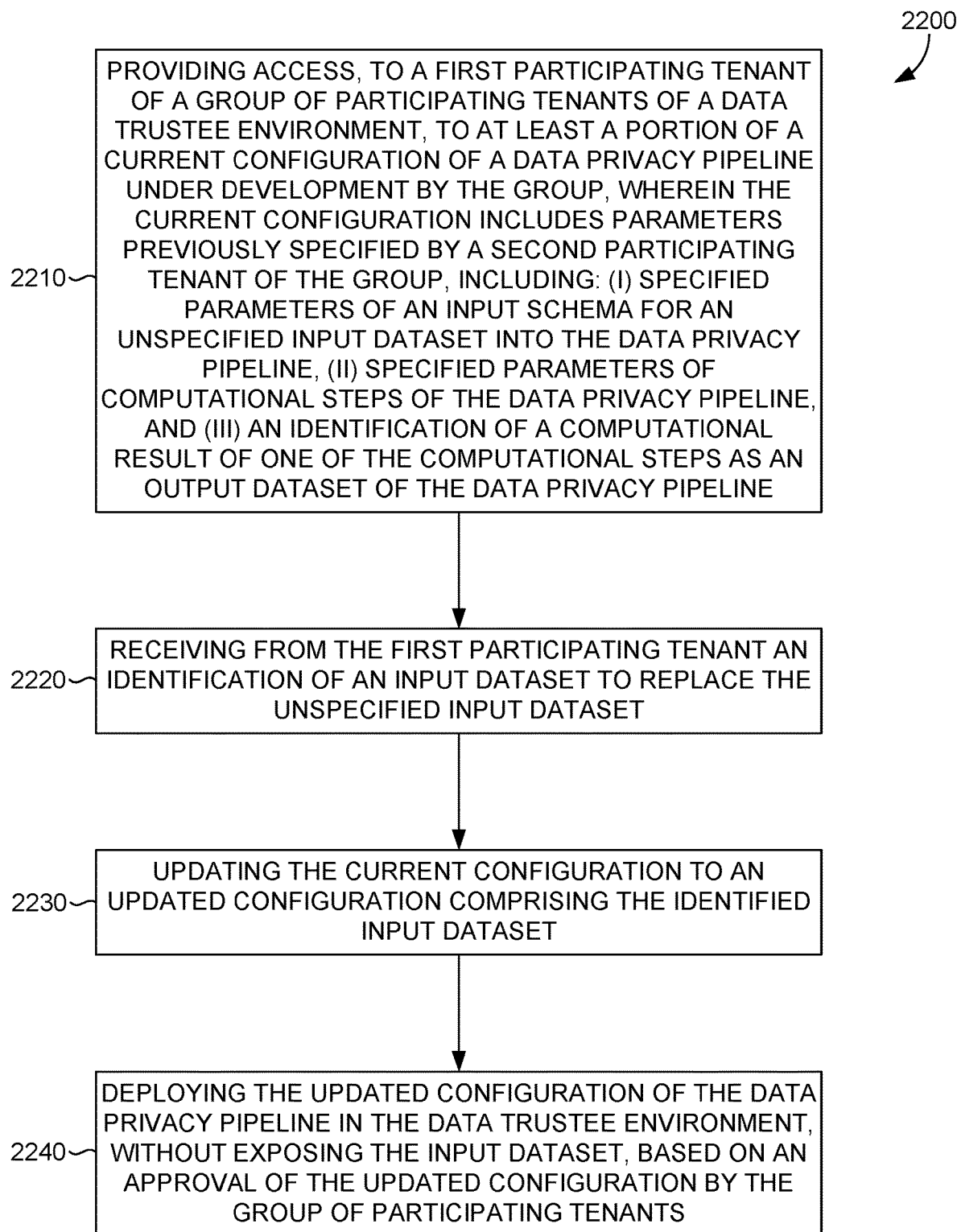
FIG. 22 is a flow diagram showing an example method for generating a data privacy pipeline, in accordance with embodiments described herein.
Figure 23:
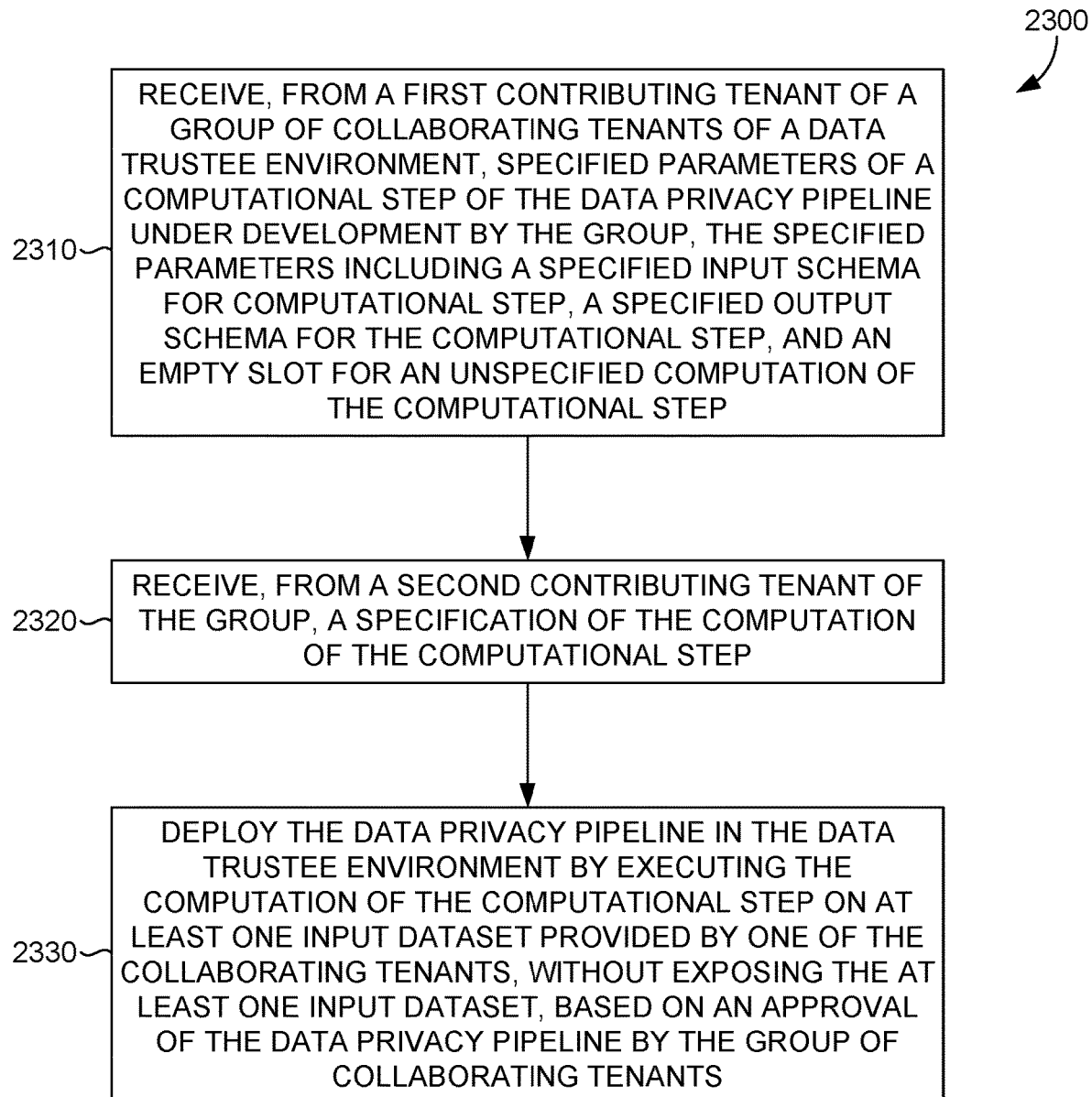
FIG. 23 is a flow diagram showing another example method for generating a data privacy pipeline, in accordance with embodiments described herein.

With reference to FIGS. 22-23, flow diagrams are provided illustrating various methods relating to generation of a data privacy pipeline. The methods can be performed using the collaborative intelligence environment described herein. In embodiments, one or more computer storage media having computer-executable instructions embodied thereon can, when executed by one or more processors, cause the one or more processors to perform the methods in the autonomous upgrade system.

Turning now to FIG. 22, a flow diagram is provided that illustrates a method 2200 for generating a data privacy pipeline. Initially at block 2210, access to at least a portion of a current configuration of a data privacy pipeline under development by a group of participating tenants of a data trustee environment is provided to a first participating tenant of the group. The current configuration includes parameters previously specified by a second participating tenant of the group. The parameters include specified parameters of an input schema for an unspecified input dataset into the data privacy pipeline, specified parameters of computational steps of the data privacy pipeline, and an identification of a computational result of one of the computational steps as an output dataset of the data privacy pipeline. At block 2220, an identification of an input dataset to replace the unspecified input dataset is received from the first participating tenant. At block 2230, the current configuration is updated to an updated configuration comprising the identified input dataset. At block 2240, the updated configuration of the data privacy pipeline is deployed in the data trustee environment, without exposing the input dataset, based on an approval of the updated configuration by the group of participating tenants.

Turning now to FIG. 23, a flow diagram is provided that illustrates a method 2300 for generating data privacy pipeline. Initially at block 2310, specified parameters of a computational step of a data privacy pipeline under development by a group of collaborating tenants of a data trustee environment are received from a first contributing tenant of the group. The specified parameters include a specified input schema for computational step, a specified output schema for the computational step, and an empty slot for an unspecified computation of the computational step. At block 2320, a specification of the computation of the computational step is received from a second contributing tenant of the group. At block 2330, the data privacy pipeline is deployed in the data trustee environment by executing the computation of the computational step on at least one input dataset provided by one of the collaborating tenants, without exposing the at least one input dataset, based on an approval of the data privacy pipeline by the group of collaborating tenants.

Example Distributed Computing Environment

Figure 24:
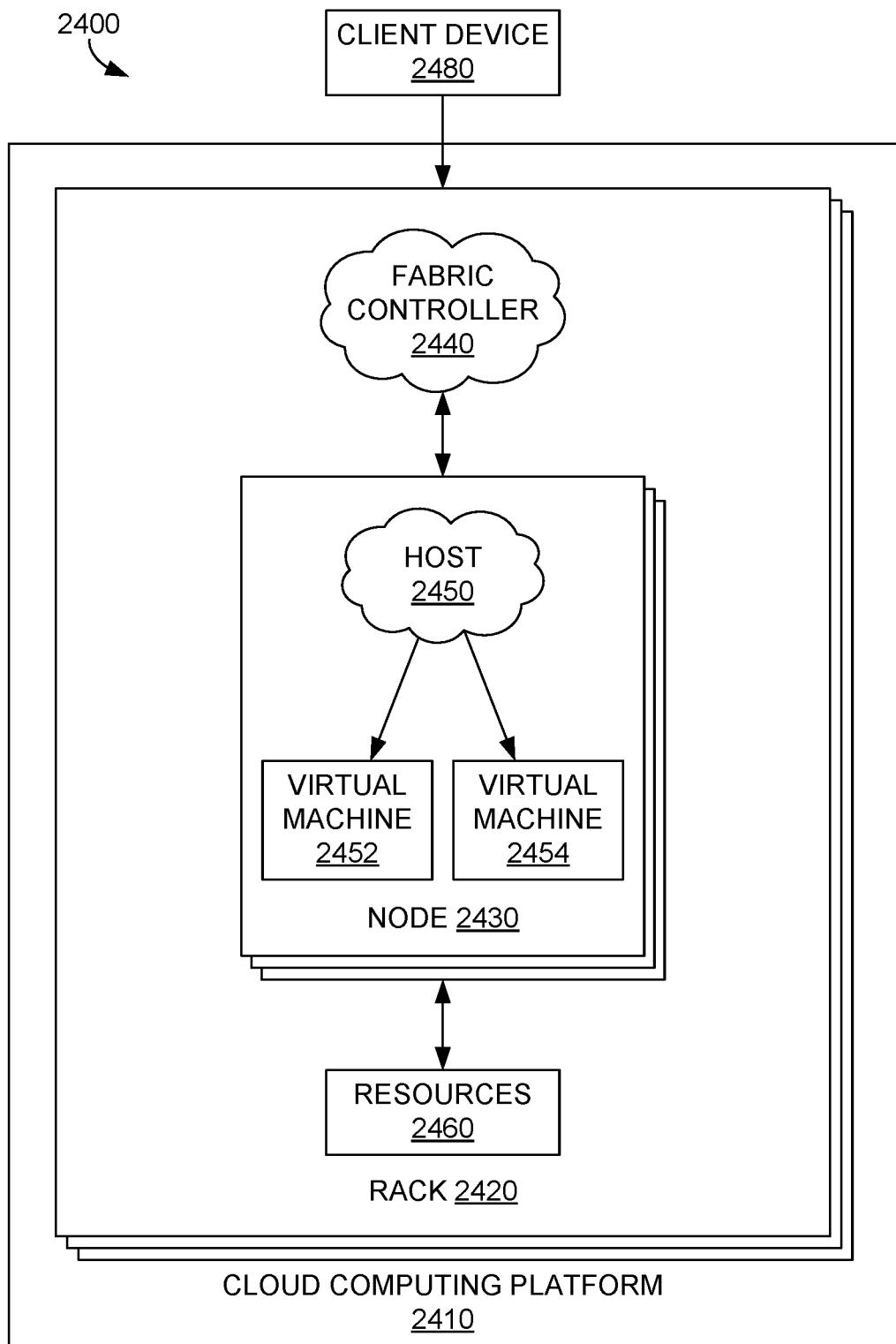
FIG. 24 is a block diagram of an example computing environment suitable for use in implementing embodiments described herein.

Referring now to FIG. 24, FIG. 24 illustrates an example distributed computing environment 2400 in which implementations of the present disclosure may be employed. In particular, FIG. 24 shows a high level architecture of an example cloud computing platform 2410 that can host a collaborative intelligence environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 2400 that includes cloud computing platform 2410, rack 2420, and node 2430 (e.g., computing devices, processing units, or blades) in rack 2420. The collaborative intelligence environment and/or data trustee environment can be implemented with cloud computing platform 2410 that runs cloud services across different data centers and geographic regions. Cloud computing platform 2410 can implement fabric controller 2440 component for provisioning and managing resource allocation, deployment, upgrade, and management of cloud services. Typically, cloud computing platform 2410 acts to store data or run service applications in a distributed manner. Cloud computing infrastructure 2410 in a data center can be configured to host and support operation of endpoints of a particular service application. Cloud computing infrastructure 2410 may be a public cloud, a private cloud, or a dedicated cloud.

Node 2430 can be provisioned with host 2450 (e.g., operating system or runtime environment) running a defined software stack on node 2430. Node 2430 can also be configured to perform specialized functionality (e.g., compute nodes or storage nodes) within cloud computing platform 2410. Node 2430 is allocated to run one or more portions of a service application of a tenant. A tenant can refer to a customer utilizing resources of cloud computing platform 2410. Service application components of cloud computing platform 2410 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 2430, nodes 2430 may be partitioned into virtual machines (e.g., virtual machine 2452 and virtual machine 2454). Physical machines can also concurrently run separate service applications. The virtual machines or physical machines can be configured as individualized computing environments that are supported by resources 2460 (e.g., hardware resources and software resources) in cloud computing platform 2410. It is contemplated that resources can be configured for specific service applications. Further, each service application may be divided into functional portions such that each functional portion is able to run on a separate virtual machine. In cloud computing platform 2410, multiple servers may be used to run service applications and perform data storage operations in a cluster. In particular, the servers may perform data operations independently but exposed as a single device referred to as a cluster. Each server in the cluster can be implemented as a node.

Client device 2480 may be linked to a service application in cloud computing platform 2410. Client device 2480 may be any type of computing device, which may correspond to computing device 2400 described with reference to FIG. 24, for example. Client device 2480 can be configured to issue commands to cloud computing platform 2410. In embodiments, client device 2480 may communicate with service applications through a virtual Internet Protocol (IP) and load balancer or other means that direct communication requests to designated endpoints in cloud computing platform 2410. The components of cloud computing platform 2410 may communicate with each other over a network (not shown), which may include, without limitation, one or more local area networks (LANs) and/or wide area networks (WANs).

Example Operating Environment

Figure 25:
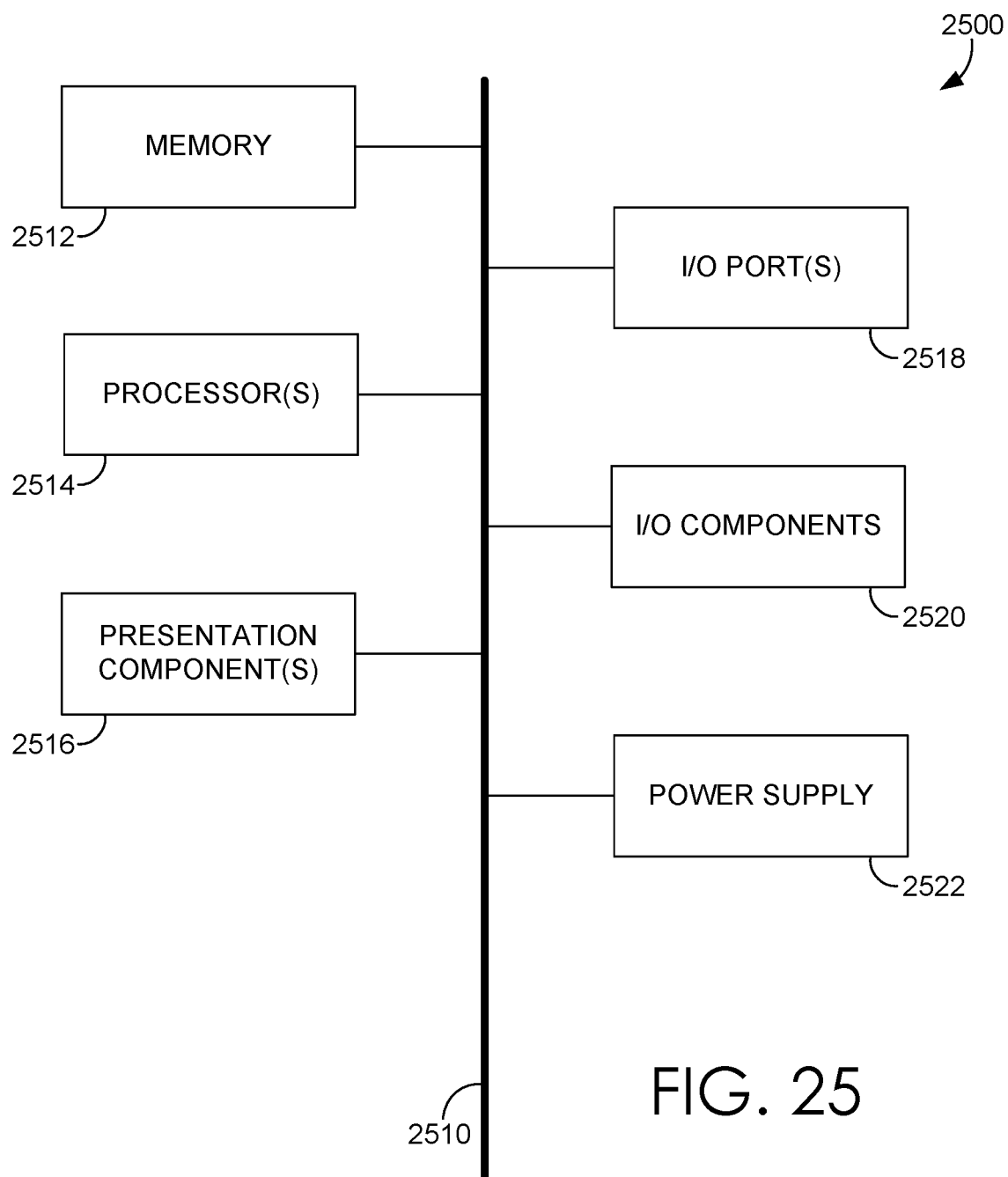
FIG. 25 is a block diagram of an example computing environment suitable for use in implementing embodiments described herein.

Having briefly described an overview of embodiments of the present invention, an example operating environment in which embodiments of the present invention may be implemented is described below in order to provide a general context for various aspects of the present invention. Referring initially to FIG. 25 in particular, an example operating environment for implementing embodiments of the present invention is shown and designated generally as computing device 2500. Computing device 2500 is but one example of a suitable computing environment and is not intended to suggest any limitation as to the scope of use or functionality of the invention. Neither should computing device 2500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 25, computing device 2500 includes bus 2510 that directly or indirectly couples the following devices: memory 2512, one or more processors 2514, one or more presentation components 2516, input/output ports 2518, input/output components 2520, and illustrative power supply 2522. Bus 2510 represents what may be one or more buses (such as an address bus, data bus, or combination thereof). The various blocks of FIG. 25 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 25 is merely illustrative of an example computing device that can be used in connection with one or more embodiments of the present invention. Distinction is not made between such categories as "workstation," "server," "laptop," "hand-held device," etc., as all are contemplated within the scope of FIG. 25 and reference to "computing device."

Computing device 2500 typically includes a variety of computer-readable media. Computer-readable media can be any available media that can be accessed by computing device 2500 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 2500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 2512 includes computer storage media in the form of volatile and/or nonvolatile memory. The memory may be removable, non-removable, or a combination thereof. Exemplary hardware devices include solid-state memory, hard drives, optical-disc drives, etc. Computing device 2500 includes one or more processors that read data from various entities such as memory 612 or I/O components 2520. Presentation component(s) 2516 present data indications to a user or other device. Exemplary presentation components include a display device, speaker, printing component, vibrating component, etc.

I/O ports 2518 allow computing device 2500 to be logically coupled to other devices including I/O components 2520, some of which may be built in. Illustrative components include a microphone, joystick, game pad, satellite dish, scanner, printer, wireless device, etc.

With reference to the collaborative intelligence environment described herein, embodiments described herein support constraint computing and/or constraint querying. The components of the collaborative intelligence environment can be integrated components that include a hardware architecture and a software framework that support constraint computing and/or constraint querying functionality within a collaborative intelligence system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the collaborative intelligence system can include an API library that includes specifications for routines, data structures, object classes, and variables may support the interaction between the hardware architecture of the device and the software framework of the collaborative intelligence system. These APIs include configuration specifications for the collaborative intelligence system such that the different components therein can communicate with each other in the collaborative intelligence system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the collaborative intelligence environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer system comprising:
one or more hardware processors and memory configured to provide computer program instructions to the one or more hardware processors, and
a graphical user interface configured to generate interface elements associated with a configuration of a data pipeline, the configuration comprising a specification of:
an input dataset, one or more computational steps for the data pipeline, and a collaborative dataset that is derivable by executing the one or more computational steps on the input dataset, wherein the interface elements enable:
configuring fine-grained element-by-element parameterized access controls on the one or more computational steps that are operations that are executable on the data pipeline,
receiving multi-collaborator approval of the one or more computational steps in the data pipeline, and
triggering the data pipeline to derive the collaborative dataset based on approval of the data pipeline from collaborators and receiving input from an authorized one of the collaborators requesting to trigger the data pipeline;
the graphical user interface is configured to use the one or more hardware processors to:
receive input instructing creation of a computational step of the data pipeline;
prompt for and accept identification of a supported computation platform, an input into the computational step, a computation of the computational step, and an output schema of an output derivable by the supported computation platform executing the computation on the input; and
update a representation of the data pipeline to identify the input, the computation, and the output of the computational step, without exposing contents of the input.

2. The computer system of claim 1, wherein the identification of the input into the computational step comprises selection of an input dataset from a plurality of input datasets connected to the data pipeline.

3. The computer system of claim 1, wherein the identification of the input into the computational step comprises selection of a computational result of another computational step of the data pipeline.

4. The computer system of claim 1, wherein the identification of the input into the computational step comprises replacement of a placeholder dataset with a connection to an available dataset or a computational result of another computational step of the data pipeline.

5. The computer system of claim 1, wherein the identification of the computation of the computational step comprises selection from a menu of supported template computations.

6. The computer system of claim 1, wherein the identification of the computation of the computational step comprises input of a computational script via a script editor.

7. The computer system of claim 1, wherein the identification of the output schema defines a form or structure of the output.

8. The computer system of claim 1, the graphical user interface configured to use the one or more hardware processors to prompt for and receive, from collaborators designing the data pipeline, an indication that the collaborators have approved the data pipeline.

9. The computer system of claim 1, the graphical user interface configured to use the one or more hardware processors to trigger, based on approval of the data pipeline from each collaborator of a plurality of collaborators and receiving input from an authorized one of the collaborators requesting to trigger the data pipeline, the data pipeline to derive one or more outputs without exposing contents of the input to the collaborators.

10. One or more computer storage media storing computer-useable instructions that, when executed by one or more computing devices, cause the one or more computing devices to perform operations comprising:
receiving, via a graphical user interface, input instructing creation of a computational step of a data pipeline, wherein the graphical user interface is configured to generate interface elements associated with a configuration of the data pipeline, the configuration comprising a specification of:
an input dataset, one or more computational steps for the data pipeline, and a collaborative dataset that is derivable by executing the one or more computational steps on the input dataset, wherein the interface elements enable:
configuring fine-grained element-by-element parameterized access controls on the one or more computational steps that are operations that are executable on the data pipeline,
receiving multi-collaborator approval of the one or more computational steps in the data pipeline, and
triggering the data pipeline to derive the collaborative dataset based on approval of the data pipeline from collaborators and receiving input from an authorized one of the collaborators requesting to trigger the data pipeline;
prompting for and accepting identification of a supported computation platform, an input into the computational step, a computation of the computational step, and an output schema of an output derivable by the supported computation platform executing the computation on the input; and
updating a representation of the data pipeline to identify the input, the computation, and the output of the computational step, without exposing contents of the input.

11. The one or more computer storage media of claim 10, wherein the identification of the input into the computational step comprises selection of an input dataset from a plurality of input datasets connected to the data pipeline.

12. The one or more computer storage media of claim 10, wherein the identification of the input into the computational step comprises selection of a computational result of another computational step of the data pipeline.

13. The one or more computer storage media of claim 10, wherein the identification of the input into the computational step comprises replacement of a placeholder dataset with a connection to an available dataset or a computational result of another computational step of the data pipeline.

14. The one or more computer storage media of claim 10, wherein the identification of the computation of the computational step comprises selection from a menu of supported template computations.

15. The one or more computer storage media of claim 10, wherein the identification of the computation of the computational step comprises input of a computational script via a script editor.

16. The one or more computer storage media of claim 10, wherein the identification of the output schema defines a form or structure of the output.

17. A method comprising:
receiving, via a graphical user interface, input instructing creation of a computational step of a data pipeline, wherein the graphical user interface is configured to generate interface elements associated with a configuration of the data pipeline, the configuration comprising a specification of:
an input dataset, one or more computational steps for the data pipeline, and a collaborative dataset that is derivable by executing the one or more computational steps on the input dataset, wherein the interface elements enable:
configuring fine-grained element-by-element parameterized access controls on the one or more computational steps that are operations that are executable on the data pipeline,
receiving multi-collaborator approval of the one or more computational steps in the data pipeline, and
triggering the data pipeline to derive the collaborative dataset based on approval of the data pipeline from collaborators and receiving input from an authorized one of the collaborators requesting to trigger the data pipeline;
prompting for and accepting identification of a supported computation platform, an input into the computational step, a computation of the computational step, and an output schema of an output derivable by the supported computation platform executing the computation on the input; and
updating a representation of the data pipeline to identify the input, the computation, and the output of the computational step, without exposing contents of the input.

18. The method of claim 17, wherein the identification of the input into the computational step comprises selection of an input dataset from a plurality of input datasets connected to the data pipeline.

19. The method of claim 17, wherein the identification of the input into the computational step comprises selection of a computational result of another computational step of the data pipeline.

20. The method of claim 17, wherein the identification of the input into the computational step comprises replacement of a placeholder dataset with a connection to an available dataset or a computational result of another computational step of the data pipeline.

* * * * *